(12) United States Patent
Ornstein et al.

(10) Patent No.: US 7,752,235 B2
(45) Date of Patent: Jul. 6, 2010

(54) METHOD AND APPARATUS FOR MAINTAINING RELATIONSHIPS BETWEEN PARTS IN A PACKAGE

(75) Inventors: David Ornstein, Seattle, WA (US);
Andrey Shur, Redmond, WA (US);
Mike Hillberg, Beaux Arts, WA (US);
Brian Jones, Redmond, WA (US);
Daniel Emerson, Redmond, WA (US);
Jerry Dunietz, Seattle, WA (US); Oliver Foehr, Mercer Island, WA (US); Bruce MacKenzie, Sammamish, WA (US);
Jean Paoli, Kirkland, WA (US); Josh Pollock, Seattle, WA (US); Sarjana Sheth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/275,723

(22) Filed: Jan. 25, 2006

(65) Prior Publication Data
US 2006/0149785 A1 Jul. 6, 2006

Related U.S. Application Data

(62) Division of application No. 10/837,041, filed on Apr. 30, 2004.

(51) Int. Cl.
*G06F 17/30* (2006.01)
(52) U.S. Cl. .................................. 707/803; 715/234
(58) Field of Classification Search ................ 707/2, 707/3, 5, 6, 8, 9, 10, 100, 104.1, 802, 803; 705/8, 10; 700/105; 715/204, 234; 709/203
See application file for complete search history.

(56) References Cited

U.S. PATENT DOCUMENTS

| | | |
|---|---|---|
| 4,410,286 A | 10/1983 | Ko et al. |
| 4,594,674 A | 6/1986 | Boulia et al. |
| 4,649,513 A | 3/1987 | Martin et al. |
| 4,870,611 A | 9/1989 | Martin |
| 5,179,702 A | 1/1993 | Spix et al. |
| 5,222,205 A | 6/1993 | Larson |
| 5,469,532 A | 11/1995 | Gerlach et al. |
| 5,469,533 A | 11/1995 | Dennis |

(Continued)

OTHER PUBLICATIONS

Jacobs, et al., "Adaptive Grid-Based Document Layout", ACM, 2003, pp. 838-847.

(Continued)

*Primary Examiner*—Shahid A Alam
(74) *Attorney, Agent, or Firm*—Lee & Hayes, PLLC

(57) ABSTRACT

Modular content framework and document format methods and systems are described. The described framework and format define a set of building blocks for composing, packaging, distributing, and rendering document-centered content. These building blocks define a platform-independent framework for document formats that enable software and hardware systems to generate, exchange, and display documents reliably and consistently. The framework and format have been designed in a flexible and extensible fashion. In addition to this general framework and format, a particular format, known as the reach package format, is defined using the general framework. The reach package format is a format for storing paginated documents. The contents of a reach package can be displayed or printed with full fidelity among devices and applications in a wide range of environments and across a wide range of scenarios.

10 Claims, 11 Drawing Sheets

U.S. PATENT DOCUMENTS

| | | | |
|---|---|---|---|
| 5,487,138 A | 1/1996 | Rust et al. | |
| 5,537,526 A | 7/1996 | Anderson et al. | |
| 5,613,124 A | 3/1997 | Atkinson et al. | |
| 5,699,493 A | 12/1997 | Davidson, Jr. et al. | |
| 5,727,220 A | 3/1998 | Hohensee et al. | |
| 5,745,121 A | 4/1998 | Politis | |
| 5,745,122 A | 4/1998 | Gay et al. | |
| 5,745,910 A | 4/1998 | Piersol et al. | |
| 5,752,055 A | 5/1998 | Redpath et al. | |
| 5,752,056 A | 5/1998 | Celik | |
| 5,806,078 A | 9/1998 | Hug et al. | |
| 5,819,295 A | 10/1998 | Nakagawa et al. | |
| 5,845,058 A | 12/1998 | Shaw et al. | |
| 5,903,903 A | 5/1999 | Kennedy | |
| 5,905,504 A | 5/1999 | Barkans et al. | |
| 5,911,138 A | 6/1999 | Li et al. | |
| 5,920,684 A | 7/1999 | Hastings et al. | |
| 5,940,581 A | 8/1999 | Lipton | |
| 5,950,215 A | 9/1999 | Tabuchi | |
| 5,960,168 A | 9/1999 | Shaw et al. | |
| 5,993,088 A | 11/1999 | Nogay et al. | |
| 6,026,416 A | 2/2000 | Kanerva et al. | |
| 6,070,175 A | 5/2000 | Mezei | |
| 6,094,665 A | 7/2000 | Lyons et al. | |
| 6,134,552 A | 10/2000 | Fritz et al. | |
| 6,138,162 A | 10/2000 | Pistriotto et al. | |
| 6,144,974 A | 11/2000 | Gartland | |
| 6,173,295 B1 | 1/2001 | Goertz et al. | |
| 6,182,080 B1 | 1/2001 | Clements | |
| 6,182,096 B1 | 1/2001 | Mastie et al. | |
| 6,195,676 B1 | 2/2001 | Spix et al. | |
| 6,199,082 B1 | 3/2001 | Ferrel et al. | |
| 6,212,530 B1 | 4/2001 | Kadlec | |
| 6,247,018 B1 | 6/2001 | Rheaume | |
| 6,247,066 B1 | 6/2001 | Tanaka | |
| 6,269,403 B1 | 7/2001 | Anders | |
| 6,344,855 B1 | 2/2002 | Fisher et al. | |
| 6,362,870 B2 | 3/2002 | Mui et al. | |
| 6,385,727 B1 | 5/2002 | Cassagnol et al. | |
| 6,407,821 B1 | 6/2002 | Hohensee et al. | |
| 6,418,448 B1 | 7/2002 | Sarkar | |
| 6,427,230 B1 | 7/2002 | Goiffon et al. | |
| 6,447,184 B2 | 9/2002 | Kimura et al. | |
| 6,449,653 B2 | 9/2002 | Klemets et al. | |
| 6,457,017 B2 | 9/2002 | Watkins et al. | |
| 6,466,935 B1 | 10/2002 | Stuart | |
| 6,480,206 B2 | 11/2002 | Prinzing | |
| 6,498,657 B1 * | 12/2002 | Kuntz et al. | 358/1.15 |
| 6,505,219 B1 | 1/2003 | MacLean et al. | |
| 6,507,858 B1 | 1/2003 | Kanerva et al. | |
| 6,519,557 B1 | 2/2003 | Emens et al. | |
| 6,538,760 B1 | 3/2003 | Debry et al. | |
| 6,549,918 B1 | 4/2003 | Probert, Jr. et al. | |
| 6,571,279 B1 | 5/2003 | Herz et al. | |
| 6,583,789 B1 | 6/2003 | Carlson et al. | |
| 6,591,278 B1 | 7/2003 | Ernst | |
| 6,604,144 B1 | 8/2003 | Anders | |
| 6,608,693 B1 | 8/2003 | Loyd | |
| 6,609,200 B2 | 8/2003 | Anderson et al. | |
| 6,615,281 B1 | 9/2003 | Temple, III | |
| 6,654,147 B1 | 11/2003 | Ramot | |
| 6,657,647 B1 | 12/2003 | Bright | |
| 6,658,477 B1 | 12/2003 | Lisitsa et al. | |
| 6,674,540 B1 | 1/2004 | Wiechers et al. | |
| 6,675,353 B1 | 1/2004 | Friedman | |
| 6,675,356 B1 | 1/2004 | Adler et al. | |
| 6,681,223 B1 | 1/2004 | Sundaresan | |
| 6,715,126 B1 | 3/2004 | Chang et al. | |
| 6,763,343 B1 | 7/2004 | Brooke et al. | |
| 6,765,584 B1 | 7/2004 | Wloka et al. | |
| 6,771,291 B1 | 8/2004 | DiStefano, III | |
| 6,781,609 B1 | 8/2004 | Barker et al. | |
| 6,785,654 B2 * | 8/2004 | Cyr et al. | 704/270.1 |
| 6,789,229 B1 | 9/2004 | Dunietz | |
| 6,812,941 B1 | 11/2004 | Brown et al. | |
| 6,826,626 B1 | 11/2004 | McManus | |
| 6,867,874 B1 | 3/2005 | Shima | |
| 6,891,632 B2 | 5/2005 | Schwartz | |
| 6,910,843 B2 | 6/2005 | Saw et al. | |
| 6,917,976 B1 | 7/2005 | Slaughter et al. | |
| 6,925,597 B2 | 8/2005 | Anwar | |
| 6,925,631 B2 | 8/2005 | Golden | |
| 6,941,511 B1 | 9/2005 | Hind et al. | |
| 6,944,515 B2 | 9/2005 | Nakajima et al. | |
| 6,952,801 B2 | 10/2005 | Warmus et al. | |
| 6,968,557 B1 | 11/2005 | Zhang et al. | |
| 6,990,654 B2 | 1/2006 | Carroll, Jr. | |
| 6,992,785 B1 | 1/2006 | Chatcavage et al. | |
| 7,017,162 B2 | 3/2006 | Smith et al. | |
| 7,027,660 B2 | 4/2006 | Hersch et al. | |
| 7,043,688 B1 | 5/2006 | Tsutsumi et al. | |
| 7,047,237 B2 | 5/2006 | Suzuki et al. | |
| 7,051,276 B1 | 5/2006 | Mogilevsky et al. | |
| 7,051,330 B1 | 5/2006 | Kaler et al. | |
| 7,092,963 B2 | 8/2006 | Ryan et al. | |
| 7,103,625 B1 | 9/2006 | Hipp et al. | |
| 7,106,275 B2 | 9/2006 | Brunner et al. | |
| 7,131,060 B1 | 10/2006 | Azuma | |
| 7,134,071 B2 | 11/2006 | Ohwada et al. | |
| 7,136,941 B2 | 11/2006 | Nguyen et al. | |
| 7,162,538 B1 | 1/2007 | Cordova | |
| 7,171,471 B1 | 1/2007 | Nair | |
| 7,181,731 B2 | 2/2007 | Pace et al. | |
| 7,209,921 B2 | 4/2007 | Pace et al. | |
| 7,271,935 B2 | 9/2007 | Coons et al. | |
| 7,274,483 B2 | 9/2007 | Aiyama et al. | |
| 7,302,634 B2 | 11/2007 | Lucovsky et al. | |
| 7,359,902 B2 | 4/2008 | Ornstein et al. | |
| 7,426,525 B2 | 9/2008 | Sayers et al. | |
| 2001/0003828 A1 | 6/2001 | Peterson et al. | |
| 2001/0013043 A1 | 8/2001 | Wagner | |
| 2001/0018697 A1 | 8/2001 | Kunitake et al. | |
| 2001/0043358 A1 | 11/2001 | Schwartz | |
| 2001/0044809 A1 | 11/2001 | Parasnis et al. | |
| 2002/0002667 A1 | 1/2002 | Kelsey et al. | |
| 2002/0049790 A1 | 4/2002 | Ricker et al. | |
| 2002/0065848 A1 | 5/2002 | Walker et al. | |
| 2002/0073236 A1 | 6/2002 | Helgeson et al. | |
| 2002/0085020 A1 | 7/2002 | Carroll, Jr. | |
| 2002/0087602 A1 | 7/2002 | Masuda et al. | |
| 2002/0089691 A1 | 7/2002 | Fertlitsch et al. | |
| 2002/0099797 A1 | 7/2002 | Merrell et al. | |
| 2002/0107886 A1 | 8/2002 | Gentner et al. | |
| 2002/0111133 A1 | 8/2002 | Wittkotter | |
| 2002/0143523 A1 | 10/2002 | Balaji et al. | |
| 2002/0174145 A1 | 11/2002 | Duga | |
| 2002/0188638 A1 | 12/2002 | Hamscher | |
| 2003/0009672 A1 | 1/2003 | Goodman | |
| 2003/0018694 A1 | 1/2003 | Chen et al. | |
| 2003/0028560 A1 | 2/2003 | Kudrolli et al. | |
| 2003/0050932 A1 | 3/2003 | Pace et al. | |
| 2003/0078829 A1 | 4/2003 | Chen et al. | |
| 2003/0079181 A1 | 4/2003 | Schumacher et al. | |
| 2003/0093520 A1 | 5/2003 | Beesley | |
| 2003/0126136 A1 * | 7/2003 | Omoigui | 707/10 |
| 2003/0137539 A1 | 7/2003 | Dees | |
| 2003/0142325 A1 | 7/2003 | Leslie | |
| 2003/0149934 A1 | 8/2003 | Worden | |
| 2003/0158851 A1 | 8/2003 | Britton et al. | |
| 2003/0163552 A1 | 8/2003 | Savitzky et al. | |
| 2003/0163589 A1 | 8/2003 | Bunce et al. | |
| 2003/0167356 A1 | 9/2003 | Smith et al. | |
| 2003/0172168 A1 | 9/2003 | Mak et al. | |
| 2003/0182152 A1 | 9/2003 | Nakajima et al. | |

| | | |
|---|---|---|
| 2003/0182311 A1 | 9/2003 | Nakajima et al. |
| 2003/0182450 A1 | 9/2003 | Ong et al. |
| 2003/0182656 A1 | 9/2003 | Leathers et al. |
| 2003/0187534 A1 | 10/2003 | Suzuki et al. |
| 2003/0187612 A1 | 10/2003 | Miyake |
| 2003/0187870 A1 | 10/2003 | Nakajima et al. |
| 2003/0195784 A1 | 10/2003 | Smith, Jr. |
| 2003/0204495 A1 | 10/2003 | Lehnert |
| 2003/0229845 A1 | 12/2003 | Salesin et al. |
| 2003/0233420 A1 | 12/2003 | Stark et al. |
| 2004/0003388 A1 | 1/2004 | Jacquemot et al. |
| 2004/0003448 A1 | 1/2004 | Morrow et al. |
| 2004/0021905 A1 | 2/2004 | Holmstead et al. |
| 2004/0034848 A1 | 2/2004 | Moore et al. |
| 2004/0049737 A1 | 3/2004 | Simon Hunt et al. |
| 2004/0054669 A1 | 3/2004 | Seyrat et al. |
| 2004/0061729 A1 | 4/2004 | Green et al. |
| 2004/0066527 A1 | 4/2004 | Kloosterman et al. |
| 2004/0078755 A1 | 4/2004 | Shinjo et al. |
| 2004/0080764 A1 | 4/2004 | Sievert et al. |
| 2004/0103073 A1 | 5/2004 | Blake et al. |
| 2004/0111418 A1 | 6/2004 | Nguyen et al. |
| 2004/0117733 A1 | 6/2004 | Moreau et al. |
| 2004/0130741 A1 | 7/2004 | Ferlitsch |
| 2004/0139049 A1 | 7/2004 | Hancock et al. |
| 2004/0153467 A1 | 8/2004 | Conover |
| 2004/0160613 A1 | 8/2004 | Kurotsu et al. |
| 2004/0167941 A1 | 8/2004 | Prahlad et al. |
| 2004/0183837 A1 | 9/2004 | Watanabe et al. |
| 2004/0193599 A1 | 9/2004 | Liu et al. |
| 2004/0194025 A1 | 9/2004 | Hubert |
| 2004/0205623 A1 | 10/2004 | Weil |
| 2004/0205653 A1 | 10/2004 | Hadfield |
| 2004/0207869 A1 | 10/2004 | Endo |
| 2004/0216048 A1 | 10/2004 | Brown et al. |
| 2004/0225960 A1 | 11/2004 | Parikh et al. |
| 2004/0230608 A1 | 11/2004 | Ornstein et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0015767 A1 | 1/2005 | Nash et al. |
| 2005/0071385 A1 | 3/2005 | Rao |
| 2005/0086030 A1 | 4/2005 | Zeidman |
| 2005/0091574 A1 | 4/2005 | Maaniitty et al. |
| 2005/0097441 A1 | 5/2005 | Herbach et al. |
| 2005/0099398 A1 | 5/2005 | Garside et al. |
| 2005/0104894 A1 | 5/2005 | Sanborn et al. |
| 2005/0125720 A1 | 6/2005 | Little et al. |
| 2005/0132279 A1 | 6/2005 | Relyea et al. |
| 2005/0138540 A1 | 6/2005 | Baltus et al. |
| 2005/0144556 A1 | 6/2005 | Petersen et al. |
| 2005/0187803 A1 | 8/2005 | Jain et al. |
| 2005/0198069 A1 | 9/2005 | Cherry et al. |
| 2005/0210026 A1 | 9/2005 | Wood |
| 2005/0210227 A1 | 9/2005 | Emerson et al. |
| 2005/0223312 A1 | 10/2005 | Erdtmann et al. |
| 2005/0278240 A1 | 12/2005 | Delenda |
| 2005/0278616 A1 | 12/2005 | Eller |
| 2005/0278626 A1 | 12/2005 | Malik |
| 2005/0286063 A1 | 12/2005 | Owen et al. |
| 2006/0031749 A1 | 2/2006 | Schramm et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080316 A1 | 4/2006 | Gilmore et al. |
| 2006/0117019 A1 | 6/2006 | Sylthe et al. |
| 2006/0117268 A1 | 6/2006 | Talley et al. |
| 2006/0136827 A1 | 6/2006 | Villaron et al. |
| 2006/0146353 A1 | 7/2006 | Yue et al. |
| 2006/0155529 A1 | 7/2006 | Ludviksson et al. |
| 2006/0206794 A1 | 9/2006 | Ornstein et al. |
| 2008/0021923 A1 | 1/2008 | Sedky et al. |

OTHER PUBLICATIONS

Official Notice of Rejection for China Patent Application No. 200480001329.4 Mailed On Dec. 18, 2007, pp. 16.

"@tryinCSS3 (was Useragent Rules in CSS)"; Mar. 31, 2004; http://lists.w3.org/Archives/Public/www-style/2004Mar/0333.html.; 2 pages.

"[Editorial Draft] Versioning XML Languages"; Proposed TAG Finding Nov. 16, 2003; http://www.w3.org/2001/tag/doc/versioning-20031116; 23 pages.

Bluethman, et al., "Interleaved Graphics and Text"; IBM Technical Bulletin, Apr. 1980, vol. 22, No. 4; Oct. 1986; pp. 4813-4815.

Christodoulakis, et al., "Multimedia Document Presentation, Information Extraction, and Document Formation in MINOS: A Model and a System"; ACM Transaction on Office Information Systems, vol. 4, No. 4: Oct. 1986; pp. 345-383.

"Controlling the Data Chaos by Adding Intelligence to Media"; 4 pages. 2004.

El-Kwae, et al., "Document Image Representation Using XML Technologies"; Proceedings of SPIE, vol. 4670, 2001, pp. 109-120.

Girardot et al. "Efficient Representation and Streaming XML Content Over the Internet Medium"; IEEE 2000, pp. 67-70.

Holman; "What is XSL-FO", Google Mar. 20, 2002, pp. 1-4.

Miller; "An Introduction to the Resource Description Framework"; D-Lib Magazine, May 1998; ISSN 1082-9873; http://www.dlib.org/dlib/may98/miller/05miller.html. 10 pages.

Open eBook Publication Structure 1.2, Open eBook Forum, Aug. 2002, pp. 1-93.

Orchard et al [Editorial Draft] Versioning XML Languages W3C Proposed TAG finding. Nov. 16 2003, pp. 1-23.

Pawson; "Printing from XML: An Introduction to XSL-FO", Google Oct. 9, 2002, pp. 1-4.

"SOAP Version 1.2 Part 1: Messaging Framework"; W3C Proposed Recommendation May 7, 2003; http://www.w3.org/TR/2003/PR-soap12-part1-20030507. 25 pages.

"SVG Print", W3C Working Draft, Jul. 15, 2003 http://www.w3.org/TR/2003/WD-SVGPrint-20030715/ pp. 1-14.

"URIQA! The URI Query Agent Model, A Semantic Web Enabler"; URIQA: The Nokia Query Agent; http://sw.nokia.com/uriga/URIQA.html.; 9 pages 2004.

"XMP Adding Intelligence to Media"; XMP Specification, Jan. 2004, 11 pages.

Chien, et al,, "Effcient Schemes for Managing Multiversion XML Documents", University of California, California, Dec. 19, 2002, pp. 332-353.

Han, et al., "WebSplitter: A Unified XML Framework for Multi-Device Collaborative web browsing" IBM Thomas J. Watson research Centre, Hawthorne, CSCW, Dec. 2-6, 2000, ACM 1-58113-222-0/00/0012, pp. 221-230.

Hardy, et al., "Mapping and Displaying Structural Transformations between XML and PDF", ACM, 2002, pp. 95-102.

Peters et al., "CrystalWeb—A distributed authoring environment for the World-Wide Web" Computer Networks and ISDN Systems, North Holland Publishing. Amsterdam, NL. vol. 27, No. 6, Apr. 1995, pp. 861-870.

Marco et al., A Framework for Designing and Implementing the Ada Standard Container Library, ACM 2003, pp. 49-61.

Orchard, David; "Versioning XML Vocabularies" published on XML.com Dec. 3, 2003, pp. 1-10.

Ellis et al., "Postscript, Bezier Curves and Chinese Character", ACM, 1989, pp. 162-165.

"Apache Server Frequently Asked Questions"; Apache HTTP Server Version 1.3; http://httpd.apache.org/docs/misc/FAQ.html.; Apr. 19, 2004; 35 pages.

"Interleaved Graphics and Text" Bluethman et al., IBM Technical Disclosure Bulletin, Apr. 1980, vol. 22, No. 11, pp. 4813-4815.

"Networked File System"; http://www.scit.wlv.ac.uk/~jphb/comms/nfs.htm.; Apr. 19, 2004; 6 pages.

Akerlof, "The Market for "Lemons": Quality Uncertainty and the Market Mechanism", Quarterly Journal of Economics, vol. 84, Issue 3, Aug. 1970, pp. 488-500.

Devanur, et al., "An Improved Approximation Scheme for Computing Arrow-Debreu Prices for the Linear Case", retrieved on Nov. 10, 2008 at <<http://www.cc.gatech.edu/~nikhil/pubs/fsttcs.pdf>>, 2003, pp. 1-8.

Geanakoplos, et al., "The Arrow-Debreu Model of General Equilibrium", retrieved on Nov. 10, 2008 at <<cowles.econ.yale.edu>>, Cowles Foundation for Research in Economics at Yale University, 2004.

Jain, et al., "A Polynomial Time Algorithm for Computing an Arrow-Debreu Market Equilibrium for Linear Utilities", Proceedings of the 45th Annual IEEE Symposium on Foundations of Computer Science (FOCS '04), IEEE, 2004, pp. 1-9.

Jain, et al., "Approximating Market Equilibria", Springerlink, LNCS 2764, 2003, pp. 1-11.

Levy, et al., "Non-Distorted Texture Mapping for Sheared Triangulated Meshes", The 25th Conference on Computer Graphics and Interactive Techniques, ACM, 1998, pp. 343-352.

Shade, et al., "Layered Depth Images", The 25th Annual Conference on Computer Graphics and Interactive Techniques, ACM, 1998, pp. 231-242.

"Versioning XML Languages [Editorial Draft]", Proposed TAG Finding, available at <<http://www.w3.org/2001/tag/doc/versioning-20031116>>, Nov. 16, 2003, 23 pages.

Reguero, et al., "Large Scale Print Spool Service", retrieved on Jan. 21, 2009 at <<http://citeseerx.ist.psu.edu/viewdoc/summary?doi=10.1.1.107.7406>>, Proceedings of the Twelfth Systems Administration Conference (LISA 1998), Boston, Massachusetts, Dec. 6-100, 1998, pp. 1-15.

Eisenberg, et al., "Consensus of Subjective Probabilities: The Pari-Mutuel Method", Annals of Mathematical Statistics, 1959, pp. 165-168.

"Adobe Photoshop release history", Wikipedia, Oct. 28, 2008, pp. 1-7, Release May 1998.

Ashcraft, et al., "SPOOLES: An Object-Oriented Sparse Matrix Library", retrieved on Jan. 21, 2009 at <<http://citeseerx.ist.psu.edu/viewdoc/summary?doi=10.1.1.44.5809>>, Proceedings of the 9th SIAM Conference on Parallel Processing for Scientific Computing, pp. 1-10, Mar. 22-24, 1999.

Kanzaki, "RSS - Summary and Release of Site Information," retrieved on Feb. 17, 2010 from <<http://web.archive.org/web/20040408231744/http://www.kanzaki.com/docs/sw/rss.html>>, Mar. 2, 2004.

Sun Microsystems, "JAR File Specification", retrieved on Feb. 17, 2010 at <<http://java.sun.com/j2se/1.5.0/docs/guide/jar/jar.html>>, 2003.

"Windows NT 4.0", Wikipedia, Nov. 6, 2008, pp. 1-9, Released date Jul. 29, 1996.

* cited by examiner

METHOD AND APPARATUS FOR MAINTAINING RELATIONSHIPS BETWEEN PARTS IN A PACKAGE

RELATED APPLICATIONS

This application is a Divisional of co-pending application Ser. No. 10/837,041, filed Apr. 30, 2004, entitled "Method and Apparatus for Maintaining Relationships Between Parts in a Package", and incorporated herein by reference.

TECHNICAL FIELD

This invention relates to a content framework, document format and related methods and systems that can utilize both.

BACKGROUND

Typically today, there are many different types of content frameworks to represent content, and many different types of document formats to format various types of documents. Many times, each of these frameworks and formats requires its own associated software in order to build, produce, process or consume an associated document. For those who have the particular associated software installed on an appropriate device, building, producing, processing or consuming associated documents is not much of a problem. For those who do not have the appropriate software, building, producing, processing or consuming associated documents is typically not possible.

Against this backdrop, there is a continuing need for ubiquity insofar as production and consumption of documents is concerned.

SUMMARY

Modular content framework and document format methods and systems are described. The described framework and format define a set of building blocks for composing, packaging, distributing, and rendering document-centered content. These building blocks define a platform-independent framework for document formats that enable software and hardware systems to generate, exchange, and display documents reliably and consistently. The framework and format have been designed in a flexible and extensible fashion.

In addition to this general framework and format, a particular format, known as the reach package format, is defined using the general framework. The reach package format is a format for storing paginated documents. The contents of a reach package can be displayed or printed with full fidelity among devices and applications in a wide range of environments and across a wide range of scenarios.

DETAILED DESCRIPTION

Overview

This document describes a modular content framework and document format. The framework and format define a set of building blocks for composing, packaging, distributing, and rendering document-centered content. These building blocks define a platform-independent framework for document formats that enable software and hardware systems to generate, exchange, and display documents reliably and consistently. The framework and format have been designed in a flexible and extensible fashion. In various embodiments, there is no restriction to the type of content that can be included, how the content is presented, or the platform on which to build clients for handling the content.

In addition to this general framework, a particular format is defined using the general framework. This format is referred to as the reach package format in this document, and is a format for storing paginated or pre-paginated documents. The contents of a reach package can be displayed or printed with full fidelity among devices and applications in a wide range of environments and across a wide range of scenarios.

One of the goals of the framework described below is to ensure the interoperability of independently-written software and hardware systems reading or writing content produced in accordance with the framework and format described below. In order to achieve this interoperability, the described format defines formal requirements that systems that read or write content must satisfy.

The discussion below is organized along the following lines and presented in two main sections—one entitled "The Framework" and one entitled "The Reach Package Format".

The section entitled "The Framework" presents an illustrative packaging model and describes the various parts and relationships that make up framework packages. Information about using descriptive metadata in framework packages is discussed, as well as the process of mapping to physical containers, extending framework markup, and the use of framework versioning mechanisms.

The section entitled "The Reach Package Format" explores the structure of one particular type of framework-built package referred to as the reach package. This section also describes the package parts specific to a fixed payload and defines a reach package markup model and drawing model. This section concludes with exemplary reach markup elements and their properties along with illustrated samples.

Figure 1:
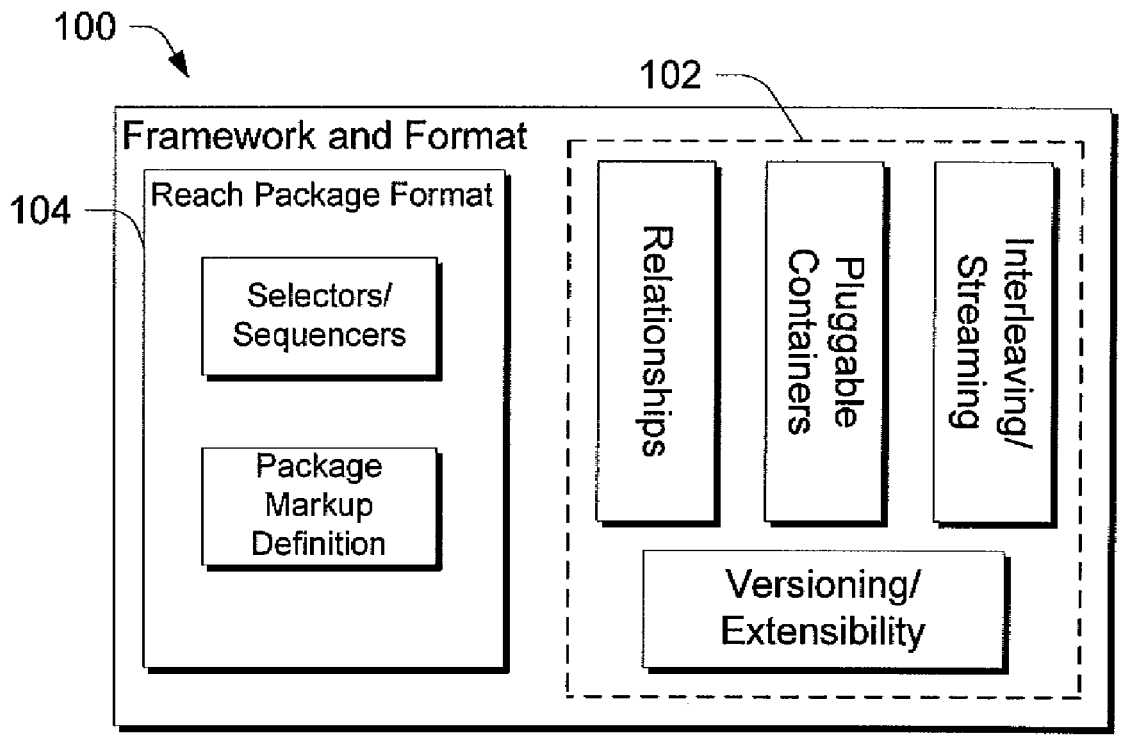
FIG. 1 is a block diagram of components of an exemplary framework and format in accordance with one embodiment.

As a high level overview of the discussion that follows, consider FIG. 1 which illustrates aspects of the inventive framework and format generally at 100. Certain exemplary components of the framework are illustrated at 102, and certain components of the reach package format are illustrated at 104.

Framework 102 comprises exemplary components which include, without limitation, a relationship component, a pluggable containers component, an interleaving/streaming component and a versioning/extensibility component, each of which is explored in more detail below. Reach package format 104 comprises components which include a selector/sequencer component and a package markup definition component.

In the discussion that follows below, periodic reference will be made back to FIG. 1 so that the reader can maintain perspective as to where the described components fit in the framework and package format.

The Framework

In the discussion that follows, a description of a general framework is provided. Separate primary sub-headings include "The Package Model", "Composition Parts: Selector and Sequence", "Descriptive Metadata", "Physical Model", "Physical Mappings" and "Versioning and Extensibility". Each primary sub-heading has one or more related sub-headings.

The Package Model

This section describes the package model and includes sub-headings that describe packages and parts, drivers, relationships, package relationships and the start part.

Packages and Parts

Figure 2:
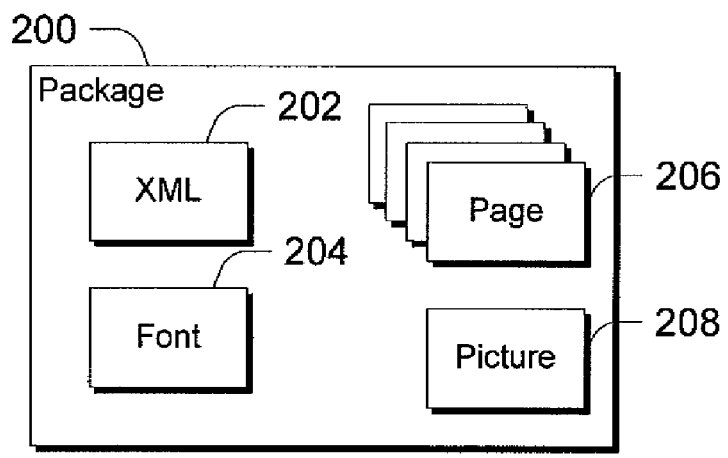
FIG. 2 is a block diagram of an exemplary package holding a document comprising a number of parts in accordance with one embodiment.

In the illustrated and described model, content is held within a package. A package is a logical entity that holds a collection of related parts. The package's purpose is to gather up all of the pieces of a document (or other types of content) into one object that is easy for programmers and end-users to work with. For example, consider FIG. 2 which illustrates an exemplary package 200 holding a document comprising a number of parts including an XML markup part 202 representing the document, a font part 204 describing a font that is used in the document, a number of page parts 206 describing pages of the document, and a picture part representing a picture within the document. The XML markup part 202 that represents a document is advantageous in that it can permit easy searchability and referencing without requiring the entire content of a package to be parsed. This will become more apparent below.

Figure 3:
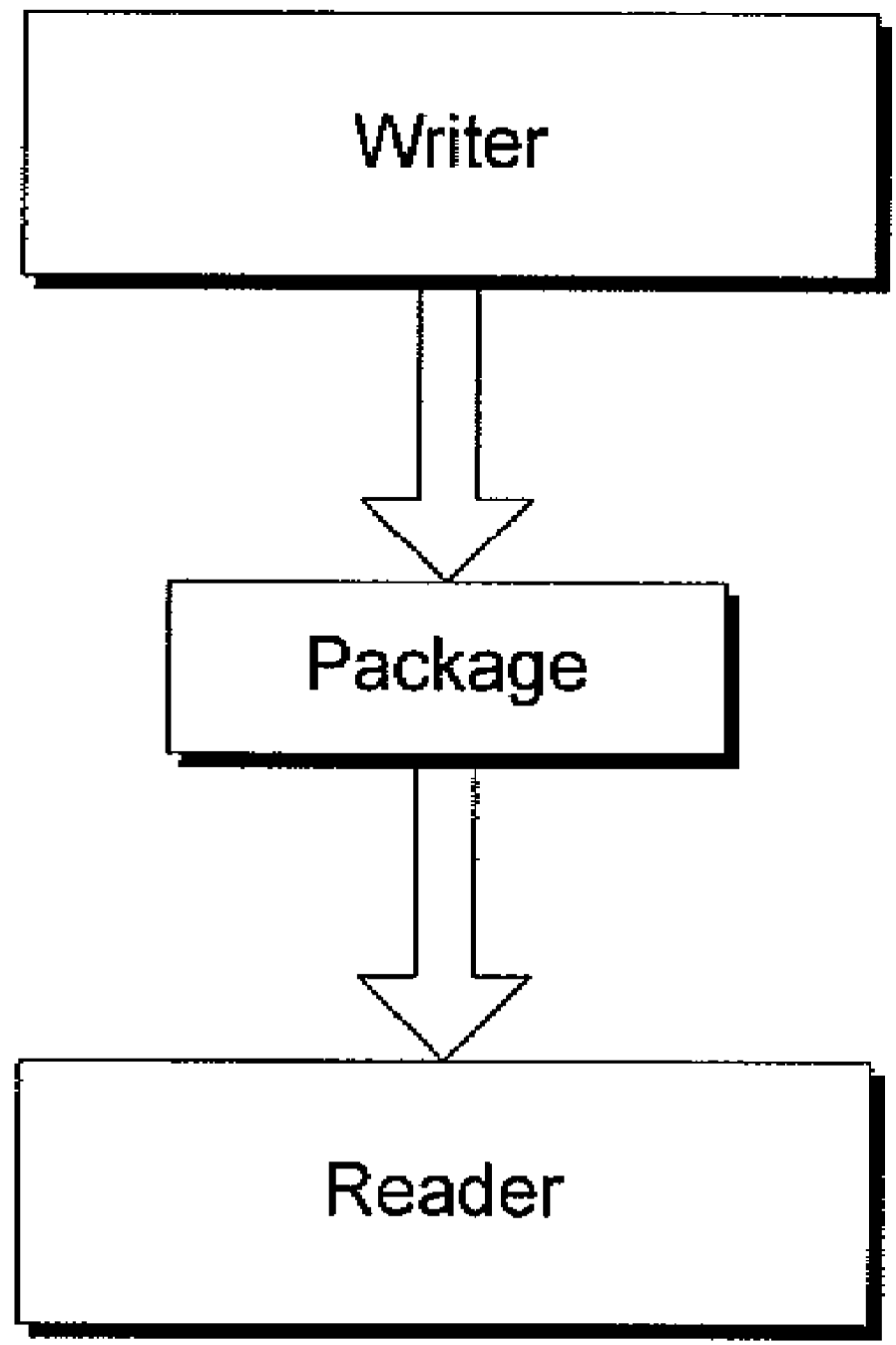
FIG. 3 is a block diagram that illustrates an exemplary writer that produces a package, and a reader that reads the package, in accordance with one embodiment.

Throughout this document the notion of readers (also referred to as consumers) and writers (also referred to as producers) is introduced and discussed. A reader, as that term is used in this document, refers to an entity that reads modular content format-based files or packages. A writer, as that term is used in this document, refers to an entity that writes modular content format-based files or packages. As an example, consider FIG. 3, which shows a writer that produces a package and a reader that reads a package. Typically, the writer and reader will be embodied as software. In at least one embodiment, much of the processing overhead and complexities associated with creating and formatting packages is placed on the writer. This, in turn, removes much of the processing complexity and overhead from readers which, as will be appreciated by the skilled artisan, is a departure from many current models. This aspect will become apparent below.

In accordance with at least one embodiment, a single package contains one or more representations of the content held in the package. Often a package will be a single file, referred to in this application as a container. This gives end-users, for example, a convenient way to distribute their documents with all of the component pieces of the document (images, fonts, data, etc.). While packages often correspond directly to a single file, this is not necessarily always so. A package is a logical entity that may be represented physically in a variety of ways (e.g., without limitation, in a single file, a collection of loose files, in a database, ephemerally in transit over a network connection, etc.). Thus containers hold as packages, but not all packages are stored in containers.

An abstract model describes packages independently of any physical storage mechanism. For example, the abstract model does not refer to "files", "streams", or other physical terms related to the physical world in which the package is located. As discussed below, the abstract model allows users to create drivers for various physical formats, communication protocols, and the like. By analogy, when an application wants to print an image, it uses an abstraction of a printer presented by the driver that understands the specific kind of printer). Thus, the application is not required to know about the specific printing device or how to communicate with the printing device.

A container provides many benefits over what might otherwise be a collection of loose, disconnected files. For example, similar components may be aggregated and content may be indexed and compressed. In addition, relationships between components may be identified and rights management, digital signatures, encryption and metadata may be applied to components. Of course, containers can be used for and can embody other features which are not specifically enumerated above.

Common Part Properties

In the illustrated and described embodiment, a part comprises common properties (e.g., name) and a stream of bytes. This is analogous to a file in a file system or a resource on an HTTP server. In addition to its content, each part has some common part properties. These include a name—which is the name of the part, and a content type—which is the type of content stored in the part. Parts may also have one or more associated relationships, as discussed below.

Part names are used whenever it is necessary to refer in some way to a part. In the illustrated and described embodiment, names are organized into a hierarchy, similar to paths on a file system or paths in URIs. Below are examples of part names:

```
/document.xml
/tickets/ticket.xml
/images/march/summer.jpeg
/pages/page4.xml
```

As seen above, in this embodiment, part names have the following characteristics:

Part names are similar to file names in a traditional file system.

Part names begin with a forward slash ('/').

Like paths in a file-system or paths in a URI, part names can be organized into a hierarchy by a set of directory-like names (tickets, images/march and pages in the above examples).

This hierarchy is composed of segments delineated by slashes.

The last segment of the name is similar to a filename a traditional file-system.

It is important to note that the rules for naming parts, especially the valid characters that can be used for part names, are specific to the framework described in this document. These part name rules are based on internet-standard URI naming rules. In accordance with this embodiment, the grammar used for specifying part names in this embodiment exactly matches abs_path syntax defined in Sections 3.3 (Path Component) and 5 (Relative URI References) of RFC2396, (Uniform Resource Identifiers (URI: Generic Syntax) specification.

The following additional restrictions are applied to abs_path as a valid part name:

Query Component, as it is defined in Sections 3 (URI Syntactic Components) and 3.4 (Query Component), is not applicable to a part name.

Fragment identifier, as it is described in Section 4.1 (Fragment Identifier), is not applicable to a part name.

It is illegal to have any part with a name created by appending "/" segment) to the part name of an existing part.

Grammar for part names is shown below:

| | |
|---|---|
| part_name = | "/" segment * ( "/" segment ) |
| segment = | *pchar |
| pchar = | unreserved \| escaped \| |
| | ":" \| "@" \| "&" \| "=" \| "+" \| "$" \| "," |
| unreserved = | alphanum \| mark |
| escaped = | "%" hex hex |
| hex = | digit \| "A" \| "B" \| "C" \| "D" \| "E" \| "F" \| |
| | "a" \| "b" \| "c" \| "d" \| "e" \| "f" |
| mark = | "-" \| "_" \| "." \| "!" \| "~" \| "*" \| "'" \| "(" \| ")" |
| alpha = | lowalpha \| upalpha |
| lowalpha = | "a" \| "b" \| "c" \| "d" \| "e" \| "f" \| "g" \| "h" \| "i" \| |
| | "j" \| "k" \| "l" \| "m" \| "n" \| "o" \| "p" \| "q" \| "r" \| |
| | "s" \| "t" \| "u" \| "v" \| "w" \| "x" \| "y" \| "z" |
| upalpha = | "A" \| "B" \| "C" \| "D" \| "E" \| "F" \| "G" \| "H" \| "I" \| |
| | "J" \| "K" \| "L" \| "M" \| "N" \| "O" \| "P" \| "Q" \| "R" \| |
| | "S" \| "T" \| "U" \| "V" \| "W" \| "X" \| "Y" \| "Z" |
| digit = | "0" \| "1" \| "2" \| "3" \| "4" \| "5" \| "6" \| "7" \| |
| | "8" \| "9" |
| alphanum = | alpha \| digit |

The segments of the names of all parts in a package can be seen to form a tree. This is analogous to what happens in file systems, in which all of the non-leaf nodes in the tree are folders and the leaf nodes are the actual files containing content. These folder-like nodes (i.e., non-leaf nodes) in the name tree serve a similar function of organizing the parts in the package. It is important to remember, however, that these "folders" exist only as a concept in the naming hierarchy—they have no other manifestation in the persistence format.

Part names can not live at the "folder" level. Specifically, non-leaf nodes in the part naming hierarchy ("folder") cannot contain a part and a subfolder with the same name.

In the illustrated and described embodiment, every part has a content type which identifies what type of content is stored in a part. Examples of content types include:

```
image/jpeg
text/xml
text/plain; charset="us-ascii"
```

Content types are used in the illustrated framework as defined in RFC2045 (Multipurpose Internet Mail Extensions; (MIME)). Specifically, each content type includes a media type (e.g., text), a subtype (e.g., plain) and an optional set of parameters in key=value form (e.g., charset="us-ascii"); multiple parameters are separated by semicolons.

Part Addressing

Often parts will contain references to other parts. As a simple example, imagine a container with two parts: a markup file and an image. The markup file will want to hold a reference to the image so that when the markup file is processed, the associated image can be identified and located. Designers of content types and XML schemas may use URIs to represent these references. To make this possible, a mapping between the world of part names and world of URIs needs to be defined.

In order to allow the use of URIs in a package, a special URI interpretation rule must be used when evaluating URIs in package-based content: the package itself should be treated as the "authority" for URI references and the path component of the URI is used to navigate the part name hierarchy in the package.

For example, given a package URI of http://www.example.com/foo/something.package, a reference to /abc/bar.xml is interpreted to mean the part called /abc/bar.xml, not the URI http://www.example.com/abc/bar.xml.

Relative URIs should be used when it is necessary to have a reference from one part to another in a container. Using relative references allows the contents of the container to be moved together into a different container (or into the container from, for example, the file system) without modifying the cross-part references.

Relative references from a part are interpreted relative to the "base URI" of the part containing the reference. By default, the base URI of a part is the part's name.

Consider a container which includes parts with the following names:

```
/markup/page.xml
/images/picture.jpeg
/images/other_picture.jpeg
```

If the "/markup/page.xml" part contains a URI reference to ". . . /images/picture.jpeg", then this reference must be interpreted as referring to the part name "/images/picture.jpeg", according to the rules above.

Some content types provide a way to override the default base URI by specifying a different base in the content. In the presence of one of these overrides, the explicitly specified base URI should be used instead of the default.

Sometimes it is useful to "address" a portion or specific point in a part. In the URI world, a fragment identifier is used [see, e.g. RFC2396]. In a container, the mechanism works the same way. Specifically, the fragment is a string that contains additional information that is understood in the context of the content type of the addressed part. For example, in a video file a fragment might identify a frame, in an XML file it might identify a portion of the XML file via an xpath.

A fragment identifier is used in conjunction with a URI that addresses a part to identify fragments of the addressed part. The fragment identifier is optional and is separated from the URI by a crosshatch ("#") character. As such, it is not part of a URI, but is often used in conjunction with a URI.

The following discussion provides some guidance for part naming, as the package and part naming model is quite flexible. This flexibility allows for a wide range of applications of a framework package. However, it is important to recognize that the framework is designed to enable scenarios in which multiple, unrelated software systems can manipulate "their own" parts of a package without colliding with each other. To allow this, certain guidelines are provided which, if followed, make this possible.

The guidelines given here describe a mechanism for minimizing or at least reducing the occurrences of part naming conflicts, and dealing with them when they do arise. Writers creating parts in a package must take steps to detect and handle naming conflicts with existing parts in the package. In the event that a name conflict arises, writers may not blindly replace existing parts.

In situations where a package is guaranteed to be manipulated by a single writer, that writer may deviate from these guidelines. However, if there is a possibility of multiple independent writers sharing a package, all writers must follow these guidelines. It is recommended, however, that all writers follow these guidelines in any case.

- It is required that writers adding parts into an existing container do so in a new "folder" of the naming hierarchy, rather than placing parts directly in the root, or in a pre-existing folder. In this way, the possibility of name conflicts is limited to the first segment of the part name. Parts created within this new folder can be named without risking conflicts with existing parts.
- In the event that the "preferred" name for the folder is already used by an existing part, a writer must adopt some strategy for choosing alternate folder names. Writers should use the strategy of appending digits to the preferred name until an available folder name is found (possibly resorting to a GUID after some number of unsuccessful iterations).
- One consequence of this policy is that readers must not attempt to locate a part via a "magic" or "well known" part name. Instead, writers must create a package relationship to at least one part in each folder they create. Readers must use these package relationships to locate the parts rather than relying on well known names.
- Once a reader has found at least one part in a folder (via one of the aforementioned package relationships) it may use conventions about well known part names within that folder to find other parts.

Drivers

The file format described herein can be used by different applications, different document types, etc.—many of which have conflicting uses, conflicting formats, and the like. One or more drivers are used to resolve various conflicts, such as differences in file formats, differences in communication protocols, and the like. For example, different file formats include loose files and compound files, and different communication protocols include http, network, and wireless protocols. A group of drivers abstract various file formats and communication protocols into a single model. Multiple drivers can be provided for different scenarios, different customer requirements, different physical configurations, etc.

Relationships

Parts in a package may contain references to other parts in that package. In general, however, these references are represented inside the referring part in ways that are specific to the content type of the part; that is, in arbitrary markup or an application-specific encoding. This effectively hides the internal linkages between parts from readers that don't understand the content types of the parts containing such references.

Even for common content types (such as the Fixed Payload markup described in the Reach Package section), a reader would need to parse all of the content in a part to discover and resolve the references to other parts. For example, when implementing a print system that prints documents one page at a time, it may be desirable to identify pictures and fonts contained in the particular page. Existing systems must parse all information for each page, which can be time consuming, and must understand the language of each page, which may not be the situation with certain devices or readers (e.g., ones that are performing intermediate processing on the document as it passes through a pipeline of processors on the way to a device). Instead, the systems and methods described herein use relationships to identify relationships between parts and to describe the nature of those relationships. The relationship language is simple and defined once so that readers can understand relationships without requiring knowledge of multiple different languages. In one embodiment, the relationships are represented in XML as individual parts. Each part has an associated relationship part that contains the relationships for which the part is a source.

For example, a spreadsheet application uses this format and stores different spreadsheets as parts. An application that knows nothing about the spreadsheet language can still discover various relationships associated with the spreadsheets. For example, the application can discover images in the spreadsheets and metadata associated with the spreadsheets. An example relationship schema is provided below:

```
<?xml version="1.0"?>
<xsd:schema xmlns:mmcfrels="http://mmcfrels-PLACEHOLDER"
    xmlns:xsd="http://www.w3.org/2001/XMLSchema">
    <xsd:attribute name="Target" type="xsd:string"/>
    <xsd:attribute name="Name" type="xsd:string"/>
    <xsd:element name="Relationships">
        <xsd:complexType>
            <xsd:sequence>
                <xsd:element ref="Relationship" minOccurs="0"
                    maxOccurs="unbounded"/>
            </xsd:sequence>
        </xsd:complexType>
    </xsd:element>
    <xsd:element name="Relationship">
        <xsd:complexType>
            <xsd:simpleContent>
                <xsd:extension base="xsd:string">
                    <xsd:attribute ref="Target"/>
                    <xsd:attribute ref="Name"/>
                </xsd:extension>
            </xsd:simpleContent>
        </xsd:complexType>
    </xsd:element>
</xsd:schema>
```

This schema defines two XML elements, one called "relationships" and one called "relationship." This "relationship" element is used to describe a single relationship as described herein and has the following attributes: (1) "target," which indicates the part to which the source part is related, (2) "name" which indicates the type or nature of the relationship. The "relationships" element is defined to allow it to hold zero or more "relationship" elements and serves simply to collect these "relationship" elements together in a unit.

The systems and methods described herein introduce a higher-level mechanism to solve these problems called "relationships". Relationships provide an additional way to represent the kind of connection between a source part and a target part in a package. Relationships make the connections between parts directly "discoverable" without looking at the content in the parts, so they are independent of content-specific schema and faster to resolve. Additionally, these relationships are protocol independent. A variety of different relationships may be associated with a particular part.

Relationships provide a second important function: allowing parts to be related without modifying them. Sometimes this information serves as a form of "annotation" where the content type of the "annotated" part does not define a way to attach the given information. Potential examples include attached descriptive metadata, print tickets and true annotations. Finally, some scenarios require information to be attached to an existing part specifically without modifying that part—for example, when the part is encrypted and can not be decrypted or when the part is digitally signed and changing it would invalidate the signature. In another example, a user may want to attach an annotation to a JPEG image file. The JPEG image format does not currently provide support for identifying annotations. Changing the JPEG format to accommodate this user's desire is not practical. However, the systems and methods discussed herein allow the user to provide an annotation to a JPEG file without modifying the JPEG image format.

In one embodiment, relationships are represented using XML in relationship parts. Each part in the container that is the source of one or more relationships has an associated relationship part. This relationship part holds (expressed in XML using the content type application/PLACEHOLDER) the list of relationships for that source part.

Figure 4:
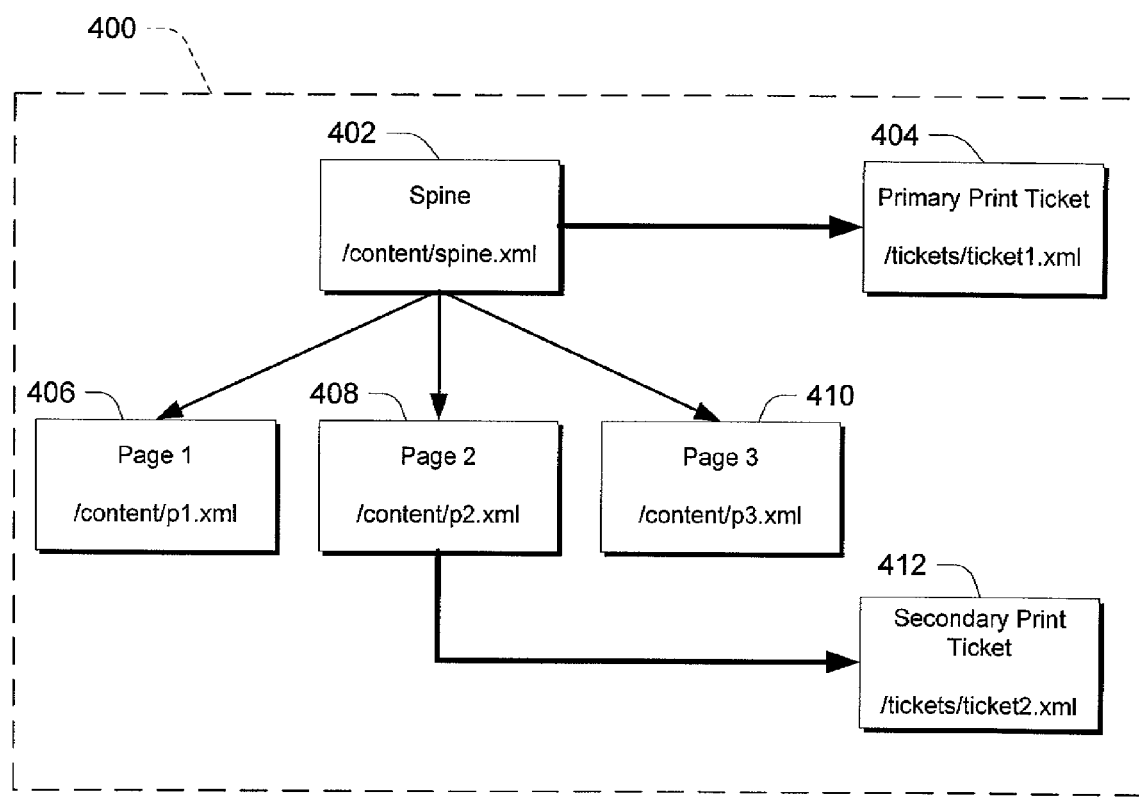
FIG. 4 illustrates an example part that binds together three separate pages.

FIG. 4 below shows an environment 400 in which a "spine" part 402 (similar to a FixedPanel) binds together three pages 406, 408 and 410. The set of pages bound together by the spine has an associated "print ticket" 404. Additionally, page 2 has its own print ticket 412. The connections from the spine part 402 to its print ticket 404 and from page 2 to its print ticket 412 are represented using relationships. In the arrangement of FIG. 4, the spine part 402 would have an associated relationship part which contained a relationship that connects the spine to ticket1, as shown in the example below.

```
<Relationships xmlns="http://mmcfrels-PLACEHOLDER">
  <Relationship
    Target="../tickets/ticket1.xml"
    Name="http://mmcf-printing-ticket/PLACEHOLDER"/>
</Relationships>
```

Relationships are represented using <Relationship> elements nested in a single <Relationships> element. These elements are defined in the http://mmcfrels (PLACEHOLDER) namespace. See the example schema above, and related discussion, for example relationships.

The relationship element has the following additional attributes:

| Attribute | Required | Meaning |
|---|---|---|
| Target | Yes | A URI that points to the part at the other end of the relationship. Relative URIs MUST be interpreted relative to the source part. |
| Name | Yes | An absolute URI that uniquely defines the role or purpose of the relationship. |

The Name attribute is not necessarily an actual address. Different types of relationships are identified by their Names. These names are defined in the same way that namespaces are defined for XML namespaces. Specifically, by using names patterned after the Internet domain name space, non-coordinating parties can safely create non-conflicting relationship names—just as they can for XML namespaces.

The relationships part is not permitted to participate in other relationships. However, it is a first class part in all other senses (e.g., it is URI addressable, it can be opened, read, deleted, etc.). Relationships do not typically point at things outside the package. URIs used to identify relationship targets do not generally include a URI scheme.

A part and its associated relationship part are connected by a naming convention. In this example, the relationship part for the spine would be stored in /content/_rels/spine.xml.rels and the relationships for page 2 would be stored in /content/_rels/p2.xml.rels. Note two special naming conventions being used here. First, the relationship part for some (other) part in a given "folder" in the name hierarchy is stored in a "subfolder" called _rels (to identify relationships). Second, the name of this relationship-holding part is formed by appending the .rels extension to the name of the original part. In particular embodiments, relationship parts are of the content type application/xml+relationshipsPLACEHOLDER.

A relationship represents a directed connection between two parts. Because of the way that the relationship is being represented, it is efficient to traverse relationships from their source parts (since it is trivial to find the relationships part for any given part). However, it is not efficient to traverse relationships backwards from the target of the relationship (since the way to find all of the relationships to a part is to look through all of the relationships in the container).

In order to make backwards traversal of a relationship possible, a new relationship is used to represent the other (traversable) direction. This is a modeling technique that the designer of a type of relationship can use. Following the example above, if it were important to be able to find the spine that has ticket1 attached, a second relationship would be used connecting from the ticket to the spine, such as:

In content/_rels/p1.xml.rels:

```
<Relationships xmlns="http://mmcfrels-PLACEHOLDER">
  <Relationship
    Target="/content/spine.xml"
    Name="http://mmcf-printing-spine/PLACEHOLDER"/>
</Relationships>
```

Package Relationships

"Package Relationships" are used to find well-known parts in a package. This method avoids relying on naming conventions for finding parts in a package, and ensures that there will not be collisions between identical part names in different payloads.

Package relationships are special relationships whose target is a part, but whose source is not: the source is the package as a whole. To have a "well-known" part is really to have a "well-known" relationship name that helps you find that part.

This works because there is a well-defined mechanism to allow relationships to be named by non-coordinating parties, while certain embodiments contain no such mechanism for part name—those embodiments are limited to a set of guidelines. The package relationships are found in the package relationships part and is named using the standard naming conventions for relationship parts. Thus: it's named "/_rels/.rels"

Relationships in this package relationships part are useful in finding well-known parts.

The Start Part

One example of a package-level, well-known part is the package "start" part. This is the part that is typically processed when a package is opened. It represents the logical root of the document content stored in the package. The start part of a package is located by following a well-known package relationship. In one example, this relationship has the following name: http://mmcf-start-part-PLACEHOLDER.

Composition Parts: Selector and Sequence

The described framework defines two mechanisms for building higher-order structures from parts: selectors and sequences.

A selector is a part which "selects" between a number of other parts. For example, a selector part might "select" between a part representing the English version of a document and a part representing the French version of a document. A sequence is a part which "sequences" a number of other parts. For example, a sequence part might combine (into a linear sequence) two parts, one of which represents a five-page document and one of which represents a ten-page document.

These two types of composition parts (sequence and selector) and the rules for assembling them comprise a composition model. Composition parts can compose other composition parts, so one could have, for example, a selector that selects between two compositions. As an example, consider FIG. 5, which shows and example of a financial report containing both an English representation and a French representation. Each of these representations is further composed of an introduction (a cover page) followed by the financials (a spreadsheet). In this example, a selector 500 selects between the English and French representation of the report. If the English representation is selected, sequence 502 sequences the English introduction part 506 with the English financial part 508. Alternately, if the French representation is selected, sequence 504 sequences the French introduction part 510 with the French financial part 512.

Composition Part XML

In the illustrated and described embodiment, composition parts are described using a small number of XML elements, all drawn from a common composition namespace. As an example, consider the following:

```
Element: <selection>
Attributes: None
Allowed Child Elements: <item>
Element: <sequence>
Attributes: None
Allowed Child Elements: <item>
Element: <item>
Attributes: Target - the part name of a part in the composition
```

Figure 5:
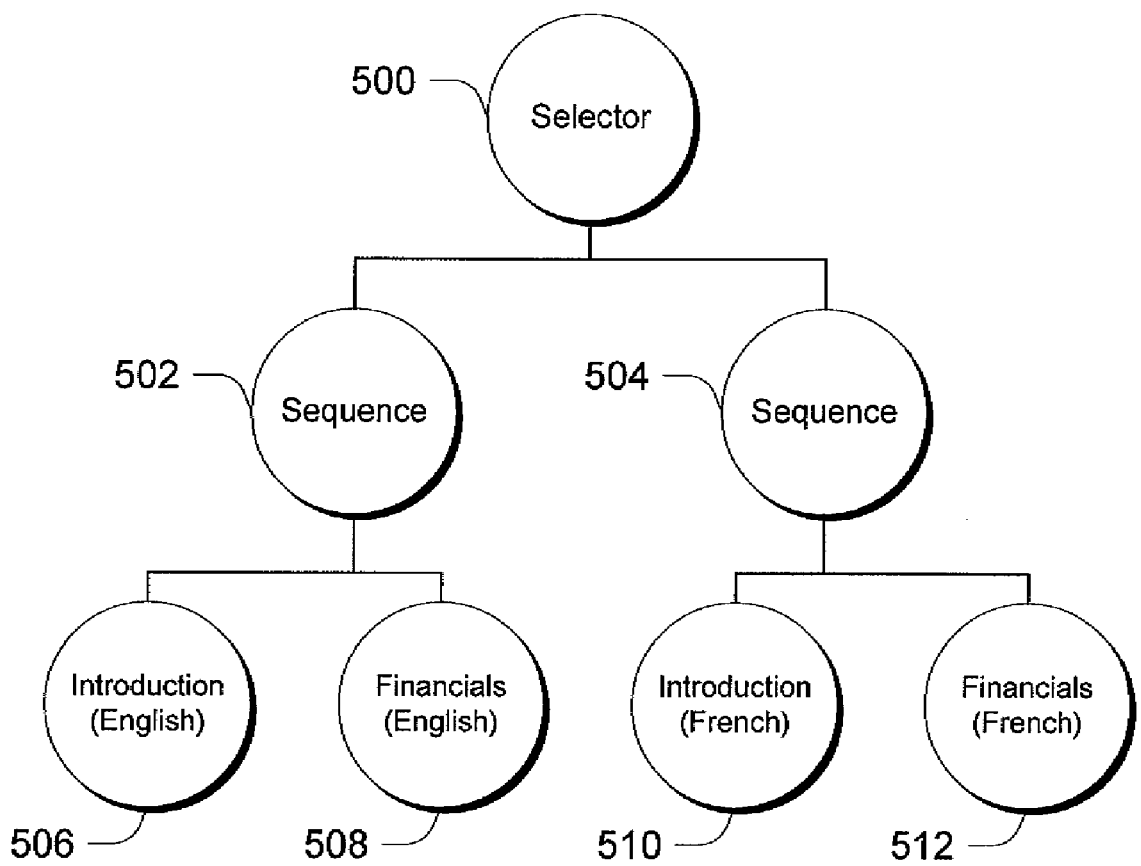
FIG. 5 is a diagram that illustrates an exemplary selector and sequences arranged to produce a financial report containing both an English representation and a French representation of the report, in accordance with one embodiment.

As an example, here is the XML for the example of FIG. 5 above:

```
MainDocument.XML
    <selection>
        <item target="EnglishRollup.xml" />
        <item target="FrenchRollup.xml" />
    </selection>
EnglishRollup.XML
    <sequence>
        <item target="EnglishIntroduction.xml" />
        <item target="EnglishFinancials.xml" />
    </sequence>
FrenchRollup.XML
<sequence>
    <item target="FrenchIntroduction.xml">
    <item target="FrenchFinancials.xml">
</sequence>
```

In this XML, MainDocument.xml represents an entire part in the package and indicates, by virtue of the "selection" tag, that a selection is to be made between different items encapsulated by the "item" tag, i.e., the "EnglishRollup.xml" and the "FrenchRollup.xml".

The EnglishRollup.xml and FrenchRollup.xml are, by virtue of the "sequence" tags, sequences that sequence together the respective items encapsulated by their respective "item" tags.

Thus, a simple XML grammar is provided for describing selectors and sequences. Each part in this composition block is built and performs one operation—either selecting or sequencing. By using a hierarchy of parts, different robust collections of selections and sequences can be built.

Composition Block

The composition block of a package comprises the set of all composition parts (selector or sequence) that are reachable from the starting part of the package. If the starting part of the package is neither a selector nor a sequence, then the composition block is considered empty. If the starting part is a composition part, then the child <item>s in those composition parts are recursively traversed to produce a directed, acyclic graph of the composition parts (stopping traversal when a non-composition part is encountered). This graph is the composition block (and it must, in accordance with this embodiment, be acyclic for the package to be valid).

Determining Composition Semantics

Having established the relatively straight forward XML grammar above, the following discussion describes a way to represent the information such that selections can be made based on content type. That is, the XML described above provides enough information to allow readers to locate the parts that are assembled together into a composition, but does not provide enough information to help a reader know more about the nature of the composition. For example, given a selection that composes two parts, how does a reader know on what basis (e.g., language, paper size, etc.) to make the selection? The answer is that these rules are associated with the content type of the composition part. Thus, a selector part that is used for picking between representations based on language will have a different associated content type from a selector part that picks between representations based on paper sizes.

The general framework defines the general form for these content types:

```
Application/XML+Selector-SOMETHING
Application/XML+Sequence-SOMETHING
```

The SOMETHING in these content types is replaced by a word that indicates the nature of the selection or sequence, e.g. page size, color, language, resident software on a reader device and the like. In this framework then, one can invent all kinds of selectors and sequences and each can have very different semantics.

The described framework also defines the following well-known content types for selectors and sequences that all readers or reading devices must understand.

| Content Type | Rules |
|---|---|
| Application/XML+Selector+SupportedContentType | Pick between the items based on their content types. Select the first item for which software is available that understands the given content type. |

As an example, consider the following. Assume a package contains a document that has a page, and in the middle of the page there is an area in which a video is to appear. In this example, a video part of the page might comprise video in the form of a Quicktime video. One problem with this scenario is that Quicktime videos are not universally understood. Assume, however, that in accordance with this framework and, more particularly, the reach package format described below, there is a universally understood image format-JPEG. When producing the package that contains the document described above, the producer might, in addition to defining the video as a part of the package, define a JPEG image for the page and interpose a SupportedContentType selector so that if the user's computer has software that understands the Quicktime video, the Quicktime video is selected, otherwise the JPEG image is selected.

Thus, as described above, the framework-level selector and sequence components allow a robust hierarchy to be built which, in this example, is defined in XML. In addition, there is a well-defined way to identify the behaviors of selectors and sequences using content types. Additionally, in accordance with one embodiment, the general framework comprises one particular content type that is predefined and which allows processing and utilization of packages based on what a consumer (e.g. a reader or reading device) does and does not understand.

Other composition part content types can be defined using similar rules, examples of which are discussed below.

Descriptive Metadata

In accordance with one embodiment, descriptive metadata parts provide writers or producers of packages with a way in which to store values of properties that enable readers of the packages to reliably discover the values. These properties are typically used to record additional information about the package as a whole, as well as individual parts within the container. For example, a descriptive metadata part in a package might hold information such as the author of the package, keywords, a summary, and the like.

In the illustrated and described embodiment, the descriptive metadata is expressed in XML, is stored in parts with well-known content types, and can be found using well-known relationship types.

Descriptive metadata holds metadata properties. Metadata properties are represented by a property name and one or many property values. Property values have simple data types, so each data type is described by a single XML qname. The fact that descriptive metadata properties have simple types does not mean that one cannot store data with complex XML types in a package. In this case, one must store the information as a full XML part. When this is done, all constraints about only using simple types are removed, but the simplicity of the "flat" descriptive metadata property model is lost.

In addition to the general purpose mechanism for defining sets of properties, there is a specific, well-defined set of document core properties, stored using this mechanism. These document core properties are commonly used to describe documents and include properties like title, keywords, author, etc.

Finally, metadata parts holding these document core properties can also hold additional, custom-defined properties in addition to the document core properties.

Metadata Format

In accordance with one embodiment, descriptive metadata parts have a content type and are targeted by relationships according to the following rules:

| Descriptive Metadata Discovery Rules | Using Custom-defined properties | Using Document Core properties |
|---|---|---|
| Content type of a descriptive metadata part MUST be: | application/xml-SimpleTypeProperties-PLACEHOLDER | |
| Content type of a source part which can have relationship targeting descriptive metadata part may be: | ANY | ANY |
| Name of the relationship targeting descriptive metadata part may be either: | *custom-defined Uri-namespace* | http://mmcf-DocumentCore-PLACEHOLDER |
| Number of descriptive metadata parts, which can be attached to the source part may be: | UNBOUNDED | 0 or 1 |
| Number of source parts which can have the same descriptive metadata part attached MUST be | UNBOUNDED | UNBOUNDED |

The following XML pattern is used to represent descriptive metadata in accordance with one embodiment. Details about each component of the markup are given in the table after the sample.

```
<mcs:properties   xmlns:mcs="http://mmcf-core-services/PLACEHOLDER"
                  xmlns:xsd="http://www.w3.org/2001/XMLSchema">
    <mcs:property prns:name = "property name" xmlns:prns="property namespace"
                  mcs:type="datatype"
                  mcs:multivalued="true |false">
        <mcs:value> ... value ... </mcs:value>
    </mcs:property>
</mcs:properties>
```

| Markup Component | Description |
| --- | --- |
| xmlns:mcs="http://mmcf-common-services/PLACEHOLDER" | Defines the MMCF common services namespace |
| xmlns:xsd="http://www.w3.org/2001/XMLSchema" | Defines the XML schema namespace. Many custom-defined properties and the majority of Document Core properties will have built-in data types defined using an XSD. Although each property can have its own namespace, the XSD namespace is placed on the root of the descriptive metadata XML. |
| mcs:properties | Root element of the descriptive metadata XML |
| mcs:property | Property element. A property element holds a property qname and value. There may be an unbounded number of property elements. Property elements are considered to be immediate children of the root element. |
| xmlns:prns | Property Namespace: For Document Core properties it is http://mmcf-DocumentCore-PLACEHOLDER. For custom-defined properties it will be a custom namespace. |
| prns:name | Property Name: string attribute which holds property name |
| mcs:type="datatype" | Type is the string attribute that holds the property datatype definition, e.g. xsd:string |
| mcs:value | This component specifies the value of the property. Value elements are immediate children of property elements. If mcs:multivalued="true", then there may be an unbounded number of value elements. |

Document Core Properties

The following is a table of document core properties that includes the name of the property, the property type and a description.

| Name | Type | | Description |
| --- | --- | --- | --- |
| Comments | String, optional, single-valued | | A comment to the document as a whole that an Author includes. This may be a summary of the document. |
| Copyright | String, optional, single-valued | | Copyright string for this document |
| EditingTime | Int64, optional, single-valued | | Time spent editing this document in seconds. Set by application logic. This value must have the appropriate type. |
| IsCurrentVersion | boolean, optional, single-valued | | Indicates if this instance is a current version of the document, or an obsolete version. This field can be derived from VersionHistory, but the derivation process may be expensive. |
| Language | Keyword (= string256), optional, multi-valued | | The language of the document (English, French, etc.). This field is set by the application logic. |
| RevisionNumber | String, optional, single-valued | | Revision of the document. |
| Subtitle | String, optional, single-valued | | A secondary or explanatory title of the document |
| TextDataProperties | TextDataProperties, optional, single-valued | | If this document has text, this property defines a collection of the text properties of the document, such as paragraph count, line count, etc |
| | CharacterCount | int64 | |
| | LineCount | int64 | |
| | PageCount | int64 | |
| | ParagraphCount | int64 | |
| | WordCount | int64 | |
| TimeLastPrinted | datetime, optional, single-valued | | Date and time when this document was last printed. |

-continued

| Name | Type | Description |
|---|---|---|
| Title | String, optional, single-valued | The document title, as understood by the application that handles the document. This is different than the name of the file that contains the package. |
| TitleSortOrder | String, optional, single-valued | The sort order of the title (e.g. "The Beatles" will have SortOrder "Beatles", with no leading "The"). |
| ContentType | Keyword (= string256), optional, multi-valued | Document type as set by application logic. The type that is stored here should be a recognized "mime-type" This property may be useful for categorizing or searching for documents of certain types. |

Physical Model

Figure 6:
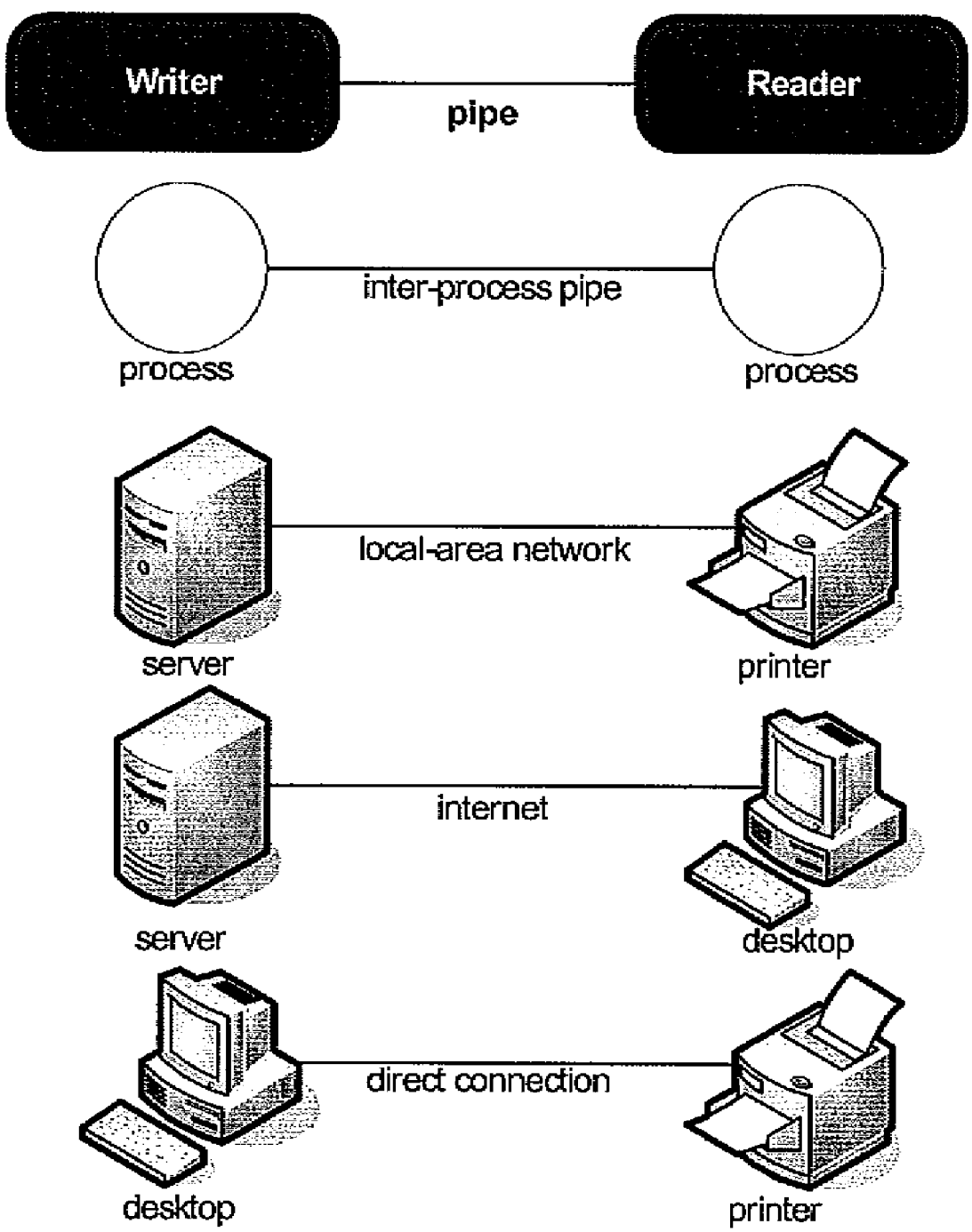
FIG. 6 illustrates some examples of writers and readers working together to communicate about a package, in accordance with one embodiment.

The physical model defines various ways in which a package is used by writers and readers. This model is based on three components: a writer, a reader and a pipe between them. FIG. 6 shows some examples of writers and readers working together to communicate about a package.

The pipe carries data from the writer to the reader. In many scenarios, the pipe can simply comprise the API calls that the reader makes to read the package from the local file system. This is referred to as direct access.

Often, however, the reader and the writer must communicate with each other over some type of protocol. This communication happens, for example, across a process boundary or between a server and a desktop computer. This is referred to as networked access and is important because of the communications characteristics of the pipe (specifically, the speed and request latency).

In order to enable maximum performance, physical package designs must consider support in three important areas: access style, layout style and communication style.

Access Style

Streaming Consumption

Because communication between the writer and the reader using networked access is not instantaneous, it is important to allow for progressive creation and consumption of packages. In particular, it is recommended, in accordance with this embodiment, that any physical package format be designed to allow a reader to begin interpreting and processing the data it receives the data (e.g., parts), before all of the bits of the package have been delivered through the pipe. This capability is called streaming consumption.

Streaming Creation

When a writer begins to create a package, it does not always know what it will be putting in the package. As an example, when an application begins to build a print spool file package, it may not know how many pages will need to be put into the package. As another example, a program on a server that is dynamically generating a report may not realize how long the report will be or how many pictures the report will have until it has completely generated the report. In order to allow writers like this, physical packages should allow writers to dynamically add parts after other parts have already been added (for example, a writer must not be required to state up front how many parts it will be creating when it starts writing). Additionally, physical packages should allow a writer to begin writing the contents of a part without knowing the ultimate length of that part. Together, these requirements enable streaming creation.

Simultaneous Creation and Consumption

In a highly-pipelined architecture, streaming creation and streaming consumption can occur simultaneously for a specific package. When designing a physical package, supporting streaming creation and supporting streaming consumption can push a design in opposite directions. However, it is often possible to find a design that supports both. Because of the benefits in a pipelined architecture, it is recommended that physical packages support simultaneous creation and consumption.

Layout Styles

Physical packages hold a collection of parts. These parts can be laid out in one of two styles: simple ordering and interleaved. With simple ordering, the parts in the package are laid out with a defined ordering. When such a package is delivered in a pure linear fashion, starting with the first byte in the package through to the last, all of the bytes for the first part arrive first, then all of the bytes for the second part, and so on.

With interleaved layout, the bytes of the multiple parts are interleaved, allowing for improved performance in certain scenarios. Two scenarios that benefit significantly from interleaving are multi-media playback (e.g., delivering video and audio at the same time) and inline resource reference (e.g., a reference in the middle of a markup file to an image).

Figure 7:
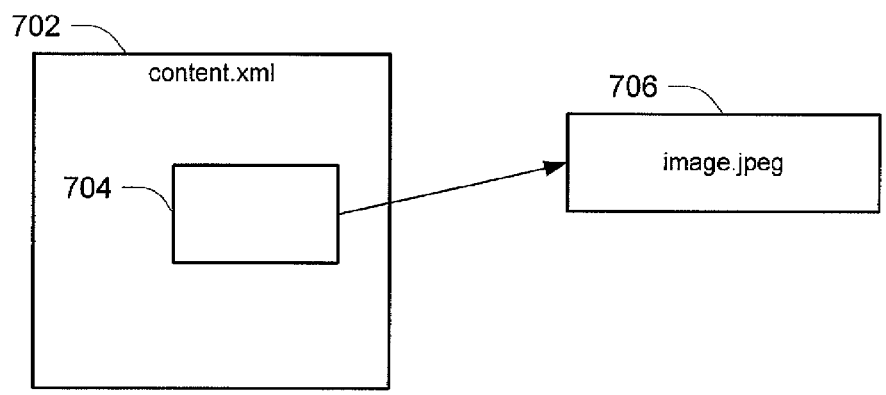
FIG. 7 illustrates an example of interleaving multiple parts of a document.

Interleaving is handled through a special convention for organizing the contents of interleaved parts. By breaking parts into pieces and interleaving these pieces, it is possible to achieve the desired results of interleaving while still making it possible to easily reconstruct the original larger part. To understand how interleaving works, FIG. 7 illustrates a simple example involving two parts: content.xml 702 and image.jpeg 704. The first part, content.xml, describes the contents of a page and in the middle of that page is a reference to an image (image.jpeg) that should appear on the page.

Figure 8:
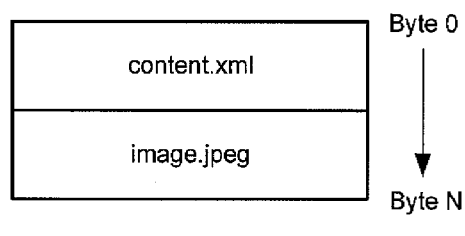
FIGS. 8 and 9 illustrate different examples of packaging the multiple parts of the document shown in FIG. 7.

To understand why interleaving is valuable, consider how these parts would be arranged in a package using simple ordering, as shown in FIG. 8. A reader that is processing this package (and is receiving bytes sequentially) will be unable to display the picture until it has received all of the content.xml part as well as the image.jpeg. In some circumstances (e.g., small or simple packages, or fast communications links) this may not be a problem. In other circumstances (for example, if content.xml was very large or the communications link was very slow), needing to read through all of the content.xml part to get to the image will result in unacceptable performance or place unreasonable memory demands on the reader system.

Figure 9:
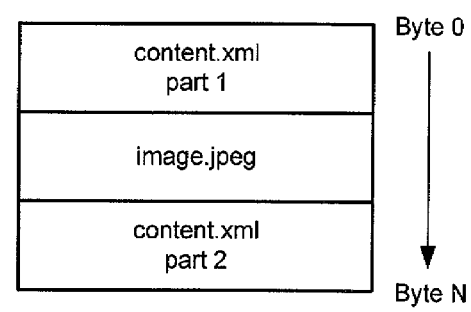

In order to achieve closer to ideal performance, it would be nice to be able to split the content.xml part and insert the image.jpeg part into the middle, right after where the picture is referenced. This would allow the reader to begin processing the image earlier: as soon as it encounters the reference, the image data follows. This would produce, for example, the package layout shown in FIG. 9. Because of the performance benefits, it is often desirable that physical packages support interleaving. Depending on the kind of physical package being used, interleaving may or may not be supported. Different physical packages may handle the internal representation of interleaving differently. Regardless of how the physical package handles interleaving, it's important to remember that interleaving is an optimization that occurs at the physical level and a part that is broken into multiple pieces in the physical file is still one logical part; the pieces themselves aren't parts.

Communication Styles

Communication between writer and reader can be based on sequential delivery of parts or by random-access to parts, allowing them to be accessed out of order. Which of these communication styles is utilized depends on the capabilities of both the pipe and the physical package format. Generally, all pipes will support sequential delivery. Physical packages must support sequential delivery. To support random-access scenarios, both the pipe in use and the physical package must support random-access. Some pipes are based on protocols that can enable random access (e.g., HTTP 1.1 with byte-range support). In order to allow maximum performance when these pipes are in use, it is recommended that physical packages support random-access. In the absence of this support, readers will simply wait until the parts they need are delivered sequentially.

Physical Mappings

The logical packaging model defines a package abstraction; an actual instance of a package is based on some particular physical representation of a package. The packaging model may be mapped to physical persistence formats, as well as to various transports (e.g., network-based protocols). A physical package format can be described as a mapping from the components of the abstract packaging model to the features of a particular physical format. The packaging model does not specify which physical package formats should be used for archiving, distributing, or spooling packages. In one embodiment, only the logical structure is specified. A package may be "physically" embodied by a collection of loose files, a ZIP file archive, a compound file, or some other format. The format chosen is supported by the targeted consuming device, or by a driver for the device.

Components Being Mapped

Each physical package format defines a mapping for the following components. Some components are optional and a specific physical package format may not support these optional components.

| | Component | Description | Required or Optional |
|---|---|---|---|
| Parts | Name | Names a part. | Required |
| | Content type | Identified the kind of content stored in the part. | Required |
| | Part contents | Stores the actual content of the part. | Required |

Common Mapping Patterns

| | | | |
|---|---|---|---|
| Access Styles | Streaming Consumption | Allows readers to begin processing parts before the entire package has arrived. | Optional |
| | Streaming Creation | Allows writers to begin writing parts to the package without knowing, in advance, all of the parts that will be written. | Optional |
| | Simultaneous Creation and Consumption | Allows streaming creation and streaming consumption to happen at the same time on the same package. | Optional |
| Layout Styles | Simple Ordering | All of the bytes for part N appear in the package before the bytes for part N + 1. | Optional |
| | Interleaved | The bytes for multiple parts are interleaved. | Optional |
| Communication Styles | Sequential Delivery | All of part N is delivered to a reader before part N + 1. | Optional |
| | Random-Access | A reader can request the delivery of a part out of sequential order. | Optional |

There exist many physical storage formats whose features partially match the packaging-model components. In defining mappings from the packaging model to such storage formats, it may be desirable to take advantage of any similarities in capabilities between the packaging model and the physical storage medium, while using layers of mapping to provide additional capabilities not inherently present in the physical storage medium. For example, some physical package formats may store individual parts as individual files in a file system. In such a physical format, it would be natural to map many part names directly to identical physical file names. Part names using characters which are not valid file system file names may require some kind of escaping mechanism.

In many cases, a single common mapping problem may be faced by the designers of different physical package formats. Two examples of common mapping problems arise when associating arbitrary Content Types with parts, and when supporting the Interleaved layout style. This specification suggests common solutions to such common mapping problems. Designers of specific physical package formats may be encouraged, but are not required, to use the common mapping solutions defined here.

Identifying Content Types of Parts

Physical package format mappings define a mechanism for storing a content type for each part. Some physical package formats have a native mechanism for representing content types (for example, the "Content-Type" header in MIME). For such physical packages, it is recommended that the mapping use the native mechanism to represent content types for parts. For other physical package formats, some other mechanism is used to represent content types. The recommended mechanism for representing content types in these packages is by including a specially-named XML stream in the package, known as the types stream. This stream is not a part, and is therefore not itself URI-addressable. However, it can be interleaved in the physical package using the same mechanisms used for interleaving parts.

The types stream contains XML with a top level "Types" element, and one or more "Default" and "Override" sub-elements. The "Default" elements define default mappings from part name extensions to content types. This takes advantage of the fact that file extensions often correspond to content type. "Override" elements are used to specify content types on parts that are not covered by, or are not consistent with, the default mappings. Package writers may use "Default" elements to reduce the number of per-part "Override" elements, but are not required to do so.

The "Default" element has the following attributes:

| Name | Description | Required |
| --- | --- | --- |
| Extension | A part name extension. A "Default" element matches any part whose name ends with a period followed by this attribute's value. | Yes |
| ContentType | A content type as defined in RFC2045. Indicates the content type of any matching parts (unless overridden by an "Override" element; see below). | Yes |

The "Override" element has the following attributes:

| Name | Description | Required |
| --- | --- | --- |
| PartName | A part name URI. An "Override" element matches the part whose name equals this attribute's value. | Yes |
| ContentType | A content type as defined in RFC2045. Indicates the content type of the matching part. | Yes |

The following is an example of the XML contained in a types stream:

```
<Types xmlns="http://mmcfcontent-PLACEHOLDER">
  <Default Extension="txt" ContentType="plain/text" />
  <Default Extension="jpeg" ContentType="image/jpeg" />
  <Default Extension="picture" ContentType="image/gif" />
  <Override PartName="/a/b/sample4.picture" ContentType="image/jpeg" />
</Types>
```

The following table shows a sample list of parts, and their corresponding content types as defined by the above types stream:

| Part Name | Content Type |
| --- | --- |
| /a/b/sample1.txt | plain/text |
| /a/b/sample2.jpeg | image/jpeg |
| /a/b/sample3.picture | image/gif |
| /a/b/sample4.picture | image/jpeg |

For every part in the package, the types stream contains either (a) one matching "Default" element, (b) one matching "Override" element, or (c) both a matching "Default" element and a matching "Override" element (in which case the "Override" element takes precedence). In general there is, at most, one "Default" element for any given extension, and one "Override" element for any given part name.

The order of "Default" and "Override" elements in the types stream is not significant. However, in interleaved packages, "Default" and "Override" elements appear in the physical package before the part(s) they correspond to.

Interleaving

Not all physical packages support interleaving of the data streams of parts natively. In one embodiment, a mapping to any such physical package uses the general mechanism described in this section to allow interleaving of parts. The general mechanism works by breaking the data stream of a part into multiple pieces that can then be interleaved with pieces of other parts, or whole parts. The individual pieces of a part exist in the physical mapping and are not addressable in the logical packaging model. Pieces may have a zero size.

The following unique mapping from a part name to the names for the individual pieces of a part is defined, such that a reader can stitch together the pieces in their original order to form the data stream of the part.

Grammar for deriving piece names for a given part name:
piece_name=part_name "/" "[" 1*digit "]" ["last"] ".piece"

The following validity constraints exist for piece-names generated by the grammar:
  The piece numbers start with 0, and are positive, consecutive integer numbers. Piece numbers can be left-zero-padded.
  The last piece of the set of pieces of a part contains the ".last" in the piece name before ".piece".
  The piece name is generated from the name of the logical part before mapping to names in the physical package.

Although it is not necessary to store pieces in their natural order, such storage may provide optimal efficiency. A physical package containing interleaved (pieced) parts can also contain non-interleaved (one-piece) parts, so the following example would be valid:

```
spine.xaml/[0].piece
pages/page0.xaml
spine.xaml/[1].piece
pages/page1.xaml
spine.xaml/[2].last.piece
pages/page2.xaml
```

Specific Mappings

The following defines specific mappings for the following physical formats: Loose files in a Windows file system.

Mapping to Loose Files in a Windows File System

In order to better understand how to map elements of the logical model to a physical format, consider the basic case of representing a Metro package as a collection of loose files in a Windows file system. Each part in the logical package will be contained in a separate file (stream). Each part name in the logical model corresponds to the name of the file.

| Logical Component | Physical Representation |
| --- | --- |
| Part | File(s) |
| Part name | File name with path (which should look like URI, changes slash to backslash, etc.). |
| Part Content Type | File containing XML expressing simple list of file names and their associated types |

The part names are translated into valid Windows file names, as illustrated by the table below.

Given below are two character sets that are valid for logical part name segments (URI segments) and for Windows filenames. This table reveals two important things:

There are two valid URI symbols colon (:) and asterisk (*) which we need to escape when converting a URI to a filename.

There are valid filename symbols ^ { } [ ] # which cannot be present in a URI (they can be used for special mapping purposes, like interleaving).

"Escaping" is used as a technique to produces valid filename characters when a part name contains a character that can not be used in a file name. To escape a character, the caret symbol (^) is used, followed by the hexadecimal representation of the character.

To map from an abs_path (part name) to a file name:
remove first /
convert all / to \
escape colon and asterisk characters For example, the part name /a:b/c/d*.xaml becomes the following file name a^25b\c\d^2a.xaml.

To perform the reverse mapping:
convert all \ to /
add / to the beginning of the string
unescape characters by replacing ^[hexcode] with the corresponding character New printers, browsers, and other clients may implement a variety of support for future features. Document authors exploiting new versions or extensions must carefully consider the behavior of readers unaware of those versions of extensions.

Versioning Namespace

XML markup recognition is based on namespace URIs. For any XML-namespace, a reader is expected to recognize either all or none of the XML-elements and XML-attributes defined in that namespace. If the reader does not recognize the new namespace, the reader will need to perform fallback rendering operations as specified within the document.

The XML namespace URI 'http://PLACEHOLDER/version-control' includes the XML elements and attributes used to construct Fixed payload markup that is version-adaptive and extensions-adaptive. Fixed Payloads are not required to have versioning elements within them. In order to build adaptive content, however, one must use at least one of the <ver:Compatibility.Rules> and S<ver:AlternativeContent> XML-elements.

This Fixed-Payload markup specification has an xmlns URI associated with it: 'http://PLACEHOLDER/pdl'. Using

| From URI grammar rules (RFC2396) | Characters that are valid for naming files, folders, or shortcuts |
|---|---|
| path_segments = segment *( "/" segment ) segment = *pchar *( ";" param ) param = *pchar pchar = unreserved | escaped |":" | "@" | "&" | "=" | "+" | "$" | "," unreserved = alphanum | mark alphanum = alpha | digit mark = "-" | "_" | "." | "!" | "~" | "*" | "'" |"(" | ")" escaped = "%" hex hex hex = digit | "A" | "B" | "C" | "D" | "E" | "F" |"a" | "b" | "c" | "d" | "e" | "f" | Alphanum \| ^ Accent circumflex (caret) & Ampersand ' Apostrophe (single quotation mark) @ At sign { Brace left } Brace right [ Bracket opening ] Bracket closing , Comma $ Dollar sign = Equal sign ! Exclamation point - Hyphen # Number sign ( Parenthesis opening ) Parenthesis closing % Percent . Period + Plus ~ Tilde _Underscore |

Versioning and Extensibility

Like other technical specifications, the specification contained herein may evolve with future enhancements. The design of the first edition of this specification includes plans for the future interchange of documents between software systems written based on the first edition, and software systems written for future editions. Similarly, this specification allows for third-parties to create extensions to the specification. Such an extension might, for example, allow for the construction of a document which exploits a feature of some specific printer, while still retaining compatibility with other readers that are unaware of that printer's existence.

Documents using new versions of the Fixed Payload markup, or third-party extensions to the markup, require readers to make appropriate decisions about behavior (e.g., how to render something visually). To guide readers, the author of a document (or the tool that generated the document) should identify appropriate behavior for readers encountering otherwise-unrecognized elements or attributes. For Reach documents, this type of guidance is important.

this namespace in a Fixed Payload will indicate to a reader application that only elements defined in this specification will be used. Future versions of this specification will have their own namespaces. Reader applications familiar with the new namespace will know how to support 3 the superset of elements of attributes defined in previous versions. Reader applications that are not familiar with the new version will consider the URI of the new version as if it were the URI of some unknown extension to the PDL. These applications may not know that a relationship exists between the namespaces, that one is a superset of the other.

Backward and "Forward" Compatibility

In the context of applications or devices supporting the systems and methods discussed herein, compatibility is indicated by the ability of clients to parse and display documents that were authored using previous versions of the specification, or unknown extensions or versions of the specification. Various versioning mechanisms address "backward compatibility," allowing future implementations of clients to be able to support documents based on down-level versions of the specification, as illustrated below.

When an implemented client, such as a printer, receives a document built using a future version of the markup language, the client will be able to parse and understand the available rendering options. The ability of client software written according to an older version of a specification to handle some documents using features of a newer version is often called "forward compatibility." A document written to enable forward compatibility is described as "version-adaptive."

Further, because implemented clients will also need to be able to support documents that have unknown extensions representing new elements or properties, various semantics support the more general case of documents that are "extension adaptive."

If a printer or viewer encounters extensions that are unknown, it will look for information embedded alongside the use of the extension for guidance about adaptively rendering the surrounding content. This adaptation involves replacing unknown elements or attributes with content that is understood. However, adaptation can take other forms, including purely ignoring unknown content. In the absence of explicit guidance, a reader should treat the presence of an unrecognized extension in the markup as an error-condition. If guidance is not provided, the extension is presumed to be fundamental to understanding the content. The rendering failure will be captured and reported to the user.

To support this model, new and extended versions of the markup language should logically group related extensions in namespaces. In this way, document authors will be able to take advantage of extended features using a minimum number of namespaces.

Versioning Markup

The XML vocabulary for supporting extension-adaptive behavior includes the following elements:

| Versioning Element and Hierarchy | Description |
| --- | --- |
| <Compatibility.Rules> | Controls how the parser reacts to an unknown element or attribute. |
| <Ignorable> | Declares that the associated namespace URI is ignorable. |
| <ProcessContent> | Declares that if an element is ignored, the contents of the element will be processed as if it was contained by the container of the ignored element. |
| <CarryAlong> | Indicates to the document editing tools whether ignorable content should be preserved when the document is modified. |
| <MustUnderstand> | Reverses the effect of an element declared ignorable. |
| <AlternateContent> | In markup that exploits versioning/extension features, the <AlternateContent> element associates substitute "fallback" markup to be used by reader applications that are not able to handle the markup specified as Preferred. |
| <Prefer> | Specifies preferred content. This content will that a client is aware of version/extension features. |
| <Fallback> | For down-level clients, specifies the 'down-level' content to be substituted for the preferred content. |

The <Compatibility.Rules> Element

Compatibility.Rules can be attached to any element that can hold an attached attribute, as well as to the Xaml root element. The <Compatibility.Rules> element controls how the parser reacts to unknown elements or attributes. Normally such items are reported as errors. Adding an Ignorable element to a Compatibilitiy.Rules property informs the compiler that items from certain namespaces can be ignored.

Compatibility.Rules can contain the elements Ignorable and MustUnderstand. By default, all elements and attributes are assumed to be MustUnderstand. Elements and attributes can be made Ignorable by adding an Ignorable element into its container's Compatibility.Rules property. An element or property can be made MustUnderstand again by adding a MustUnderstand element to one of the nested containers. One Ignorable or MustUnderstand refers to a particular namespace URI within the same Compatibility.Rules element.

The <Compatibility.Rules> element affects the contents of a container, not the container's own tag or attributes. To affect a container's tag or attributes, its container must contain the compatibility rules. The Xaml root element can be used to specify compatibility rules for elements that would otherwise be root elements, such as Canvas. The Compatibility.Rules compound attribute is the first element in a container.

The <Ignorable> Element

The <Ignorable> element declares that the enclosed namespace URI is ignorable. An item can be considered ignorable if an <Ignorable> tag is declared ahead of the item in the current block or a container block, and the namespace URI is unknown to the parser. If the URI is known, the Ignorable tag is disregarded and all items are understood. In one embodiment, all items not explicitly declared as Ignorable must be understood. The Ignorable element can contain <ProcessContent> and <CarryAlong> elements, which are used to modify how an element is ignored as well as give guidance to document editing tools how such content should be preserved in edited documents.

The <Process Content> Element

The <ProcessContent> element declares that if an element is ignored, the contents of the element will be processed as if it was contained by the container of the ignored element.

<ProcessContent> Attributes

| Attribute | Description |
| --- | --- |
| Elements | A space delimited list of element names for which to process the contents, or "*" indicating the contents of all elements should be processed. The Elements attribute defaults to "*" if it is not specified. |

The <CarryAlong> Element

The optional <CarryAlong> element indicates to the document editing tools whether ignorable content should be preserved when the document is modified. The method by which an editing tool preserves or discards the ignorable content is in the domain of the editing tool. If multiple <CarryAlong> elements refer to the same element or attribute in a namespace, the last <CarryAlong> specified has precedence.

<CarryAlong> Attributes

| Attribute | Description |
|---|---|
| Elements | A space delimited list of element names that are requested to be carried along when the document is edited, or "*" indicating the contents of all elements in the namespace should be carried along. The Elements attribute defaults to "*" if it is not specified. |
| Attributes | A space delimited list of attribute names within the elements that are to be carried along, or a "*" indicating that all attributes of the elements should be carried along. When an element is ignored and carried along, all attributes are carried along regardless of the contents of this attribute. This attribute only has an effect if the attribute specified is used in an element that is not ignored, as in the example below. By default, Attributes is "*". |

The <MustUnderstand> Element

<MustUnderstand> is an element that reverses the effects of an Ignorable element. This technique is useful, for example, when combined with alternate content. Outside the scope defined by the <MustUnderstand> element, the element remains Ignorable.

<MustUnderstand> Attributes

| Attribute | Description |
|---|---|
| NamespaceUri | The URI of the namespace whose items must be understood. |

The <AlternateContent> Element

The <AlternateContent> element allows alternate content to be provided if any part of the specified content is not understood. An AlternateContent block uses both a <Prefer> and a <Fallback> block. If anything in the <Prefer> block is not understood, then the contents of the <Fallback> block are used. A namespace is declared <MustUnderstand> in order to indicate that the fallback is to be used. If a namespace is declared ignorable and that namespace is used within a <Prefer> block, the content in the <Fallback> block will not be used.

Versioning Markup Examples

Using <Ignorable>

This example uses a fictitious markup namespace, http://PLACEHOLDER/Circle, that defines an element Circle in its initial version and uses the Opacity attribute of Circle introduced in a future version of the markup (version 2) and the Luminance property introduced in an even later version of the markup (version 3). This markup remains loadable in versions 1 and 2, as well as 3 and beyond. Additionally, the <CarryAlong> element specifies that v3:Luminance MUST be preserved when editing even when the editor doesn't understand v3:Luminance.

For a version 1 reader, Opacity and Luminance are ignored.

For a version 2 reader, only Luminance is ignored.

For a version 3 reader and beyond, all the attributes are used.

```
<FixedPanel
    xmlns="http://PLACEHOLDER/fixed-content"
    xmlns:v="http://PLACEHOLDER/versioned-content"
    xmlns:v1="http://PLACEHOLDER/Circle/v1"
    xmlns:v2="http://PLACEHOLDER/Circle/v2"
    xmlns:v3="http://PLACEHODER/Circle/v3" >
  <v:Compatibility.Rules>
    <v:Ignorable NamespaceUri=" http://PLACEHODER/Circle/v2" />
    <v:Ignorable NamespaceUri=" http://PLACEHODER/Circle/v3" >
      <v:CarryAlong Attributes="Luminance" />
    </v:Ignorable>
  </v:Compatibility.Rules>
  <Canvas>
    <Circle Center="0,0" Radius="20" Color="Blue"
        v2:Opacity="0.5" v3:Luminance="13" />
    <Circle Center="25,0" Radius="20" Color="Black"
        v2:Opacity="0.5" v3:Luminance="13" />
    <Circle Center="50,0" Radius="20" Color="Red"
        v2:Opacity="0.5" v3:Luminance="13" />
    <Circle Center="13,20" Radius="20" Color="Yellow"
        v2:Opacity="0.5" v3:Luminance="13" />
    <Circle Center="38,20" Radius="20" Color="Green"
        v2:Opacity="0.5" v3:Luminance="13" />
  </Canvas>
</FixedPanel>
```

Using <MustUnderstand>

The following example demonstrates the use of the <MustUnderstand> element.

```
<FixedPanel
    xmlns="http://PLACEHOLDER/fixed-content"
    xmlns:v="http://PLACEHODER/versioned-content"
    xmlns:v1="http://PLACEHOLDER/Circle/v1"
    xmlns:v2="http://PLACEHOLDER/Circle/v2"
    xmlns:v3="http://PLACEHODER/Circle/v3" >
  <v:Compatibility.Rules>
    <v:Ignorable NamespaceUri="http://PLACEHODER/Circle/v2" />
    <v:Ignorable NamespaceUri="http://PLACEHODER/Circle/v3" >
      <v:CarryAlong Attributes="Luminance" />
    </v:Ignorable>
  </v:Compatibility.Rules>
  <Canvas>
    <v:Compatibility.Rules>
      <v:MustUnderstand NamespaceUri=
        "http://PLACEHODER/Circle/v3" />
    </v:Compatbility.Rules>
    <Circle Center="0,0" Radius="20" Color="Blue"
        v2:Opacity="0.5" v3:Luminance="13" />
    <Circle Center="25,0" Radius="20" Color="Black"
        v2:Opacity="0.5" v3:Luminance="13" />
    <Circle Center="50,0" Radius="20" Color="Red"
        v2:Opacity="0.5" v3:Luminance="13" />
    <Circle Center="13,20" Radius="20" Color="Yellow"
        v2:Opacity="0.5" v3:Luminance="13" />
    <Circle Center="38,20" Radius="20" Color="Green"
        v2:Opacity="0.5" v3:Luminance="13" />
  </Canvas>
</FixedPanel>
```

Use of the <MustUnderstand> element causes the references to v3:Luminance to be in error, even though it was declared to Ignorable in the root element. This technique is useful if combined with alternate content that uses, for example, the Luminance property of Canvas added in Version 2 instead (see below). Outside the scope of the Canvas element, Circle's Luminance property is ignorable again.

```
<FixedPanel
    xmlns="http://PLACEHOLDER/fixed-content"
    xmlns:v="http://PLACEHODER/versioned-content"
    xmlns:v1="http://PLACEHOLDER/Circle/v1"
    xmlns:v2="http://PLACEHODER/Circle/v2"
```

-continued

```
    xmlns:v3="http://PLACEHODER/Circle/v3" >
  <v:Compatibility.Rules>
    <v:Ignorable NamespaceUri="http://PLACEHODER/Circle/v2" />
    <v:Ignorable NamespaceUri="http://PLACEHODER/Circle/v3" >
      <v:CarryAlong Attributes="Luminance" />
    </v:Ignorable>
  </v:Compatibility.Rules>
  <Canvas>
    <v:Compatibility.Rules>
      <v:MustUnderstand NamespaceUri=
      "http://PLACEHODER/Circle/v3" />
    </v:Compatibility.Rules>
    <v:AlternateContent>
      <v:Prefer>
        <Circle Center="0,0" Radius="20" Color="Blue"
          v2:Opacity="0.5" v3:Luminance="13" />
        <Circle Center="25,0" Radius="20" Color="Black"
          v2:Opacity="0.5" v3:Luminance="13" />
        <Circle Center="50,0" Radius="20" Color="Red"
          v2:Opacity="0.5" v3:Luminance="13" />
        <Circle Center="13,20" Radius="20" Color="Yellow"
          v2:Opacity="0.5" v3:Luminance="13" />
        <Circle Center="38,20" Radius="20" Color="Green"
          v2:Opacity="0.5" v3:Luminance="13" />
      </v:Prefer>
      <v:Fallback>
        <Canvas Luminance="13">
          <Circle Center="0,0" Radius="20" Color="Blue"
            v2:Opacity="0.5" />
          <Circle Center="25,0" Radius="20" Color="Black"
            v2:Opacity="0.5" />
          <Circle Center="50,0" Radius="20" Color="Red"
            v2:Opacity="0.5" />
          <Circle Center="13,20" Radius="20" Color="Yellow"
            v2:Opacity="0.5" />
          <Circle Center="38,20" Radius="20" Color="Green"
            v2:Opacity="0.5" />
        </Canvas>
      </v:Fallback>
    </v:AlternateContent>
  </Canvas>
</FixedPanel>
```

Using <AlternateContent>

If any element or attribute is declared as <MustUnderstand> but is not understood in the <Prefer> block of an <AlternateContent> block, the <Prefer> block is skipped in its entirety and the <Fallback> block is processed as normal (that is, any MustUnderstand items encountered are reported as errors).

```
<v:AlternateContent>
  <v:Prefer>
    <Path xmlns:m="http://schemas.example.com/2008/metallic-finishes"
      m:Finish="GoldlLeaf" ..... />
  </v:Prefer>
  <v:Fallback>
    <Path Fill="Gold" ..... />
  </v:Fallback>
</v:AlternateContent>
```

The Reach Package Format

In the discussion that follows, a description of a specific file format is provided. Separate primary sub-headings in this section include "Introduction to the Reach Package Format", "The Reach Package Structure", "Fixed Payload Parts", "FixedPage Markup Basics", "Fixed-Payload Elements and Properties" and "FixedPage Markup". Each primary sub-heading has one or more related sub-headings.

Introduction to the Reach Package Format

Having described an exemplary framework above, the description that follows is one of a specific format that is provided utilizing the tools described above. It is to be appreciated and understood that the following description constitutes but one exemplary format and is not intended to limit application of the claimed subject matter.

In accordance with this embodiment, a single package may contain multiple payloads, each acting as a different representation of a document. A payload is a collection of parts, including an identifiable "root" part and all the parts required for valid processing of that root part. For instance, a payload could be a fixed representation of a document, a reflowable representation, or any arbitrary representation.

The description that follows defines a particular representation called the fixed payload. A fixed payload has a root part that contains a FixedPanel markup 9 which, in turn, references FixedPage parts. Together, these describe a precise rendering of a multi-page document.

A package which holds at least one fixed payload, and follows other rules described below, is known referred to as a reach package. Readers and writers of reach packages can implement their own parsers and rendering engines, based on the specification of the reach package format.

Features of Reach Packages

In accordance with the described embodiment, reach packages address the requirements that information workers have for distributing, archiving, and rendering documents. Using known rendering rules, reach packages can be unambiguously and exactly reproduced or printed from the format in which they are saved, without tying client devices or applications to specific operating systems or service libraries. Additionally, because the reach payload is expressed in a neutral, application-independent way, the document can typically be viewed and printed without the application used to create the package. To provide this ability, the notion of a fixed payload is introduced and contained in a reach package.

In accordance with the described embodiment, a fixed payload has a fixed number of pages and page breaks are always the same. The layout of all the elements on a page in a fixed payload is predetermined. Each page has a fixed size and orientation. As such, no layout calculations have to be performed on the consuming side and content can simply be rendered. This applies not just to graphics, but to text as well, which is represented in the fixed payload with precise typographic placement. The content of a page (text, graphics, images) is described using a powerful but simple set of visual primitives.

Reach packages support a variety of mechanisms for organizing pages. A group of pages are "glued" together one after another into a "FixedPanel." This group of pages is roughly equivalent to a traditional multi-page document. A FixedPanel can then further participate in composition—the process of building is sequences and selections to assemble a "compound" document.

In the illustrated and described embodiment, reach packages support a specific kind of sequence called a FixedPanel sequence that can be used, for example, to glue together a set of FixedPanels into a single, larger "document." Imagine, for example, gluing together two documents that came from different sources: a two-page cover memo (a FixedPanel) and a twenty-page report (a FixedPanel).

Reach packages support a number of specific selectors that can be used when building document packages containing alternate representations of the "same" content. In particular, reach packages allow selection based on language, color capability, and page size. Thus, one could have, for example, a bi-lingual document that uses a selector to pick between the English representation and the French representation of the document.

In addition to these simple uses of selector and sequence for composition in a reach package, it is important to note that selectors and sequences can also refer to further selectors and sequences thus allowing for powerful aggregate hierarchies to be built. The exact rules for what can and cannot be done, in accordance with this embodiment, are specified below in the section entitled "The Reach Package Structure".

Additionally, a reach package can contain additional payloads that are not fixed payloads, but instead are richer and perhaps editable representations of the document. This allows a package to contain a rich) editable document that works well in an editor application as well as a representation that is visually accurate and can be viewed without the editing application.

Finally, in accordance with this embodiment, reach packages support what is known as a print ticket. The print ticket provides settings that should be used when the package is printed. These print tickets can be attached in a variety of ways to achieve substantial flexibility. For example, a print ticket can be "attached" to an entire package and its settings will affect the whole package. Print tickets can be further attached at lower levels in the structure (e.g., to individual pages) and these print tickets will provide override settings to be used when printing the part to which they are attached.

The Reach Package Structure

As described above, a reach package supports a set of features including "fixed" pages, FixedPanels, composition, print tickets, and the like. These features are represented in a package using the core components of the package model: parts and relationships. In this section and its related subsections, a complete definition of a "reach package" is provided, including descriptions of how all these parts and relationships must be assembled, related, etc.

Reach Package Structure Overview

Figure 10:
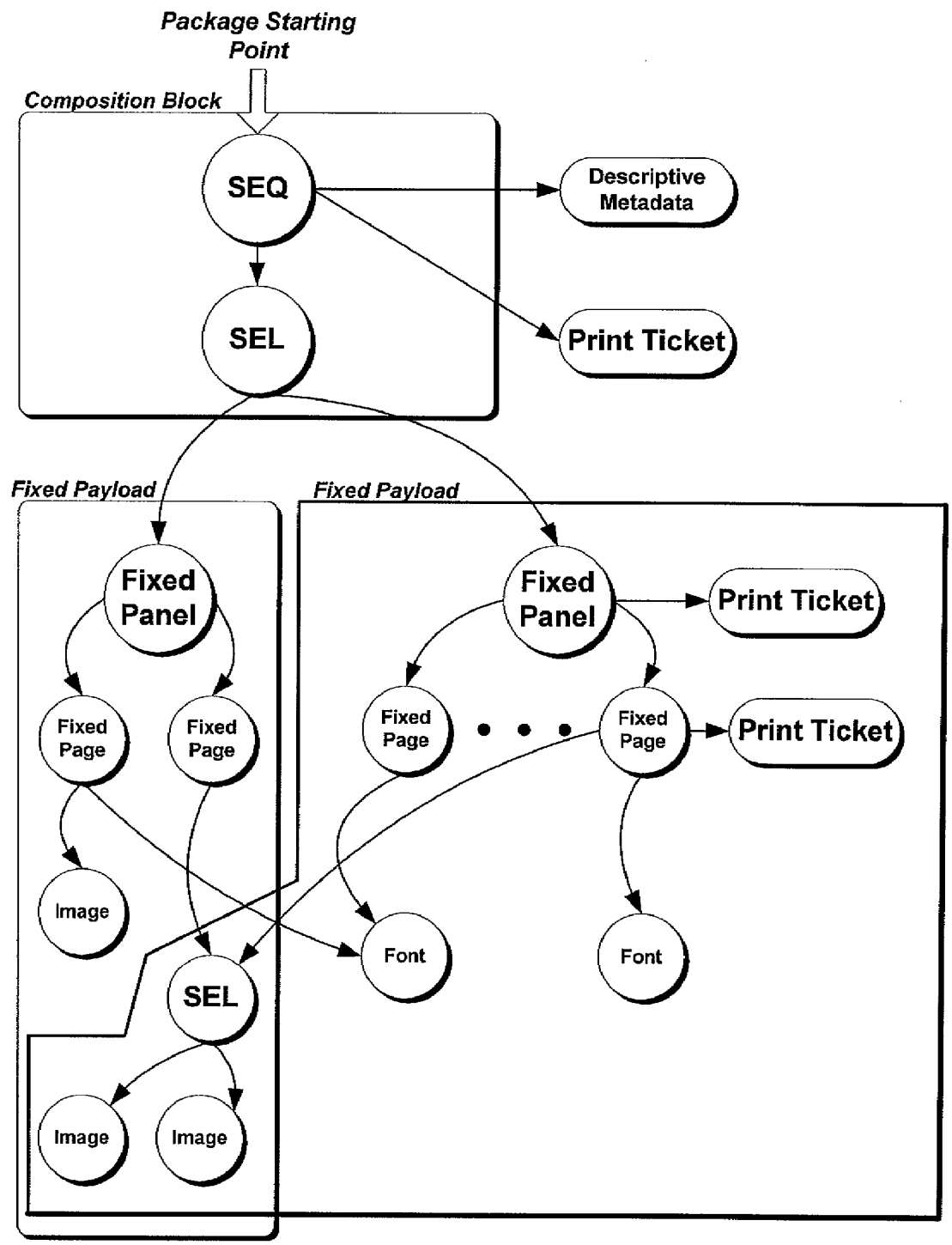
FIG. 10 illustrates an exemplary reach package and each of the valid types of parts that can make up or be found in a package, in accordance with one embodiment.

FIG. 10 illustrates an exemplary reach package and, in this embodiment, each of the valid types of parts that can make up or be found in a package. The table provided just below lists each valid part type and provides a description of each:

Reach Composition Parts

A reach package must contain at least one FixedPanel that is "discoverable" by traversing the composition block from the starting part of the package. In accordance with the described embodiment, the discovery process follows the following algorithm:

Recursively traverse the graph of composition parts starting at the package starting part.

When performing this traversal, only traverse into composition parts that are reach composition parts (described below).

Locate all of the terminal nodes (those without outgoing arcs) at the edge of the graph.

These terminal nodes refer (via their <item> elements) to a set of parts called the reach payload roots.

Fixed Payload

A fixed payload is a payload whose root part is a FixedPanel part. For example, each of the fixed payloads in FIG. 10 has as its root part an associated FixedPanel part. The payload includes the full closure of all of the parts required for valid processing of the FixedPanel. These include:

The FixedPanel itself,

All FixedPages referenced from within the FixedPanel;

All image parts referenced (directly, or indirectly through a selector) by any of the FixedPages in the payload;

All reach selectors (as described below) referenced directly or indirectly from image brushes used within any of the FixedPages within the payload;

All font parts referenced by any of the FixedPages in the payload;

All descriptive metadata parts attached to any part in the fixed payload; and

Any print tickets attached to any part in the fixed payload.

Validity Rules for Reach Package

With the above definitions in place, conformance rules that describe a "valid" reach package in accordance with the described embodiment are now described:

A reach package must have a starting part defined using the standard mechanism of a package relationship as described above;

| | |
|---|---|
| FixedPage<br>application/xml+FixedPage-PLACEHOLDER | Each FixedPage part represents the content of a page |
| FixedPanel<br>application/xml+FixedPanel-PLACEHOLDER | Each FixedPanel glues together a set of FixedPages in order |
| Font | Fonts can be embedded in a package to ensure reliable reproduction of the document's glyphs. |
| Image<br>image/jpeg<br>image/png | Image parts can be included |
| Composition Parts<br>application/xml+Selector+[XXX]<br>Application/xml+Sequence+[XXX] | Selectors and sequences can be used to build a "composition" block, introducing higher-level organization to the package. |
| Descriptive Metadata<br>application/xml+SimpleTypeProperties-PLACEHOLDER | Descriptive metadata (e.g., title, keywords) can be included for the document. |
| Print Ticket<br>application/xml+PRINTTICKET-PLACEHOLDER | A print ticket can be included to provide settings to be used when printing the package. |

Because a reach package is designed to be a "view and print anywhere" document, readers and writers of reach packages must share common, unambiguously-defined expectations of what constitutes a "valid" reach package. To provide a definition of a "valid" reach package, a few concepts are first defined below.

The starting part of a reach package must be either a selector or a sequence;

A reach package must have at least one reach payload root that is a FixedPanel;

PrintTicket parts may be attached to any of the composition parts, FixedPanel parts or any of the FixedPage parts identified in the FixedPanel(s). In the present example, this is done via the http://PLACEHOLDER/HasPrintTicketRel relationship;

PrintTickets may be attached to any or all of these parts; Any given part must have no more than one PrintTicket attached;

A Descriptive Metadata part may be attached to any part in the package;

Every Font object in the FixedPayload must meet the font format rules defined in section "Font Parts".

References to images from within any FixedPage in the fixed payload may point to a selector which may make a selection (potentially recursively through other selectors) to find the actual image part to be rendered;

Every Image object used in the fixed payload must meet the font format rules defined in section "Image Parts";

For any font, image or selector part referenced from a FixedPage (directly, or indirectly through selector), there must be a "required part" relationship (relationship name=http://mmcf-fixed-RequiredResource-PLACEHOLDER) from the referencing FixedPage to the referenced part.

Reach Composition Parts

While a reach package may contain many types of composition part, only a well-defined set of types of composition parts have well-defined behavior according to this document. These composition parts with well-defined behavior are called reach composition parts. Parts other than these are not relevant when determining validity of a reach package.

The following types of composition parts are defined as reach composition a parts:

Fixed Payloads Parts

The fixed payload can contain the following kinds of parts: a FixedPanel part, a FixedPage part, Image parts, Font parts, Print Ticket parts, and Descriptive Metadata parts, each of which is discussed below under its own sub-heading.

The FixedPanel Part

The document structure of the Fixed-Payload identifies FixedPages as part of a spine, as shown below. The relationships between the spine part and the page parts are defined within the relationships stream for the spine. The FixedPanel part is of content type application/xml+PLACEHOLDER.

The spine of the Fixed-Payload content is specified in markup by including a <FixedPanel> element within a <Document> element. In the example below, the <FixedPanel> element specifies the sources of the pages that are held in the spine.

```
<!-- SPINE -->
<Document $XMLNSFIXED$ >
    <FixedPanel>
        <PageContent Source="p1.xml" />
        <PageContent Source="p2.xml" />
    </FixedPanel>
</Document>
```

The <Document> Element

The <Document> element has no attributes and must have only one child: <FixedPanel>.

The <FixedPanel> Element

The <FixedPanel> element is the document spine, logically binding an ordered sequence of pages together into a

| | |
|---|---|
| Language Selector application/xml+selector+language | Chooses between representations based on their natural language |
| Color Selector application/xml+selector+color | Chooses between representations based on whether they are monochromatic or color |
| Page Size Selector application/xml+selector+pagesize | Chooses between representations based on their page size |
| Content Type Selector application/xml+selector+contenttype | Chooses between representations based on whether their content types can be understood by the system |
| Fixed Sequence application/xml+sequence+fixed | Combines children that are fixed content into a sequence |

Reach Selectors

Those selector composition parts defined as reach composition parts are called reach selectors. As noted above, a language selector picks between representations based on their natural language, such as English or French. To discover this language, the selector inspects each of its items. Only those that are XML are considered. For those, the root element of each one is inspected to determine its language. If the xml:lang attribute is not present, the part is ignored. The selector then considers each of these parts in turn, selecting the first one whose language matches the system's default language.

A color selector chooses between representations based on whether they are monochromatic or color. The page size selector chooses between representations based on their page size. A content type selector chooses between representations based on whether their content types can be understood by the system.

Reach Sequences

Those sequence composition parts defined as reach composition parts are called reach sequences. A fixed sequence combines children that are fixed content into a sequence.

single multi-page document. Pages always specify their own width and height, but a <FixedPanel> element may also optionally specify a height and width. This information can be used for a variety of purposes including, for example, selecting between alternate representations based on page size. If a <FixedPanel> element specifies a height and width, it will usually be aligned with the width and height of the pages within the <FixedPanel>, but these dimensions do not specify the height and width of individual pages.

The following table summarizes FixedPanel attributes in accordance with the described embodiment.

| <FixedPanel> Attribute | Description |
|---|---|
| PageHeight | Typical height of pages contained in the <FixedPanel> Optional |
| PageWidth | Typical width of pages contained in the <FixedPanel> Optional |

The <PageContent> element is the only allowable child element of the <FixedPanel> element. The <PageContent> elements are in sequential markup order matching the page order of the document.

The <PageContent> Element

Each <PageContent> element refers to the source of the content for a single page. To determine the number of pages in the document, one would count the number of <PageContent> children contained within the <FixedPanel>.

The <PageContent> element has no allowable children, and has a single required attribute, Source, which refers to the FixedPage part for the contents of a page.

As with the <FixedPanel> element, the <PageContent> element may optionally include a PageHeight and PageWidth attribute, here reflecting the size of the single page. The required page size is specified in the FixedPage part; the optional size on <PageContent> is advisory only. The <PageContent> size attributes allow applications such as document viewers to make visual layout estimates for a document quickly, without loading and parsing all of the individual FixedPage parts.

The table provided just below summarizes <PageContent> attributes and provides a description of the attributes.

| <PageContent> Attribute | Description |
| --- | --- |
| Source | A URI string that refers to the page content, held in a distinct part within the package. The content is identified as a part within the package. Required. |
| PageHeight | Optional |
| PageWidth | Optional |

The URI string of the page content must reference the part location of the content relative to the package.

The FixedPage Part

Each <PageContent> element in the <FixedPanel> references by name (URI) a FixedPage part. Each FixedPage part contains FixedPage markup describing the rendering of a single page of content. The FixedPage part is of Content Type application/xml+PLACEHOLDER-FixedPage.

Describing FixedPages in Markup

Below is an example of how the markup of the source content might look for the page referenced in the sample spine markup above (<PageContent Source="p1.xml"/>).

```
//   /content/p1.xml
<FixedPage PageHeight="1056" PageWidth="816">
    <Glyphs
        OriginX = "96"
        OriginY = "96"
        UnicodeString = "This is Page 1!"
        FontUri = "../Fonts/Times.TTF"
        FontRenderingEmSize = "16"
    />
</FixedPage>
```

The table below summarizes FixedPage properties and provides a description of the properties.

| FixedPage Property | Description |
| --- | --- |
| PageHeight | Required |
| PageWidth | Required |

Reading Order in FixedPage Markup

In one embodiment, the markup order of the Glyphs child elements contained within a FixedPage must be the same as the desired reading order of the text content of the page. This reading order may be used both for interactive selection/copy of sequential text from a FixedPage in a viewer, and for enabling access to sequential text by accessibility technology. It is the responsibility of the application generating the FixedPage markup to ensure this correspondence between markup order and reading order.

Image Parts

Supported Formats

In accordance with the described embodiment, image parts used by FixedPages in a reach package can be in a fixed number of formats, e.g., PNG or JPEG, although other formats can be used.

Font Parts

In accordance with the described embodiment, reach packages support a limited number of font formats. In the illustrated and described embodiment, the supported font format include the TrueType format and the OpenType format.

As will be appreciated by the skilled artisan, the OpenType font format is an extension of the TrueType font format, adding support for PostScript font data and complex typographical layout. An OpenType font file contains data, in table format, that comprises either a TrueType outline font or a PostScript outline font.

In accordance with the described embodiment, the following font formats are not supported in reach packages: Adobe type 1, Bitmap font, Font with hidden attribute (use system Flag to decide whether to enumerate it or not), Vector fonts, and EUDC font (whose font family name is EUDC).

Subsetting Fonts

Fixed payloads represent all text using the Glyphs element described in detail below. Since, in this embodiment, the format is fixed, it is possible to subset fonts to contain only the glyphs required by FixedPayloads. Therefore, fonts in reach packages may be subsetted based on glyph usage. Though a subsetted font will not contain all the glyphs in the original font, the subsetted font must be a valid OpenType font file.

Print Ticket Parts

Print ticket parts provide settings that can be used when the package is printed. These print tickets can be attached in a variety of ways to achieve substantial flexibility. For example, a print ticket can be "attached" to an entire package and its settings will affect the whole package. Print tickets can be further attached at lower levels in the structure (e.g., to individual pages) and these print tickets will provide override settings to be used when printing the part to which they are attached.

Descriptive Metadata

As noted above, descriptive metadata parts provide writers or producers of packages with a way in which to store values of properties that enable readers of the packages to reliably discover the values. These properties are typically used to record additional information about the package as a whole, as well as individual parts within the container.

FixedPage Markup Basics

This section describes some basic information associated with the FixedPage markup and includes the following sections: "Fixed Payload and Other Markup Standards", "FixedPage Markup Model", "Resources and Resource References", and "FixedPage Drawing Model".

Fixed Payload and Other Markup Standards

The FixedPanel and FixedPage markup for the Fixed Payload in a reach package is a subset from Windows® Longhorn's Avalon XAML markup. That is, while the Fixed Payload markup stands alone as an independent XML markup format (as documented in this document), it loads in the same way as in Longhorn systems, and renders a WYSIWYG reproduction of the original multi-page document.

As some background on XAML markup, consider the following. XAML markup is a mechanism that allows a user to specify a hierarchy of objects and the programming logic behind the objects as an XML-based markup language. This provides the ability for an object model to be described in XML. This allows extensible classes, such as classes in the Common Language Runtime (CLR) of the .NET Framework by Microsoft Corporation, to be accessed in XML. The XAML mechanism provides a direct mapping of XML tags to CLR objects and the ability to represent related code in the markup. It is to be appreciated and understood that various implementations need not specifically utilize a CLR-based implementation of XAML. Rather, a CLR-based implementation constitutes but one way in which XAML can be employed in the context of the embodiments described in this document.

Figure 11:
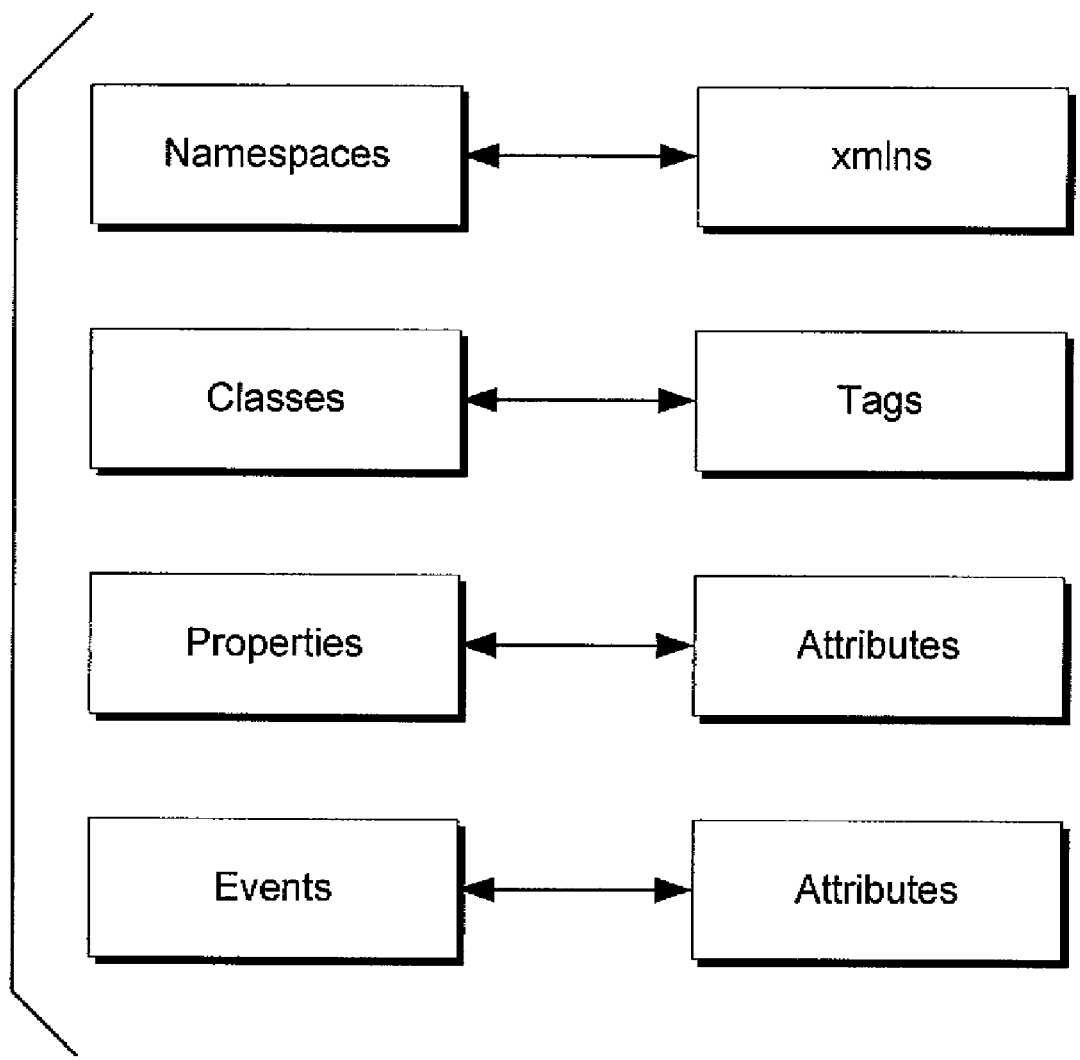
FIG. 11 illustrates an exemplary mapping of Common Language Runtime concepts to XML in accordance with one embodiment.

More specifically, consider the following in connection with FIG. 11 which illustrates an exemplary mapping of CLR concepts (left side components) to XML (right side components). Namespaces are found in the xmlns declaration using a CLR concept called reflection. Classes map directly to XML tags. Properties and events map directly to attributes. Using this hierarchy, a user can specify a hierarchy tree of any CLR objects in XML markup files. Xaml files are xml files with a .xaml extension and a mediatype of application/xaml+xml. Xaml files have one root tag that typically specifies a namespace using the xmlns attribute. The namespace may be specified in other types of tags.

Continuing, tags in a xaml file generally map to CLR objects. Tags can be elements, compound properties, definitions or resources. Elements are CLR objects that are generally instantiated during runtime and form a hierarchy of objects. Compound property tags are used to set a property in a parent tag. Definition tags are used to add code into a page and define resources. The resource tag provides the ability to reuse a tree of objects merely by specifying the tree as a resource. Definition tags may also be defined within another tag as an xmlns attribute.

Once a document is suitably described in markup (typically by a writer), the markup can be parsed and processed (typically by a reader). A suitably configured parser determines from the root tag which CLR assemblies and namespaces should be searched to find a tag. In many instances, the parser looks for and will find a namespace definition file in a URL specified by the xmlns attribute. The namespace definition file provides the name of assemblies and their install path and a list of CLR namespaces. When the parser encounters a tag, the parser determines which CLR class the tag refers to using the xmlns of the tag and the xmlns definition file for that xmlns. The parser searches in the order that the assemblies and namespaces are specified in the definition file. When it finds a match, the parser instantiates an object of the class.

Thus, the mechanism described just above, and more fully in the application incorporated by reference above, allows object models to be represented in an XML-based file using markup tags. This ability to represent object models as markup tags can be used to create vector graphic drawings, fixed-format documents, adaptive-flow documents, and application UIs asynchronously or synchronously.

In the illustrated and described embodiment, the Fixed Payload markup is a very minimal, nearly completely parsimonious subset of Avalon XAML rendering primitives. It represents visually anything that can be represented in Avalon, with full fidelity. The Fixed Payload markup is a subset of Avalon XAML elements and properties—plus additional conventions, canonical forms, or restrictions in usage compared to Avalon XAML.

The radically-minimal Fixed Payload markup set defined reduces the cost associated with implementation and testing of reach package readers, such as printer RIPs or interactive viewer applications—as well as reducing the complexity and memory footprint of the associated parser. The parsimonious markup set also minimizes the opportunities for subsetting, errors, or inconsistencies among reach package writers and readers, making the format and its ecosystem inherently more robust.

In addition to the minimal Fixed Payload markup, the reach package will specify markup for additional semantic information to support viewers or presentations of reach package documents with features such as hyperlinks, section/outline structure and navigation, text selection, and document accessibility.

Finally, using the versioning and extensibility mechanisms described above, it is possible to supplement the minimal Fixed Payload markup with a richer set of elements for specific target consuming applications, viewers, or devices.

FixedPage Markup Model

In the illustrated and described embodiment, a FixedPage part is expressed in an XML-based markup language, based on XML-Elements, XML-Attributes, and XML-Namespaces. Three XML-Namespaces are defined in this document for inclusion in FixedPage markup. One such namespace references the Version-control elements and attributes defined elsewhere in this specification. The principle namespace used for elements and attributes in the FixedPage markup is "http://schemas.microsoft.com/MMCF-PLACEHOLDER-FixedPage". And finally, FixedPage markup introduces a concept of "Resources" which requires a third namespace, described below.

Although FixedPage markup is expressed using XML-Elements and XML-Attributes, its specification is based upon a higher-level abstract model of "Contents" and "Properties". The FixedPage elements are all expressed as XML-elements. Only a handful of FixedPage elements can hold "Contents", expressed as child XML-elements. But a property-value may be expressed using an XML-Attribute or using a child XML-element.

FixedPage Markup also depends upon the twin concepts of a Resource-Dictionary and Resource-Reference. The combination of a Resource-Dictionary and multiple Resource-References allows for a single property-value to be shared by multiple properties of multiple FixedPage-markup elements.

Properties in FixedPage Markup

In the illustrated and described embodiment, there are three forms of markup which can be used to specify the value of a FixedPage-markup property.

If the property is specified using a resource-reference, then the property name is used as an XML-attribute name, and a special syntax for the attribute-value indicates the presence of a resource reference. The syntax for expressing resource-references is described in the section entitled "Resources and Resource-References".

Any property-value that is not specified as a resource-reference may be expressed in XML using a nested child XML-element identifying the property whose value is being set. This "Compound-Property Syntax" is described below.

Finally, some non-resource-reference property-values can be expressed as simple-text strings. Although all such property-values may be expressed using Compound-Property Syntax, they may also be expressed using simple XML-attribute syntax For any given element, any property may be set no more than once, regardless of the syntax used for specifying a value.

Simple Attribute Syntax

For a property value expressible as a simple string, XML-attribute-syntax may be used to specify a property-value. For example, given the FixedPage-markup element called "SolidColorBrush," with the property called "Color", the following syntax can be used to specify a property value:

```
<!-- Simple Attribute Syntax -->
<SolidColorBrush Color="#FF0000" />
```

Compound-Property Syntax

Some property values cannot be expressed as a simple string, e.g. an XML-element is used to describe the property value. Such a property value cannot be expressed using simple attribute syntax. But they can be expressed using compound-property syntax.

In compound-property syntax, a child XML-Element is used, but the XML-Element name is derived from a combination of the parent-element name and the property name, separated by dot. Given the FixedPage-markup element <Path>, which has a property "Fill" which may be set to a <SolidColorBrush>, the following markup can be used to set the "Fill" property of the <Path> element:

```
<!-- Compound-Property Syntax -->
<Path>
    <Path.Fill>
        <SolidColorBrush Color="#FF0000" />
    </Path.Fill>
    ...
</Path>
```

Compound-Property Syntax may be used even in cases where Simple-Attribute Syntax would suffice to express a property-value. So, the example of the previous section:

```
<!-- Simple Attribute Syntax -->
<SolidColorBrush Color="#FF0000" />
```

Can be expressed instead in Compound-Property Syntax:

```
<!-- Compound-Property Syntax -->
<SolidColorBrush>
    <SolidColorBrush.Color>#FF0000</SolidColorBrush.Color>
</SolidColorBrush>
```

When specifying property-value using Compound-Property Syntax, the child XML-elements representing "Properties" must appear before child XML-elements representing "Contents". The order of individual Compound-Property child XML-elements is not important, only that they appear together before any "Contents" of the parent-element.

For example, when using both Clip and RenderTransform properties of the <Canvas> element (described below), both must appear before any <Path> and <Glyphs> Contents of the <Canvas>:

```
<Canvas>
    <!-- First, the property-related child elements -->
    <Canvas.RenderTransform>
        <MatrixTransform Matrix="1,0,0,1,0,0">
    </Canvas.RenderTransform>
    <Canvas.Clip>
        <PathGeometry>
        ...
        </PathGeometry>
    </Canvas.Clip>
    <!-- Then, the "Contents" -->
    <Path ...>
    ...
    </Path>
    <Glyphs ...>
    ...
    </Glyphs>
</Canvas>
```

Resources and Resource References

Resource Dictionaries can be used to hold shareable property values, each called a resource. Any property value which is itself a FixedPage-markup element may be held in a Resource Dictionary. Each resource in a Resource Dictionary carries a name. The resource's name can be used to reference the resource from a property's XML-attribute.

In the illustrated and described embodiment, the <Canvas> and <FixedPage> elements can carry a Resource Dictionary. A Resource Dictionary is expressed in markup as a property of the <Canvas> and <FixedPage> elements in a property called "Resources". However, individual resource-values are embedded directly within the <FixedPage.Resources> or <Canvas.Resources> XML-element. Syntactically, the markup for <Canvas.Resources> and <FixedPage.Resource> resembles that for markup elements with "Contents".

In accordance with this embodiment, <Canvas.Resources> or <FixedPage.Resources> must precede any compound-property-syntax property values of the <Canvas> or <FixedPage>. They similarly must precede any "Contents" of the <Canvas> or <FixedPage>.

Defining Fixed-Payload Resource Dictionaries

Any <FixedPage> or <Canvas> can carry a Resource Dictionary, expressed using the <Canvas.Resources> XML-element. Each element within a single resource dictionary is given a unique name, identified by using an XML-attribute associated with the element. To distinguish this "Name" attribute from those attributes corresponding to properties, the Name attribute is taken from a namespace other than that of the FixedFormat elements. The URI for that XML-namespace is "http://schemas.microsoft.com/PLACEHOLDER-for-resources". In the example below, two geometries are defined: one for a rectangle and the other for a circle.

```
<Canvas xmlns:def="http://schemas.microsoft.com/PLACEHOLDER-for-resources">
    <Canvas.Resources>
        <PathGeometry def:Name="Rectangle">
            <PathFigure>
            ...
            </PathFigure>
        </PathGeometry>
        <PathGeometry def:Name="Circle">
```

-continued

```
        <PathFigure>
            ...
        </PathFigure>
    </PathGeometry>
</Canvas.Resources>
</Canvas>
```

Referencing Resources

To set a property value to one of the resources defined above, use an XML-attribute value which encloses the resource name in { }. For example, "{Rectangle}" will denote the geometry to be used. In the markup sample below, the rectangular region defined by the geometry objects in the dictionary will be filled by the SolidColorBrush.

```
<Canvas>
    <Canvas.Resources>
        <PathGeometry def:Name="Rectangle">
            ...
        </PathGeometry>
    </Canvas.Resources>
    <Path>
        <Path.Data>
            <PathGeometry PathGeometry="{Rectangle}" />
        </Path.Data>
        <Path.Fill>
            <SolidColorBrush Color="#FF0000" />
        </Path.Fill>
    </Path>
</Canvas>
```

In accordance with this embodiment, a resource reference must not occur within the definition of a resource in a Resource Dictionary.

Scoping Rules for Resolving Resource References

Although a single Name may not be used twice in the same Resource Dictionary, the same name may be used in two different Resource Dictionaries within a single FixedPage part. Furthermore, the Resource Dictionary of an inner <Canvas> may re-use a Name defined in the Resource Dictionary of some outer <Canvas> or <FixedPage>.

When a resource-reference is used to set a property of an element, various Resource Dictionaries are searched for a resource of the given name. If the element bearing the property is a <Canvas>, then the Resource Dictionary (if present) of that <Canvas> is searched for a resource of the desired name. If the element is not a <Canvas> then search begins with the nearest containing <Canvas> or <FixedPage>. If the desired name is not defined in the initially searched Resource Dictionary, then the next-nearest containing <Canvas> or <FixedPage> is consulted. An error occurs if the search continued to the root <FixedPage> element, and a resource of the desired name is not found in a Resource Dictionary associated with that <FixedPage>.

The example below demonstrates these rules.

```
<FixedPage xmlns:def="http://schemas.microsoft.com/PLACEHOLDER-for-resources"
    PageHeight="1056" PageWidth="816">
    <FixedPage.Resources>
        <Fill def:Name="FavoriteColorFill">
            <SolidColorBrush Color="#808080" />
        </Fill>
    </FixedPage.Resources>
```

-continued

```
    <Canvas>
        <Canvas.Resources>
            <Fill def:Name="FavoriteColorFill">
                <SolidColorBrush Color="#000000" />
            </Fill>
        </Canvas.Resources>
        <!-- The following Path will be filed with
        color #000000 -->
        <Path Fill="{FavoriteColorFill}">
            <Path.Data>
                ...
            </Path.Data>
        </Path>
        <Canvas>
            <!-- The following Path will be filed with
            color #000000 -->
            <Path Fill="{FavoriteColorFill}">
                <Path.Data>
                    ...
                </Path.Data>
            </Path>
        </Canvas>
    </Canvas>
    <-- The following path will be filled with color #808080 -->
    <Path Fill="{FavoriteColorFill}">
        <Path.Data>
            ...
        </Path.Data>
    </Path>
</FixedPage>
```

FixedPage Drawing Model

The FixedPage (or a nested Canvas child) element is the element on which other elements are rendered. The arrangement of content is controlled by properties specified for the FixedPage (or Canvas), the properties specified for elements on the FixedPage (or Canvas), and by compositional rules defined for the Fixed-Payload namespace.

Using Canvas to Position Elements

In fixed markup, all elements are positioned relative to the current origin (0,0) of the coordinate system. The current origin can be moved by applying the RenderTransform attribute to each element of the FixedPage or Canvas that contains an element.

The following example illustrates positioning of elements through RenderTransform.

```
<Canvas>
    <Canvas.Resources>
        <PathGeometry def:Name="StarFish">
            <!-- Various PathFigures in here -->
            ...
        </PathGeometry>
        <PathGeometry def:Name="LogoShape">
            <!-- Various PathFigures in here -->
            ...
        </PathGeometry>
    </Canvas.Resources>
    <!-- Draw a green StarFish and a red LogoShape shifted by 100 to
    the right and 50 down -->
    <Canvas>
        <Canvas.RenderTransform>
            <MatrixTransform Matrix="1,0,0,1,100,50"/>
        </Canvas.RenderTransform>
        <Path Fill="#00FF00" Data="{StarFish}"/>
        <Path Fill="#FF0000" Data="{LogoShape}"/>
    </Canvas>
    <!-- Draw a green StarFish and a red LogoShape shifted by 200 to
    the right and 250 down -->
    <Canvas>
        <Canvas.RenderTransform>
            <MatrixTransform Matrix="1,0,0,1,200,250"/>
```

-continued

```
        </Canvas.RenderTransform>
        <Path Fill="#00FF00" Data="{StarFish}"/>
        <Path Fill="#FF0000" Data="{LogoShape}"/>
    </Canvas>
</Canvas>
```

Coordinate Systems and Units

In accordance with the illustrated and described embodiment, the coordinate system is initially set up so that one unit in that coordinate system is equal to $1/96^{th}$ of an inch, expressed as a floating point value, the origin (0,0) of the coordinate system is the left top corner of the FixedPage element.

A RenderTransform attribute can be specified on any child element to apply an affine transform to the current coordinate system.

Page Dimensions

The page dimensions are specified by the "PageWidth" and "PageHeight" parameters on the FixedPage element.

Composition Rules

FixedPages use the painter's model with alpha channel. In accordance with the described embodiment, composition must occur according to these rules, and in the following order:

The FixedPage (or any nested Canvas) is thought of as a unbounded surface to which child elements are drawn in the order they appear in the markup. The alpha channel of this surface is initialized to "0.0" (all transparent). In practice the ideal unbounded surface can be thought of as a bitmap buffer large enough to hold all marks produced by rendering all the child elements.

The contents of the surface are transformed using the affine transform specified by the RenderTransform property of the FixedPage (or Canvas).

All child elements are rendered onto the surface, clipped by the Clip property (which is also transformed using the RenderTransform property) of the FixedPage (or Canvas). The FixedPage additionally clips to the rectangle specified by (0,0,PageWidth,PageHeight). If a child element has an Opacity property or OpacityMask property, it is applied to the child element before it is rendered onto the surface.

Finally, the contents of the FixedPage (or Canvas) are rendered onto its containing element. In the case of FixedPage, the containing element is the physical imaging surface.

Rendering occurs according to these rules:

The only elements that produce marks on a surface are "Glyphs" and "Path".

All other rendering effects can be achieved by positioning "Glyphs" and "Path" elements onto a "Canvas", and applying their various valid attributes.

Fixed-Payload Elements and Properties

The Fixed Payload, in accordance with the illustrated and described embodiment, includes a small set of XML elements used in markup to represent pages and their contents. The markup in a FixedPanel part brings the pages of a document together to a common, easily-indexed root, using <Document>, <FixedPanel>, and <PageContent> elements. Each FixedPage part represents a page's contents in a <FixedPage> element with only <Path> and <Glyphs> elements (which together do all of the drawing), and the <Canvas> element to group them.

The Fixed-Payload markup's element hierarchy is summarized in following sections entitled "Top-level elements", "Geometry for Path, Clip", "Brushes used to fill a Path, Glyphs, or OpacityMask", "Resource dictionaries for FixedPage or Canvas", "Opacity masks for alpha transparency", "Clipping paths" and "Transforms".

Top-Level Elements
    <Document> [exactly one per FixedPanel part]
        Attributes:
            [none]
        Child Elements:
            <FixedPanel> [exactly one]
    <FixedPanel>
        Attributes:
            PageHeight [optional]
            PageWidth [optional]
        Child Elements:
            <PageContent>[1-N of these child elements]
    <PageContent>
        Attributes:
            Source [required]
            PageHeight [optional]
            PageWidth [optional]
        Child Elements:
            [none]
    <FixedPage>
        Properties expressed via simple XML attributes directly:
            PageHeight [required (here or as child element)]
            PageWidth [required (here or as child element)]
        Resource dictionary itself expressed as an XML child element:
            <FixedPage.Resources>
        Properties expressed via XML child elements
            <FixedPage.PageHeight>[required (here or as attribute)]
            <FixedPage.PageWidth>[required (here or as attribute)]
        Content via XML child Elements:
            <Canvas>
            <Path>
            <Glyphs>
    <Canvas>
        Properties expressed via simple XML attributes directly:
            Opacity
        Properties expressed via resource dictionary reference:
            Clip
            RenderTransform
            OpacityMask
        Resource dictionary itself expressed as an XML child element:
            <Canvas-Resources>
        Properties expressed via XML child elements
            <Canvas.Opacity>
            <Canvas.Clip>
            <Canvas.RenderTransform>
            <Canvas.OpacityMask>
        Content via XML child Elements:
            <Canvas>
            <Path>
            <Glyphs>
    <Path>
        Properties expressed via simple XML attributes directly:
            Opacity
        Properties expressed via resource dictionary reference:
            Clip
            RenderTransform OpacityMask
Fill
Properties expressed via XML child elements
  <Path.Opacity>
  <Path.Clip>
  <Path.RenderTransform>
  <Path.OpacityMask>
  <Path.Fill>
  <Path.Data>
<Glyphs>
  Properties expressed via simple XML attributes directly:
    Opacity
    BidiLevel
    FontFaceIndex
    FontHintingEmSize
    FontRenderingEmSize
    FontUri
    Indices
    OriginX
    OriginY
    Sideways
    StyleSimulations
    UnicodeString
  Properties expressed via resource dictionary reference:
    Clip
    RenderTransform
    OpacityMask
    Fill
  Properties expressed via XML child elements
    <Glyphs.Clip>
    <Glyphs.RenderTransform>
    <Glyphs.OpacityMask>
    <Glyphs.Fill>
    <Glyphs.Opacity>
    <Glyphs.BidiLevel>
    <Glyphs.FontFaceIndex>
    <Glyphs.FontHintingEmSize>
    <Glyphs.FontRenderingEmSize>
    <Glyphs.FontUri>
    <Glyphs.Indices>
    <Glyphs.OriginX>
    <Glyphs.OriginY>
    <Glyphs.Sideways>
    <Glyphs-StyleSimulations>
    <Glyphs.UnicodeString>
Geometry for Path, Clip
<Path-Data>
  Attributes:
    [none]
  Property value expressed as a single XML child element:
    [Path.Data has exactly one total of these children]
      <GeometryCollection>
      <PathGeometry>
<GeometryCollection>
  Attributes:
    CombineMode
  Child Elements:
    [1-N children]
      <GeometryCollection>
      <PathGeometry>
<PathGeometry>
  Attributes:
    FillRule
  Child Elements:
    [1-N children]
      <PathFigure>
<PathFigure>
  Attributes:
    [None]
  Child Elements:
    [StartSegment comes first, CloseSegment last, 1-N of Poly* in between.]
      <StartSegment>
      <PolyLineSegment>
      <PolyBezierSegment>
      <CloseSegment>
<StartSegment>
  Properties expressed via simple XML attributes directly:
    Point
  Properties expressed via XML child elements
    <StartSegment.Point>
<PolyLineSegment>
  Properties expressed via simple XML attributes directly:
    Points
  Properties expressed via XML child elements
    <PolyLineSegment.Points>
<PolyBezierSegment>
  Properties expressed via simple XML attributes directly:
    Points
  Properties expressed via XML child elements
    <PolyBezierSegment.Points>
Brushes Used to Fill a Path, Glyphs, or OpacityMask
<Path.Fill>
  Attributes:
    [none]
  Property value expressed as a single XML child element:
    [Path.Fill has exactly one of these children]
      <SolidColorBrush>
      <ImageBrush>
      <DrawingBrush>
      <LinearGradientBrush>
      <RadialGradientBrush>
<Glyphs.Fill>
  Attributes:
    [none]
  Property value expressed as a single XML child element:
    [Glyphs.Fill has exactly one of these children]
      <SolidColorBrush>
      <ImageBrush>
      <DrawingBrush>
      <LinearGradientBrush>
      <RadialGradientBrush>
<SolidColorBrush>
  Properties expressed via simple XML attributes directly:
    Opacity
    Color
  Properties expressed via XML child elements
    <SolidColorBrush.Opacity>
    <SolidColorBrush.Color>
<ImageBrush>
  Properties expressed via simple XML attributes directly:
    Opacity
    HorizontalAlignment VerticalAlignment
ViewBox
ViewPort
Stretch
TileMode
ContentUnits
ViewportUnits
ImageSource
Properties expressed via resource dictionary reference:
    Transform
Properties expressed via XML child elements
    <ImageBrush.Opacity>
    <ImageBrush.Transform>
    <ImageBrush.HorizontalAlignment>
    <ImageBrush.VerticalAlignment>
    <ImageBrush.ViewBox>
    <ImageBrash.ViewPort>
    <ImageBrush.Stretch>
    <ImageBrush.TileMode>
    <ImageBrush.ContentUnits>
    <ImageBrush.ViewportUnits>
    <ImageBrush.ImageSource>
<DrawingBrush>
    Properties expressed via simple XML attributes directly:
    Opacity
    HorizontalAlignment
    VerticalAlignment
    ViewBox
    ViewPort
    Stretch
    TileMode
    ContentUnits
    ViewportUnits
    Properties expressed via resource dictionary reference:
        Transform
        Drawing
    Properties expressed via XML child elements
        <DrawingBrush.Opacity>
        <DrawingBrush.Transform>
        <DrawingBrush.HorizontalAlignment>
        <DrawingBrush.VerticalAlignment>
        <DrawingBrush.ViewBox>
        <DrawingBrush.ViewPort>
        <DrawingBrush.Stretch>
        <DrawingBrush.TileMode>
        <DrawingBrush.ContentUnits>
        <DrawingBrush.ViewportUnits>
        <DrawingBrush.Drawing>
<DrawingBrush.Drawing>
    Content via XML child Elements:
        <Canvas>
        <Path>
        <Glyphs>
<LinearGradientBrush>
    Properties expressed via simple XML attributes directly:
        Opacity
        MappingMode
        SpreadMethod
        StartPoint
        EndPoint
    Properties expressed via resource dictionary reference:
        Transform
        GradientStops
    Properties expressed via XML child elements
        <LinearGradientBrush.Opacity>
        <LinearGradientBrush.Transform>
        <LinearGradientBrush.MappingMode>
        <LinearGradientBrush.SpreadMethod>
        <LinearGradientBrush.StartPoint>
        <LinearGradientBrush.EndPoint>
        <LinearGradientBrush.GradientStops>
<RadialGradientBrush>
    Properties expressed via simple XML attributes directly:
        Opacity
        Center
        Focus
        RadiusX
        RadiusY
    Properties expressed via resource dictionary reference:
        Transform
        GradientStops
    Properties expressed via XML child elements
        <RadialGradientBrush.Opacity>
        <RadialGradientBrush.Transform>
        <RadialGradientBrush.Center>
        <RadialGradientBrush.Focus>
        <RadialGradientBrush.RadiusX>
        <RadialGradientBrush.RadiusY>
        <RadialGradientBrush.GradientStops>
<GradientStops>
    Content via XML child Elements:
        <GradientStop> [1-N of these children]
<GradientStop>
    Properties expressed via simple XML attributes directly:
        Color
        Offset
    Properties expressed via XML child elements
        <GradientStop.Color>
        <GradientStop.Offset>
Resource Dictionaries for FixedPage or Canvas
<FixedPage.Resources>
<Canvas.Resources>
These elements are discussed above in the section that discusses Resource Dictionaries.
Opacity Masks for Alpha Transparency
<Canvas.OpacityMask>
    Attributes:
        [none]
    Property value expressed as a single XML child element:
        [Canvas.OpacityMask has exactly one of these children]
            <SolidColorBrush>
            <ImageBrush>
            <DrawingBrush>
            <LinearGradientBrush>
            <RadialGradientBrush>
<Path.OpacityMask>
    Attributes:
        [none]
    Property value expressed as a single XML child element:
        [Path.OpacityMask has exactly one of these children]
            <SolidColorBrush>
            <ImageBrush>
            <DrawingBrush>
            <LinearGradientBrush>
            <RadialGradientBrush>

```
<Glyphs.OpacityMask>
  Attributes:
    [none]
  Property value expressed as a single XML child element:
    [Glyphs.OpacityMask has exactly one of these children]
      <SolidColorBrush>
      <ImageBrush>
      <DrawingBrush>
      <LinearGradientBrush>
      <RadialGradientBrush>
Clipping Paths
<Canvas.Clip>
  Attributes:
    [none]
  Property value expressed as a single XML child element:
    [Canvas.Clip has exactly one of these children]
      <GeometryCollection>
      <PathGeometry>
<Path.Clip>
  Attributes:
    [none]
  Property value expressed as a single XML child element:
    [Path.Clip has exactly one of these children]
      <GeometryCollection>
      <PathGeometry>
<Glyphs.Clip>
  Attributes:
    [none]
  Property value expressed as a single XML child element:
    [Glyphs.Clip has exactly one of these children]
      <GeometryCollection>
      <PathGeometry>
Transforms
<Canvas.RenderTransform>
  Property value expressed as a single XML child element:
    <MatrixTransform> [required]
<Path.RenderTransform>
  Property value expressed as a single XML child element:
    <MatrixTransform> [required]
<Glyphs.RenderTransform>
  Property value expressed as a single XML child element:
    <MatrixTransform> [required]
<MatrixTransform>
  Properties expressed via simple XML attributes directly:
    Matrix
  Properties expressed via XML child elements
    <MatrixTransform.Matrix>
<ImageBrush.Transform>
  Properties expressed via simple XML attributes directly:
    MatrixTransform
  Properties expressed via XML child elements
    <ImageBrush.Transform.MatrixTransorm>
<DrawingBrush.Transform>
  Properties expressed via simple XML attributes directly:
    MatrixTransform
  Properties expressed via XML child elements
    <DrawingBrush.Transform.MatrixTransform>
<LinearGradientBrush.Transform>
  Properties expressed via simple XML attributes directly:
    MatrixTransform
  Properties expressed via XML child elements
    <LinearGradientBrush.Transform.MatrixTransform>
<RadialGradientBrush.Transform>
  Properties expressed via simple XML attributes directly:
    MatrixTransform
  Properties expressed via XML child elements
    <RadialGradientBrush.Transform.MatrixTransform>
```

FixedPage Markup

Each FixedPage part represents a page's contents in XML markup rooted in a <FixedPage> element. This FixedPage markup provides WYSIWYG fidelity of a document between writers and readers, with only a small set of elements and properties: <Path> and <Glyphs> elements (which together do all of the drawing), and the <Canvas> element to group them.

Common Element Properties

Before discussing attributes specific to each element in FixedPage markup, consider the attributes common to the drawing and grouping elements: Opacity, Clip, RenderTransform, and OpacityMask. Not only are these the only properties common to the top-level elements, they are also the only properties that "accumulate" their results from parent to child element, as described in the Composition Rules section above. The accumulation is a result of the application of the Composition Rules. The table that follows provides a summary description of these common attributes, followed by a more thorough discussion of each of the attributes.

| | Elements | Description |
|---|---|---|
| Attribute | | |
| Opacity | Canvas, Path, Glyphs, and SolidColorBrush, ImageBrush, DrawingBrush, LinearGradientBrush, RadialGradientBrush | Defines uniform transparency of the element |
| Child Element | | |
| Clip | Canvas, Path, Glyphs | Clip restricts the region to which a brush can be applied on the canvas. |

-continued

| Elements | | Description |
|---|---|---|
| RenderTransform | Canvas, Path, Glyphs | RenderTransform establishes a new coordinate frame for the children of the element. Only MatrixTransform supported |
| OpacityMask | Canvas, Path, Glyphs | Specifies a rectangular mask of alpha values that is applied in the same fashion as the Opacity attribute, but allow different alpha value on a pixel-by-pixel basis |

Opacity Attribute

Opacity is used to transparently blend the two elements when rendering (Alpha Blending). The Opacity attribute ranges from 0 (fully transparent) to 1 (fully opaque). Values outside of this inclusive range are clamped to this range during markup parsing. So, effectively, [$-\infty$ . . . 0] is transparent and [1 . . . $\infty$] is opaque.

The Opacity Attribute is applied through the following computations (assuming non-premultiplied source and destination colors, both specified as scRGB):

$O_E$: Opacity attribute of element or alpha value at corresponding position in OpacityMask
  $A_S$: Alpha value present in source surface
  $R_S$: Red value present in source surface
  $G_S$: Green value present in source surface
  $B_S$: Blue value present in source surface
  $A_D$: Alpha value already present in destination surface
  $R_D$: Red value already present in destination surface
  $G_D$: Green value already present in destination surface
  $B_D$: Blue value already present in destination surface
  $A^*$: Resulting Alpha value for destination surface
  $R^*$: Resulting Red value for destination surface
  $G^*$: Resulting Green value for destination surface
  $B^*$: Resulting Blue value for destination surface All values designated with a T subscript are temporary values (e.g. $R_{T1}$).

Step 1: Multiply Source Alpha Value with Opacity Value $A_S = A_S * O_E$

Step 2: Premultiply Source Alpha $A_{T1} = A_S$ $R_{T1} = R_S * A_S$ $G_{T1} = G_S * A_S$ $B_{T1} = B_S * A_S$ Step 3: Premultiply Destination Alpha $A_{T2} = A_D$ $R_{T2} = R_D * A_D$ $G_{T2} = G_D * A_D$ $B_{T2} = B_D * A_D$ Step 3: Blend $A_{T2} = (1 - A_{T1}) * A_{T2} + A_{T1}$ $R_{T2} = (1 - A_{T1}) * R_{T2} + R_{T1}$ $G_{T2} = (1 - A_{T1}) * G_{T2} + G_{T1}$ $B_{T2} = (1 - A_{T1}) * B_{T2} + B_{T1}$ Step 4: Reverse Pre-Multiplication If $A_{T2} = 0$, set all $A^* R^* G^* B^*$ to 0.
Else:

$A^* = A_{T2}$ $R^* = R_{T2} / A_{T2}$ $G^* = G_{T2} / A_{T2}$ $B^* = B_{T2} / A_{T2}$

Clip Property

The Clip property is specified as one of the geometric elements <GeometryCollection> or <PathGeometry> (see Path.Data for details).

The Clip property is applied in the following way:
  All rendered contents that fall inside the geometric element described by the Clip child element are visible.
  All rendered contents that fall outside the geometric element described by the Clip child element are not visible.

RenderTransform Child Element

MatrixTransform is the only transformation attribute available to elements. It expresses an affine transformation. The syntax follows:

```
<X.RenderTransform>
    <MatrixTransform Matrix="1,0,0,1,0,0"/>
</X.RenderTransform>
X represents the element to which the transform is applied.
```

The six numbers specified in the Matrix attribute are m00, m01, m10, m11, dx, dy.

The fill matrix looks like:

| $m00$ | $m01$ | 0 |
|---|---|---|
| $m10$ | $m11$ | 0 |
| $dx$ | $dy$ | 1 |

A given coordinate X,Y is transformed with a RenderTransform to yield the resulting coordinate X',Y' by applying these computations:

$X' = X * m00 + Y * m10 + dx$ $Y' = X * m01 + Y * m11 + dy$

OpacityMask Child Element

The OpacityMask specifies a Brush, but in contrast to a Fill Brush, only the alpha channel (see Opacity attribute above) of the brush is used as an additional parameter for rendering the element. Each alpha value for each pixel of the element is then additionally multiplied with the alpha value at the corresponding position in the OpacityMask Brush.

The <Canvas> Element

The <Canvas> element is used to group elements together. Typically, FixedPage elements are grouped together in a <Canvas> when they share a composed common attribute (i.e., Opacity, Clip, RenderTransform, or OpacityMask). By grouping these elements together on a Canvas, common attributes can often be applied to the canvas instead of to the individual elements.

Attributes and Child Elements of <Canvas>

The <Canvas> element has only the common attributes described earlier: Opacity, Clip, RenderTransform, and OpacityMask. They are used with the <Canvas> element as described in the table below:

| Attribute | Effect on Canvas |
|---|---|
| Opacity | Defines uniform transparency of the canvas |
| Child Element | |
| Clip | Clip describes the region to which a brush can be applied by the Canvas' child elements. |
| RenderTransform | RenderTransform establishes a new coordinate frame for the children elements of the canvas, such as another canvas. Only MatrixTransform supported |
| OpacityMask | Specifies a rectangular mask of alpha values that is applied in the same fashion as the Opacity attribute, but allow different alpha value on a pixel-by-pixel basis |

The following markup example illustrates the use of <Canvas>.

```
<Canvas>
    <Path Fill="#0000FF">
        <Path.Data>
            <PathGeometry>
                <PathFigure>
                    <StartSegment Point="0,0"/>
                    <PolylineSegment Points="100,0 100,100 0,100 0,0"/>
                    <CloseSegment/>
                </PathFigure>
            </PathGeometry>
        </Path.Data>
    </Path>
</Canvas>
```

With respect to the reading order in Canvas markup, consider the following. As with FixedPage, the markup order of the Glyphs child elements contained within a Canvas must be the same as the desired reading order of the text content. This reading order may be used both for interactive selection/copy of sequential text from a FixedPage in a viewer, and for enabling access to sequential text by accessibility technology. It is the responsibility of the application generating the FixedPage markup to ensure this correspondence between markup order and reading order.

Child Glyphs elements contained within nested Canvas elements are ordered in-line between sibling Glyphs elements occurring before and after the Canvas.

Example:

```
<FixedPage>
    <Glyphs ... UnicodeString="Now is the time for " />
    <Canvas>
        <Glyphs ... UnicodeString="all good men and women " />
        <Glyphs ... UnicodeString="to come to the aid " />
    </Canvas>
    <Glyphs ... UnicodeString="of the party." />
</FixedPage>
```

The <Path> Element

The Path Element is an XML-based element that describes a geometric region. The geometric region is a shape which may be filled, or used as a clipping path. Common geometry types, such as rectangle and ellipse, can be represented using Path geometries. A path is described by specifying the required Geometry.Data child element and the rendering attributes, such as Fill or Opacity.

Properties and Child Elements of <Path>

The following properties are applicable to <Path> elements as described below:

| Properties | Effect on Path |
|---|---|
| Opacity | Defines uniform transparency of the filled path. |
| Child Element | |
| Clip | Clip describes the region to which a brush can be applied by the path's geometry. |
| RenderTransform | RenderTransform establishes a new coordinate frame for the children elements of the path, such as the geometry defined by Path.Data. Only MatrixTransform supported |
| OpacityMask | Specifies a rectangular mask of alpha values that is applied in the same fashion as the Opacity attribute, but allows different alpha value for different areas of the surface |
| Data | Describes the path's geometry. |
| Fill | Describes the brush used to paint the path's geometry. |

To describe how to paint a region described by the geometry of the <Path.Data> child element, use the Fill property. To restrict the region on which <Path.Data> shapes can be drawn, use the Clip property.

Using <Path> to Describe Geometries

A path's geometry is specified as a series of nested child elements of <Path.Data>, as shown below. The geometry may be represented with either a <GeometryCollection> containing a set of <PathGeometry> child elements, or a single <PathGeometry> child element containing <PathFigures>.

```
<Path>
    <Path.Data>
        <GeometryCollection>
            <PathGeometry>
                <PathFigure>
                    ...
                </PathFigure>
            </PathGeometry>
```

-continued

```
            </GeometryCollection>
        </Path.Data>
    <Path>
```

The same <GeometryCollection> or <PathGeometry> elements define the geometry for a clipping path used in the Clip property of Canvas, Path, or Glyphs.

The following table introduces the hierarchy of child elements defining Path geometries.

| Geometry Elements | Description |
| --- | --- |
| GeometryCollection | A set of PathGeometry elements rendered using Boolean CombineMode operations. |
| PathGeometry | A set of PathFigure elements that are each filled using the same FillRule option. |
| PathFigure StartSegment, PolyLineSegment PolyBezierSegment CloseSegment | A set of one or more segment elements |

GeometryCollection

A GeometryCollection is a set of geometric objects that are combined together for rendering according to Boolean CombineMode options. The GeometryCollection element is the mechanism in FixedPage markup for building visual combinations of geometric shapes.

| Attributes | Effect on GeometryCollection |
| --- | --- |
| CombineMode | Specifies different modes for combining geometries. |

The CombineMode attribute specifies the Boolean operation used to combine the set of geometric shapes in a GeometryCollection. Depending on the mode, different regions will be included or excluded.

| CombineMode Options | Description |
| --- | --- |
| Complement | Specifies that the existing region is replaced by the result of the existing region being removed from the new region. Said differently, the existing region is excluded from the new region. |
| Exclude | Specifies that the existing region is replaced by the result of the new region being removed from the existing region. Said differently, the new region is excluded from the existing region. |
| Intersect | Two regions are combined by taking their intersection. |
| Union | Two regions are combined by taking the union of both. |
| Xor | Two regions are combined by taking only the areas enclosed by one or the other region, but not both. |

CombineModes are handled as follows:

Not Commutative Complement and Exclude are not commutative and therefore are defined between the first geometry in the GeometryCollection and each individual remaining geometries. For example, for the set {g1, g2, g3} a CombineMode of Exclude would be applied as ((g1 exclude g2) and (g1 exclude g3)).

Commutative Boolean operations Union, Xor, Intersect are commutative and therefore apply order-independent to the geometries.

PathGeometry

A PathGeometry element contains a set of PathFigure elements. The union of the PathFigures defines the interior of the PathGeometry.

| Attributes | Effect on GeometryCollection |
| --- | --- |
| FillRule | Specifies alternate algorithms for filling paths that describe an enclosed area. |

With respect to the FillRule attribute, consider the following. The filled area of PathGeometry is defined by taking all of the contained PathFigure that have their Filled attribute set to true and applying the FillRule to determine the enclosed area. FillRule options specify how the intersecting areas of Figure elements contained in a Geometry are combined to form the resulting area of the Geometry.

In accordance with the described embodiment, EvenOdd Fill and Nonzero Fill algorithms are provided.

The EvenOdd Fill algorithm determines the "insideness" of a point on the canvas by drawing a ray from that point to infinity in any direction and then examining the places where a segment of the shape crosses the ray. Starting with a count of zero, add one each time a Segment crosses the ray from left to right and subtract one each time a path segment crosses the ray from right to left. After counting the crossings, if the result is zero then the point is outside the path. Otherwise, it is inside.

The NonZero Fill algorithm determines the "insideness" of a point on the canvas by drawing a ray from that point to infinity in any direction and counting the number of path Segments from the given shape that the ray crosses. If this number is odd, the point is inside; if even, the point is outside.

PathFigure

A PathFigure element is composed of a set of one or more line or curve segments. The segment elements define the shape of the PathFigure. The PathFigure must always define a closed shape.

| Attributes | Effect on PathFigure |
| --- | --- |
| FillRule | Specifies alternate algorithms for filling paths that describe an enclosed area. |

A figure requires a starting point, after which each line or curve segment continues from the last point added. The first segment in the PathFigure set must be a StartSegment, and CloseSegment must be the last segment. StartSegment has a Point attribute. CloseSegment has no attributes.

| StartSegment Attribute | Description |
| --- | --- |
| Point | The location of the line segment (starting point). |

Fixed-Payload Markup for Path.Data Geometries

The following provides the markup for drawing and filling a Path on a Canvas. In the specific example below, a rectangular Path is drawn on a Canvas and filled with a solid green brush.

```
<Canvas>
    <Path Fill="#0000FF">
        <Path.Data>
            <PathGeometry>
                <PathFigure>
                    <StartSegment Point="0,0"/>
                    <PolylineSegment Points="100,0 100,100 0,100 0,0"/>
                    <CloseSegment/>
                </PathFigure>
            </PathGeometry>
        </Path.Data>
    </Path>
</Canvas>
```

The following markup describes drawing a cubic Bézier curve. That is, in addition to the PolyLineSegment, Fixed-Payload markup includes the PolyBezierSegment for drawing cubic Bézier curves.

```
<Canvas>
    <Path Fill="#0000FF">
        <Path.Data>
            <PathGeometry>
                <PathFigure>
                    <StartSegment Point="0,0"/>
                    <PolybezierSegment Points="100,0 100,100 0,100 0,0"/>
                    <CloseSegment/>
                </PathFigure>
            </PathGeometry>
        </Path.Data>
    </Path>
</Canvas>
```

Brushes

A brush is used to paint the interior of geometric shapes defined by the is <Path> element, and to fill the character bitmaps rendered with a <Glyphs> element. A brush is also used in defining the alpha-transparency mask in <Canvas.OpacityMask>, <Path.OpacityMask>, and <Glyphs.OpacityMask>. The FixedPage markup includes the following brushes:

| Brush Type | Description |
| --- | --- |
| SolidColorBrush | Fills defined geometric regions with a solid color. |
| ImageBrush | Fills a region with an image. |
| DrawingBrush | Fills a region with a vector drawing. |
| LinearGradientBrush | Fills a region with a linear gradient. |
| RadialGradientBrush | Fills a region with a radial gradient. |

Attributes vary across brushes, although all brushes have an Opacity attribute. The ImageBrush and DrawingBrush share tiling capabilities. The two gradient-fill brushes have attributes in common as well.

The use of a brush child element in markup is shown below:

```
<Path>
    <Path.Fill>
        <SolidColorBrush Color="#00FFFF"/>
    </Path.Fill>
    ...
</Path>
```

Common Properties for Brushes

In accordance with the described embodiment, the following properties are applicable to all brushes, except for the simple brush SolidColorBrush, which has fewer optional child elements.

| | Brush Type | Description |
| --- | --- | --- |
| Attribute | | |
| Opacity Child Element | All brushes | |
| Transform | All brushes except for SolidColorBrush | Describes a MatrixTransform applied to the brush's coordinate space. |

Common Attributes for DrawingBrush and ImageBrush

| HorizontalAlignment | DrawingBrush, ImageBrush | Center, Left, or Right |
| --- | --- | --- |
| VerticalAlignment | DrawingBrush, ImageBrush | Center, Bottom, or Top |
| ViewBox | DrawingBrush, ImageBrush | |
| ViewPort | DrawingBrush, ImageBrush | |
| Stretch | DrawingBrush, ImageBrush | None, Fill, Uniform, or UniformToFill |
| TileMode | DrawingBrush, ImageBrush | None, Tile, FlipY, FlipX, or FlipXY |
| ContentUnits | DrawingBrush, ImageBrush | Absolute or RelativeToBoundingBox |
| ViewportUnits | DrawingBrush, ImageBrush | Absolute or RelativeToBoundingBox |

The HorizontalAlignment attribute specifies how the brush is aligned horizontally within the area it fills out. The VerticalAlignment attribute specifies how the brush is aligned vertically within the area it fills out. The ViewBox attribute has a default value of (0,0,0,0), interpreted as unset. When unset, no adjustment is made and the Stretch attribute is ignored. The viewbox specifies a new coordinate system for the contents, i.e. redefines the extent and origin of the viewport. The Stretch attribute helps to specify how those contents map into the viewport. The value of the viewBox attribute is a list of four "unitless" numbers <min-x>, <min-y>, <width> and <height>, separated by whitespace and/or a comma, and is of type Rect. The Viewbox rect specifies the rectangle in user space that maps to the bounding box. It works the same as inserting a scaleX and scaleY. The Stretch attribute (in case the option is other than none) provides additional control for preserving the aspect ratio of the graphics. An additional transformation is applied to all descendants of the given element to achieve the specified effect. If there is a transform on the Brush, it is applied "above" the mapping to ViewBox.

The Stretch attribute has the following modes: None, Fill, Uniform, UniformToFill.

| Stretch Attribute Option | Description |
| --- | --- |
| None | Default. Preserve original size. |
| Fill | Aspect ratio is not preserved and the content is scaled to fill the bounds established. |
| Uniform | Scale size uniformly until the image fits the bounds established. |
| UniformToFill | Scale size uniformly to fill the bounds established and clip as necessary. |

Simple Brushes and Their Attributes

The Path.Brush and Canvas.Brush child elements include the following: SolidColorBrush, ImageBrush, and DrawingBrush.

SolidColorBrush fills defined geometric regions with a solid color. If there is an alpha component of the color, it is combined in a multiplicative way with the corresponding opacity attribute in the Brush.

| Attributes | Effect |
| --- | --- |
| Color | Specifies color for filled elements |

The following example illustrates how color attributes are expressed for the SolidColorBrush.

```
<Path>
    <Path.Fill>
        <SolidColorBrush Color="#00FFFF"/>
    </Path.Fill>
    ...
</Path>
```

ImageBrush can be used to fill a space with an image. The markup for ImageBrush allows a URI to be specified. If all other attributes are set to their default values, the image will be stretched to fill the bounding box of the region.

| Attributes | Effect |
| --- | --- |
| ImageSource | Specifies URI of image resource. |

The ImageSource attribute must reference either one of the supported Reach Image Formats or a selector which leads to an image of one of these types.

DrawingBrush can be used to fill a space with a vector drawing. DrawingBrush has a Drawing Child Element, whose use in markup is shown below.

```
<Path>
    <Path.Fill>
        <DrawingBrush>
            <DrawingBrush.Drawing>
                <Drawing>
                    <Path ... />
                    <Glyphs ... />
                </Drawing>
```

```
            </DrawingBrush.Drawing>
        </DrawingBrush>
    </Path.Fill>
</Path>
```

Gradient Brushes and Their Attributes

Gradients are drawn by specifying a set of gradient stops as XML Child Elements of the gradient brushes. These gradient stops specify the colors along some sort of progression. There are two types of gradient brushes supported in this framework: linear and radial.

The gradient is by drawn by doing interpolations between the gradient stops in the specified color space. LinearGradientBrush and GradientBrush share the following common attributes:

| | Description |
| --- | --- |
| Attribute | |
| SpreadMethod | This property describes how the brush should fill the content area outside of the primary, initial gradient area. Default value is Pad. |
| MappingMode | This property determines whether the parameters describing the gradient are interpreted relative to the object bounding box. Default value is relative-to-bounding-box. |
| Child element | |
| GradientStops | Holds an ordered sequence of GradientStop elements |

With respect to the SpreadMethod attribute, consider the following. SpreadMethod options specify how the space is filled. The default value is Pad.

| SpreadMethod Attribute Options | Effect on Gradient |
| --- | --- |
| Pad | The first color and the last color are used to fill the remaining space at the beginning and end, respectively. |
| Reflect | The gradient stops are replayed in reverse order repeatedly to fill the space. |
| Repeat | The gradient stops are repeated in order until the space is filled. |

MappingMode Attribute

With respect to the LinearGradientBrush, consider the following. The LinearGradientBrush specifies a linear gradient brush along a vector.

| Attribute | Description |
| --- | --- |
| EndPoint | End point of the linear gradient. The LinearGradientBrush interpolates the colors from the StartPoint to the EndPoint, where StartPoint represents offset 0, and the EndPoint represents offset 1. Default is 1, 1. |
| StartPoint | Start point of the linear gradient. |

The following markup example shows the use of the LinearGradientBrush. A page with a rectangular path is filled with a linear gradient:

```
<FixedPanel>
    <FixedPage>
        <Path>
            <Path.Fill>
                <LinearGradientBrush StartPoint="0,0" EndPoint="1,0">
                    <LinearGradientBrush.GradientStops>
                        <GradientStopCollection>
                            <GradientStop Color="#FF0000"
Offset="0"/>
                            <GradientStop Color="#0000FF"
Offset="1"/>
                        </GradientStopCollection>
                    </LinearGradientBrush.GradientStops>
                </LinearGradientBrush>
            </Path.Fill>
            <Path.Data>
                <PathGeometry>
                    <PathFigure>
                        <StartSegment Point="0,0"/>
                        <PolyLineSegment Points="100,0 100,100 0,100"/>
                        <CloseSegment/>
                    </PathFigure>
                </PathGeometry>
            </Path.Data>
        </Path>
    </FixedPage>
</FixedPanel>
```

This example shows a page with a rectangular path that is filled with a linear gradient. The Path also has a clip property in the shape of an octagon which clips it.

```
<FixedPanel>
    <FixedPage>
        <Path>
            <Path.Clip>
                <PathGeometry>
                    <PathFigure>
                        <StartSegment Point="25,0"/>
                        <PolyLineSegment Points="75,0 100,25 100,75 75,100 25,100 0,75 0,25"/>
                        <CloseSegment/>
                    </PathFigure>
                </PathGeometry>
            </Path.Clip>
            <Path.Fill>
                <LinearGradientBrush StartPoint="0,0" EndPoint="1,0">
                    <LinearGradientBrush.GradientStops>
                        <GradientStopCollection>
                            <GradientStop Color="#FF0000"
Offset="0"/>
                            <GradientStop Color="#0000FF"
Offset="1"/>
                        </GradientStopCollection>
                    </LinearGradientBrush.GradientStops>
                </LinearGradientBrush>
            </Path.Fill>
            <Path.Data>
                <PathGeometry>
                    <PathFigure>
                        <StartSegment Point="0,0"/>
                        <PolyLineSegment Points="100,0 100,100 0,100"/>
                        <CloseSegment/>
                    </PathFigure>
                </PathGeometry>
            </Path.Data>
        </Path>
    </FixedPage>
</FixedPanel>
```

The RadialGradient is similar in programming model to the linear gradient. However, whereas the linear gradient has a start and end point to define the gradient vector, the radial gradient has a circle along with a focal point to define the gradient behavior. The circle defines the end point of the gradient—in other words, a gradient stop at 1.0 defines the color at the circle's circumference. The focal point defines center of the gradient. A gradient stop at 0.0 defines the color at the focal point.

| Attribute | Description |
|---|---|
| Center | Center point of this radial gradient. The RadialGradientBrush interpolates the colors from the Focus to the circumference of the ellipse. The circumference is determined by the Center and the radii. Default is 0.5, 0.5 |
| Focus | Focus of the radial gradient. |
| RadiusX | Radius in the X dimension of the ellipse which defines the radial gradient. Default is 0.5 |
| RadiusY | Radius in the Y dimension of the ellipse which defines the radial gradient. Default is 0.5 |
| FillGradient | Pad, Reflect, Repeat |

Alpha and Transparency

In accordance with the illustrated and described embodiment, each pixel of each element carries an alpha value ranging from 0.0 (completely transparent) to 1.0 (fully opaque). The alpha value is used when blending elements to achieve the visual effect of transparency.

Each element can have an Opacity attribute with which the alpha value of each pixel of the element will be multiplied uniformly.

Additionally, the OpacityMask allow the specification of per-pixel opacity which will control how rendered content will be blended into its destination. The opacity specified by OpacityMask is combined multiplicatively with any opacity which may already happen to be present in the alpha channel of the contents. The per-pixel Opacity specified by the OpacityMask is determined by looking at the alpha channel of each pixel in the mask—the color data is ignored.

The type of OpacityMask is Brush. This allows the specification of how the Brush's content is mapped to the extent of the content in a variety of different ways. Just as when used to fill geometry, the Brushes default to filling the entire content space, stretching or replicating its content as appropriate. This means that an ImageBrush will stretch its ImageSource to completely cover the contents, a GradientBrush will extend from edge to edge.

The required computations for alpha blending are described in the earlier section "Opacity Attribute".

The following example illustrates how an OpacityMask is used to create a "fade effect" on a Glyphs element. The OpacityMask in the example is a linear gradient that fades from opaque black to transparent black.

```
// /content/p1.xml
<FixedPage PageHeight="1056" PageWidth="816">
    <Glyphs
        OriginX = "96"
        OriginY = "96"
        UnicodeString = "This is Page 1!"
        FontUri = "../Fonts/Times.TTF"
        FontRenderingEmSize = "16 "
    >
        <Glyphs.OpacityMask>
            <LinearGradientBrush StartPoint="0,0"
            EndPoint="1,0">
                <LinearGradientBrush.GradientStops>
                    <GradientStopCollection>
                        <GradientStop Color="#FF000000"
```

```
                Offset="0"/>
              <GradientStop Color="#00000000"
                Offset="1"/>
            </GradientStopCollection>
          </LinearGradientBrush.GradientStops>
        </LinearGradientBrush>
      </Glyphs.OpacityMask>
    </Glyphs>
</FixedPage>
```

Images in Reach Documents

On FixedPages, images fill enclosed regions. To place an image on a FixedPage, a region must first be specified on the page. The region is defined by the geometry of a Path element.

The Fill property of the Path element specifies the fill contents for the described region. Images are one type of fill, drawn into a region by the ImageBrush. All brushes have default behavior that will fill an entire region by either stretching or repeating (tiling) the brush content as appropriate. In the case of ImageBrush, the content specified by the ImageSource property will be stretched to completely cover the region.

The markup below demonstrates how to place an image onto a Canvas.

```
<Canvas>
    <Path>
        <Path.Data>
            <GeometryCollection>
                ...
            </GeometryCollection>
        </Path.Data>
        <Path.Fill>
            <ImageBrush ImageSource="/images/dog.jpg" />
        </Path.Fill>
    </Path>
</Canvas>
```

Since many images are rectangular, including a rectangular Path element in the Resource Dictionary may be useful in simplifying the markup. The Path can then be positioned using a RenderTransform attribute (see above).

```
<Canvas>
    <Canvas.Resources>
        <PathGeometry def:Name="Rectangle">
            <PathFigure>
                <StartSegment Point="0,0"/>
                <PolylineSegment Points="100,0 100,100 0,100"/>
                <CloseSegment/>
            </PathFigure>
        </PathGeometry>
    </Canvas.Resources>
    <Canvas>
        <Canvas.RenderTransform>
            <MatrixTransform Matrix="1,0,0,1,100,100"/>
        </Canvas.RenderTransform>
        <Path Data="{Rectangle}">
            <Path.Fill>
                <ImageBrush ImageSource="/images/dog.jpg" />
            </Path.Fill>
        </Path>
    </Canvas>
</Canvas>
```

Color

Colors can be specified in illustrated and described markup using scRGB or sRGB notation. The scRGB specification is known as "IEC 61966-2-2 scRGB" and can be obtained from www.iec.ch The ARGB parameters are described in the table below.

| Name | Description |
|---|---|
| R | The red scRGB component of the current color |
| G | The green scRGB component of the current color |
| B | The blue scRGB component of the current color |
| A | The alpha scRGB component of the current color |

Color Mapping

Currently, consideration is being given to the tagging of colored elements with metadata specifying color context. Such metadata could contain an ICC color profile, or other color definition data.

The <Glyphs> Element

Text is represented in Fixed Payloads using a Glyphs element. The element is designed to meet requirements for printing and reach documents.

Glyphs elements may have combinations of the following properties.

| Property | Purpose | Markup representation (Glyphs element) |
|---|---|---|
| Origin | Origin of first glyph in run. The glyph is placed so that the leading edge of its advance vector and it's baseline intersect this point. | Specified by OriginX and OriginY properties |
| FontRenderingEmSize | Font size in drawing surface units (default 96ths of an inch) | Measured in Length units. |
| FontHintingEmSize | Size to hint for in points. Fonts may include hinting to produce subtle differences at different sizes, such as thicker stems and more open bowls in smaller sizes, to produce results that look more like the same style than pure scaling can. This is not the same as hinting for device pixel resolution, which is handled automatically. To | Measured in doubles representing points size of the font |

-continued

| Property | Purpose | Markup representation (Glyphs element) |
|---|---|---|
| | date (March 2003) no known fonts include size hinting. Default value - 12 pts. | |
| GlyphIndices | Array of 16 bit glyph numbers that represent this run. | Part of Indices property. See below for representation. |
| AdvanceWidths | Array of advance widths, one for each glyph in GlyphIndices. The nominal origin of the nth glyph in the run (n > 0) is the nominal origin of the n − 1th glyph plus the n − 1th advance width added along the runs advance vector. Base glyphs generally have a non-zero advance width, combining glyphs generally have a zero advance width. | Part of Indices property. See below for representation. |
| GlyphOffsets | Array of glyph offsets. Added to the nominal glyph origin calculated above to generate the final origin for the glyph. Base glyphs generally have a glyph offset of (0, 0), combining glyphs generally have an offset that places them correctly on top of the nearest preceding base glyph. | Part of Indices property. See below for representation. |
| GlyphTypeface | The physical font from which all glyphs in this run are drawn. | FontUri, FontFaceIndex and StyleSimulations properties |
| UnicodeString | Optional* Array of characters represented by this glyph run. *Note that for GlyphRun's generated from Win32 printer drivers, text that was originally printed by Win32 ExtTextOut(ETO_GLYPHINDEX) calls is passed to the driver with glyph indices and without Unicode codepoints. In this case, the generated Glyphs markup, and thus the constructed GlyphRun object will omit the codepoints. With no codepoints, functionality such as cut and past or search in a fixed format viewer are unavailable, however text display remains possible. | yes |
| ClusterMap | One entry per character in UnicodeString. Each value gives the offset of the first glyph in GlyphIndices that represents the corresponding character in UnicodeString. Where multiple characters map to a single glyph, or where a single character maps to multiple glyphs, or where multiple characters map to multiple glyphs indivisibly, the character or character(s) and glyph or glyph(s) are called a cluster. All entries in the ClusterMap for a multi-character cluster map to the offset in the GlyphIndices array of the first glyph of the cluster. | Part of Indices property. See below for representation. |
| Sideways | The glyphs are laid out on their side. By default, glyphs are rendered as they would be in horizontal text, with the origin corresponding to the Western baseline origin. With the sideways flag set, the glyph is turned on it's side, with the origin being the top center of the unturned glyph. | yes |
| BidiLevel | The Unicode algorithm bidi nesting level. Numerically even values imply left-to-right layout, numerically odd values imply right-to-left layout. | yes |

-continued

| Property | Purpose | Markup representation (Glyphs element) |
|---|---|---|
| | Right-to-left layout places the run origin at the right side of the first glyph, with positive values in the advance vector placing subsequent glyphs to the left of the previous glyph. | |
| Brush | The foreground brush used to draw glyphs | Picked up from the Shape Fill property. |
| Language | Language of the run, usually comes from the xml:lang property of markup. | Specified by xml:lang property |

Overview of Text Markup
Glyph Metrics

Figure 12:
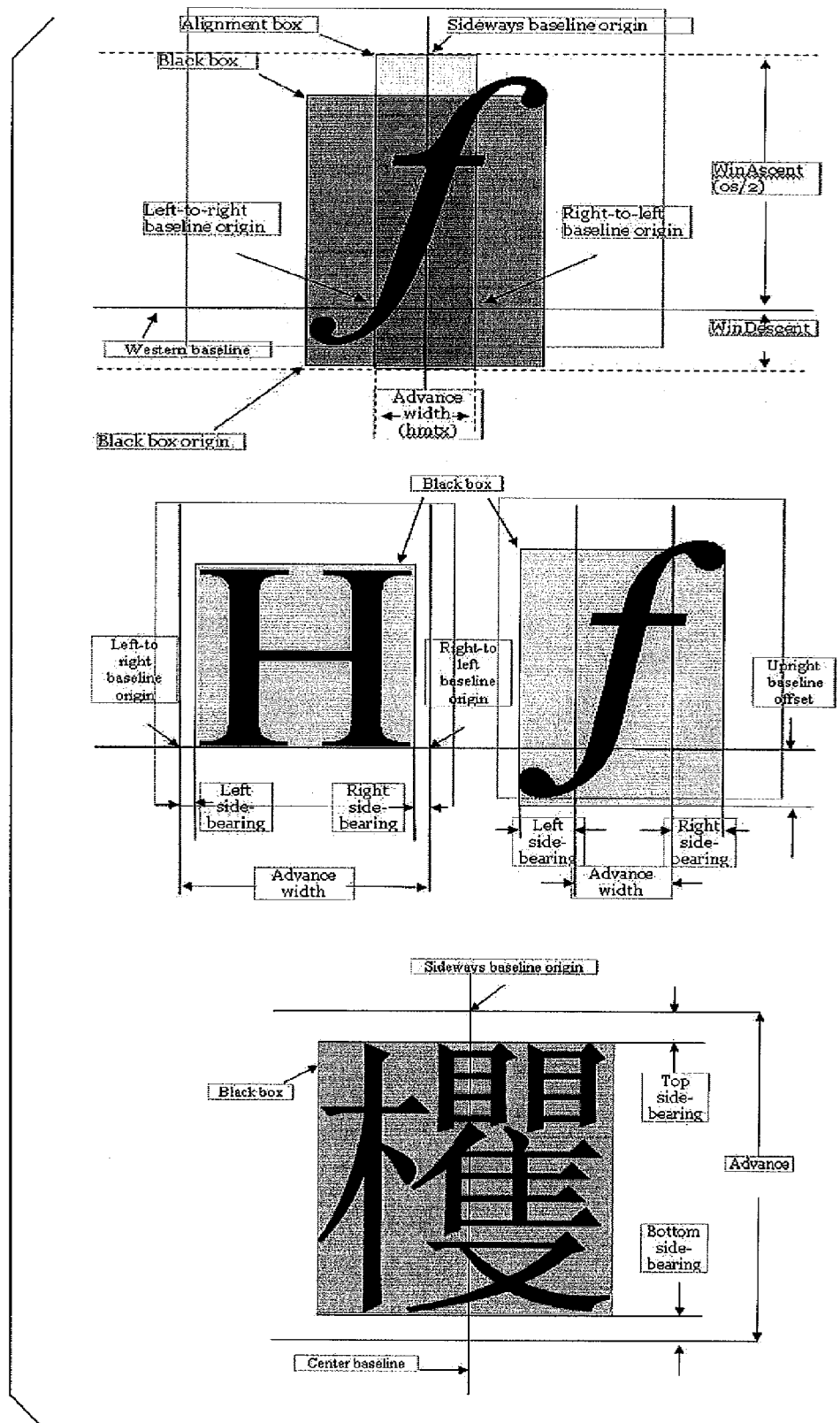
FIG. 12 illustrates both upright and sideways glyph metrics in accordance with one embodiment.

Each glyph defines metrics that specify how it aligns with other glyphs. Exemplary metrics in accordance with one embodiment are shown in FIG. 12.

Advance Widths and Combining Marks

In general, glyphs within a font are either base glyphs or combining marks that may be attached to base glyphs. Base glyphs usually have an advance width that is non-zero, and a 0,0 offset vector. Combining marks usually have a zero advance width. The offset vector may be used to adjust the position of a combining mark and so may have a non 0,0 value for combining marks.

Each glyph in the glyph run has three values controlling its position. The values indicate origin, advance width, and glyph offset, each of which is described below:

Origin: Each glyph is assumed to be given a nominal origin, for the first glyph in the run this is the origin of the run.

Advance Width: The advance width for each glyph provides the origin of the next glyph relative to this glyphs origin. The advance vector is always drawn in the direction of the run progression.

Glyph Offset (Base or Mark): The glyph offset vector adjusts this glyphs position relative to its nominal origin.

Characters, Glyphs, and the Cluster Map

Cluster maps contain one entry per Unicode codepoint. The value in the entry is the offset of the first glyph in the GlyphIndices array that represents this codepoint. Alternately, where the codepoint is part of a group of codepoints representing an indivisible character cluster, the first glyph in the GlyphIndices array represents the offset of the first glyph that represents that cluster.

Cluster Mappings

Figure 13:
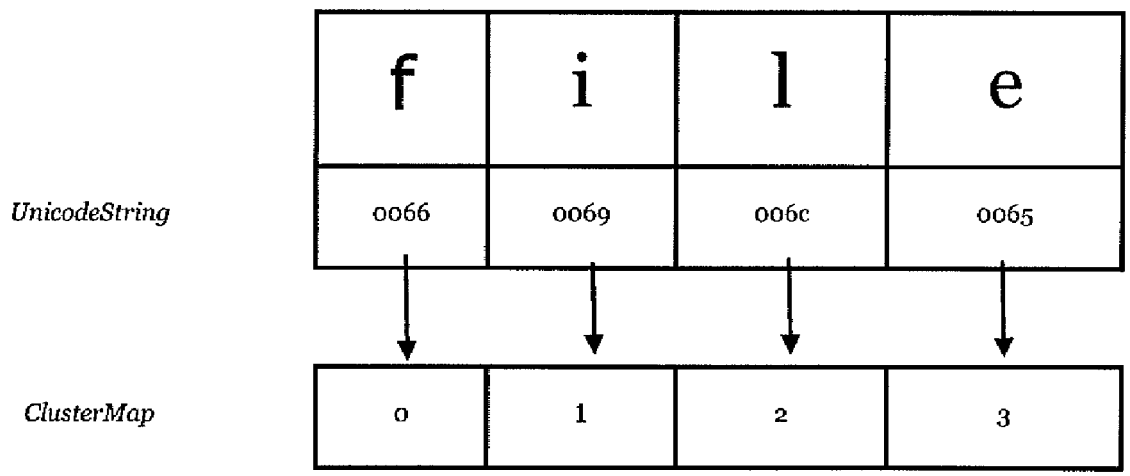
FIG. 13 illustrates a one-to-one cluster map in accordance with one embodiment.

The cluster map can represent codepoint-to-glyph mappings that are one-to-one, many-to-one, one-to-many, or many-to-many. One-to-one mappings are when each codepoint is represented by exactly one glyph, the cluster map entries in FIG. 13 are 0, 1, 2 . . . .

Figure 14:
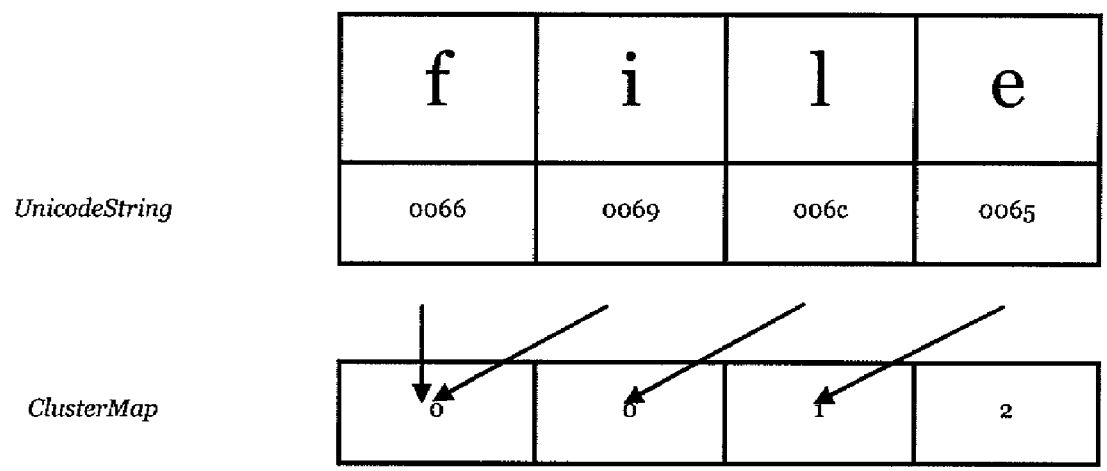
FIG. 14 illustrates a many-to-one cluster map in accordance with one embodiment.

Many-to-one mappings are when two or more codepoints map to a single glyph. The entries for those codepoints specify the offset of that glyph in the glpyh index buffer. In the example of FIG. 14, the 'f' and 'i' characters have been replaced by a ligature, as is common typesetting practice in many serif fonts.

Figure 15:
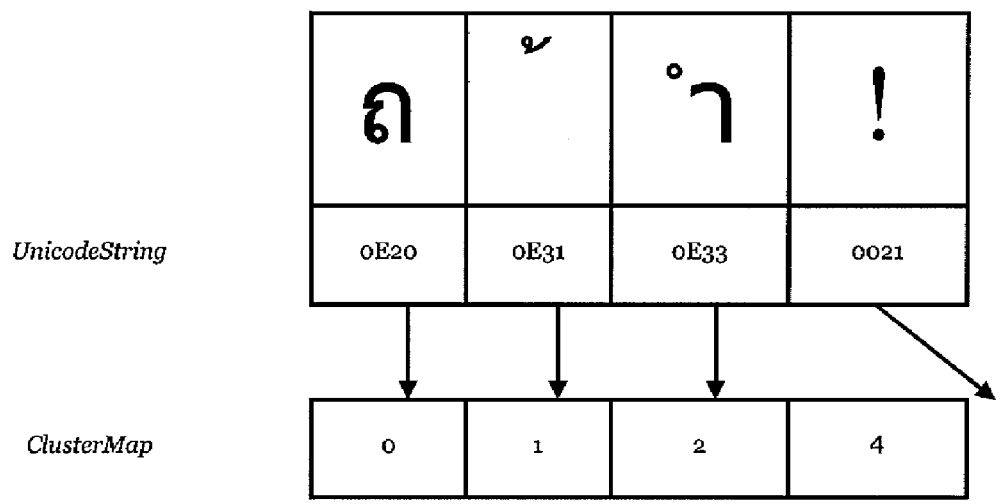
FIG. 15 illustrates a one-to-many cluster map in accordance with one embodiment.

With respect to one-to-many mappings, consider the following in connection with FIG. 15. 'Sara Am' contains a part that sits on top of the previous base character (the ring), and a part that sits to the right of the base character (the hook).

When Thai text is micro-justified, the hook is spaced apart from the base character, while the ring remains on top of the base character, therefore many fonts encode the ring and the hook as separate glyphs. When one codepoint maps to two or more glyphs, the value in the ClusterMap for that codepoint references the first glyph in the GlyphIndeces array that represents that codepoint.

Figure 16:
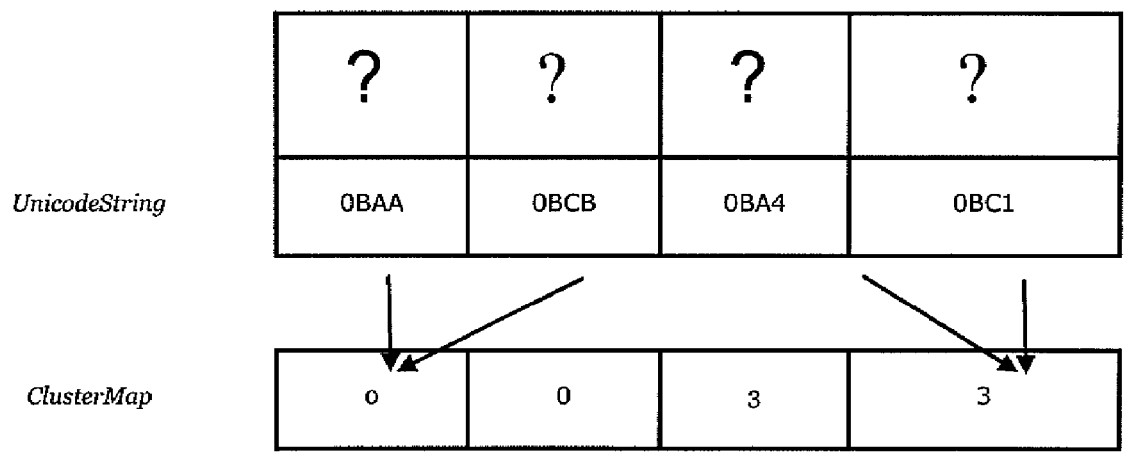
FIG. 16 illustrates a many-to-many cluster map in accordance with one embodiment.

With respect to many-to-many mappings, consider the following in connection with FIG. 16. In some fonts an indivisible group of codepoints for a character cluster maps to more than one glyph. For example, this is common in fonts supporting Indic scripts. When an indivisible group of codepoints maps to one or more glyphs, the value in the ClusterMap for each of the codepoints reference the first glyph in the GlyphIndeces array that represents that codepoint.

The following example shows the Unicode and glyph representations of the Tamil word புரஇ. The first two codepoints combine to generate three glyphs.

Specifying Clusters

Cluster specifications precede the glyph specification for the first glyph of a non 1:1 cluster (mappings are more complex than one-character-to-one-glyph).

Each cluster specification has the following form:
(ClusterCodepointCount [:ClusterGlyphCount])

| Cluster specification part | Type | Purpose | Default value |
|---|---|---|---|
| ClusterCodepointCount | positive integer | Number of 16 bit Unicode codepoints combining to form this cluster | 1 |
| ClusterGlyphCount | positive integer | Number of 16 bit glyph indices combining to form this cluster | 1 |

<Glyphs> Markup

The Glyphs element specifies a font as a URI, a face index and a set of other attributes described above. For example:

```
<Glyphs
    FontUri            = "file://c:/windows/fonts/times.ttf"
    FontFaceIndex      = "0"               <!-- Default 0 ==>
    FontRenderingEmSize = "20"             <!-- No default -->
    FontHintingEmSize  = "12"              <!-- Default 12 -->
    StyleSimulations   = "BoldSimulation"  <!-- Default None -->
    Sideways           = "false"           <!-- Default false -->
    BidiLevel          = "0"               <!-- Default 0 -->
    Unicode            = " ... "           <!-- Unicode rep -->
```

```
        Indices            = " ... "           <!-- See below -->
        remaining attributes ...
/>
```

Each glyph specification has the following form:
[GlyphIndex][,[Advance][,[uOffset][,[vOffset][,[Flags]]]]]
Each part of the glyph specification is optional:

| Glyph specification part | Purpose | Default value |
|---|---|---|
| GlyphIndex | Index of glyph in the rendering physical font | As defined by the fonts character map table for the corresponding Unicode codepoint in the inner text. |
| Advance | Placement for next glyph relative to origin of this glyph. Measured in direction of advance as defined by the sideways and BidiLevel attributes. Measured in 100ths of the font em size. Advance must be calculated such that rounding errors do not accumulate. See note below on how to achieve this requirement. | As defined by the fonts HMTX or VMTX font metric tables. |
| uOffset, vOffset | Offset relative to glyph origin to move this glyph. Usually used to attach marks to base characters. Measured in 100ths of the font em size. | 0, 0 |
| Flags | Distinguishes base glyphs and combining marks | 0 (base glyph) |

With respect to calculating advance without rounding error accumulation consider the following. Each advance value must be calculated as the exact unrounded origin of the subsequent glyph minus the sum of the calculated (i.e. rounded) advance widths of the preceding glyphs. In this way each glyph is positioned to within 0.5% of an em of its exact position.

Glyphs Markup Examples

```
<Canvas xmlns="http://schemas.microsoft.com/2005/xaml/">
    <Glyphs
        FontUri              = "file://c:/windows/fonts/times.ttf"
        FontFaceIndex        = "0"
        FontRenderingEmSize  = "20"
        FontHintingEmSize    = "12"
        StyleSimulations     = "ItalicSimulation"
        Sideways             = "false"
        BidiLevel            = "0"
        OriginX              = "75"
        OriginY              = "75"
        Fill                 = "#00FF00"
        UnicodeString        = "inner text ..."
    />
    <!-- 'Hello Windows' without kerning -->
    <Glyphs
        OriginX              = "200"
        OriginY              = "50"
        UnicodeString        = "Hello, Windows!"
        FontUri              = "file://C:/Windows/Fonts/Times.TTF"
        Fill                 = "#00FF00"
        FontRenderingEmSize  = "20"
    />
    <!-- 'Hello Windows' with kerning -->
    <Glyphs
        OriginX              = "200"
        OriginY              = "150"
        UnicodeString        = "Hello, Windows!"
        Indices              = ";;;;;;;,89"
        FontUri              = "file://C:/Windows/Fonts/Times.TTF"
        Fill                 = "#00FF00"
        FontRenderingEmSize  = "20"
    />
    <!-- 'Open file' without 'fi' ligature -->
    <Glyphs
        OriginX              = "200"
        OriginY              = "250"
        UnicodeString        = "Open file"
        FontUri              = "file://C:/Windows/Fonts/Times.TTF"
        Fill                 = "#00FF00"
        FontRenderingEmSize  = "20"
    />
    <!-- 'Open file' with 'fi' ligature -->
    <Glyphs
        OriginX              = "200"
        OriginY              = "350"
        UnicodeString        = "Open file"
        Indices              = ";;;;;(2:1)191"
        FontUri              = "file://C:/Windows/Fonts/Times.TTF"
        Fill                 = "#00FF00"
        FontRenderingEmSize  = "20"
    />
    <!-- 'ёжик в ТуМаНе' using pre-composed 'ё' -->
    <Glyphs
        OriginX              = "200"
        OriginY              = "450"
        xml:lang             = "ru-RU"
        UnicodeString        = "'ёжик в ТуМаНе"
        FontUri              = "file://C:/Windows/Fonts/Times.TTF"
        Fill                 = "#00FF00"
        FontRenderingEmSize  = "20"
    />
    <!-- 'ёжик в ТуМаНе' using composition of 'е' and diaeresis -->
    <Glyphs
        OriginX              = "200"
        OriginY              = "500"
        xml:lang             = "ru-RU"
        UnicodeString        = "'ёжик в ТуМаНе"
```

-continued

```
    Indices              = "(1:2)72;142,0,-45"
    FontUri              = "C:\Windows\Fonts\Times.TTF"
    Fill                 = "#00FF00"
    FontRenderingEmSize  = "20"
/>
<!-- ' ёзык в ТуМаНе' Forced rendering right-to-left showing
combining mark in logical order -->
<Glyphs
    OriginX              = "200"
    OriginY              = "550"
    BidiLevel            = "1"
    xml:lang             = "ru-RU"
    UnicodeString        = "'ёзык в ТуМаНе"
    Indices              = "(1:2)72;142,0,-45"
    FontUri              = "file://C:/Windows/Fonts/Times.TTF"
    Fill                 = "#00FF00"
    FontRenderingEmSize  = "20"
/>
</Canvas>
```

Optimizing the Size of Glyphs Markup

Markup details, such as glyph indices and advance widths, can be omitted from the markup if a targeted client can regenerate them reliably. The following options allow dramatic optimization of commonly used simple scripts.

Optimizing Markup of Glyph Indices

Glyph indices may be omitted from markup where there is a one-to-one mapping between the positions Of characters in the Unicode string and the positions of glyphs in the glyph string, and the glyph index is the value in the CMAP (character mapping) table of the font, and the Unicode character has unambiguous semantics.

Glyph indices should be provided in the markup where the mapping of characters to glyphs:

is not one-to-one, such as where two or more codepoints form a single glyph (ligature), or one codepoint generates multiple glyphs, or where any other form of glyph substitution has happened, such as through application of an OpenType feature.

Glyph indices should be provided in markup where a rendering engine might substitute a different glyph than that in the CMAP (character mapping) table in the font. Glyph indices should be provided where the desired glyph representation is not that in the CMAP table of the font.

Optimizing Markup of Glyph Positions

Glyph advance width may be omitted from the markup where the advance width required is exactly that for the glyph in the HMTX (horizontal metrics) or VMTX (vertical metrics) tables of the font.

Glyph vertical offset may be omitted from the markup where it is zero. This is almost always true for base characters, and commonly true for combining marks in simpler scripts. However, this is often false for combining marks in more complex scripts such as Arabic and Indic.

Optimizing Markup of Glyph Flags

Glyph flags may be omitted for base glyphs with normal justification priority.

Application Program Interface

The following describes an example embodiment of a platform-independent packaging Application Program Interface (API). This layer of the APIs consists of abstract classes and the other base classes that are included as a part of the packaging layer. The API includes the classes discussed below.

Container

A container is a logical entity that holds together a collection of parts.

```
namespace System.IO.MMCF
{
    // The Container class represents a logical entity that holds together a collection of
Parts.
    public class abstract Container : IDisposable
    {
        // Public Properties
        public virtual DateTime CreationTime { get; set; }      //File Properties.
        public virtual DateTime LastAccessTime { get; set; }    //File Properties.
        public virtual DateTime LastWriteTime { get; set; }     //File Properties.
        public FileAccess FileOpenAccess { get; }
        public abstract Part StartingPart { get; set; }
        // Public Static Methods
        public static Container OpenOnFile (string path);
        public static Container OpenOnFile (string path, FileMode mode);
        public static Container OpenOnFile (string path, FileMode mode, FileAccess access);
        public static Container OpenOnFile (string path,
                                        FileMode mode, FileAccess access, FileShare
share);
        public static Container OpenOnUri (Uri uri);
        public static Container OpenOnUri (Uri uri, FileMode mode);
        public static Container OpenOnUri (Uri uri, FileMode mode, FileAccess access);
        public static Container OpenOnStream (Stream stream, string contentType);
        public static Container OpenOnstream (Stream stream, string contentType, FileMode
mode);
        public static Container OpenOnStream (Stream stream, string contentType, FileMode
mode,
                                        FileAccess access);
        // Public Methods
        public Part AddPart (MMCFUri uri, string contentType);
        public Part GetPart (MMCFUri uri);
        public virtual bool Exists (MMCFUri uri);
        public void DeletePart (MMCFUri uri);
        public PartCollection GetParts ( );
        public void Flush ( );
        public void Close ( );
```

-continued

```
    public virtual void Dispose ( );
    public Relationship AddRelationship (Uri uri);
    public void DeleteRelationship (Relationship relationship);
    public RelationshipCollection GetRelationships ( );
    // Protected Methods - For Custom Implementation
    protected abstract Part AddPartCore (MMCFUri uri, string contentType);
    protected abstract Part GetPartCore (MMCFUri uri);
    protected abstract Void DeletePartcore (MMCFUri uri);
    protected abstract Part [ ] GetPartsCore ( );
    protected abstract void DeleteCore ( );
    protected abstract void FlushCore ( );
    // Protected constructor
    protected Container (FileInfo fileInfo, FileAccess access);
    }
}
```

Constructors

| protected Container (FileInfo fileInfo, FileAccess access) |
| --- |
| Protected constructor for the base class. Explicitly defining in this class, so that it is easier to document and maintain this constructor. The compiler would have added one anyways if it's not specified. Also this is the current contract between the abstract class and the subclasses. When the |

-continued

| protected Container (FileInfo fileInfo, FileAccess access) |
| --- |
| fileInfo object is null it defines that the container was opened or created on a stream. |

Properties

| public virtual DateTime CreationTime {get; set;} |
| --- |
| Gets or sets the creation time of this container. When this value is set LastAccessTime and LastWriteTime should also be updated to the same value. System.IO.FileInfo object is used to manipulate this value.<br>Exceptions |
| InvalidArgumentException - If CreationTime is set to a value that is greater than LastAccessTime or LastWriteTime.<br>InvalidOperationException - If the Container was opened on a stream there is no way to get this property. |

| public virtual DateTime LastAccessTime {get; set;} |
| --- |
| Gets or sets the last time this container was opened. System.IO.FileInfo object is used to manipulate this value.<br>Exceptions |
| InvalidArgumentException - If LastAccessTime is set to a value that is less than CreationTime or LastWriteTime.<br>InvalidOperationException - If the Container was opened on a stream there is no way to get this property. |

| public virtual DateTime LastWriteTime {get; set;} |
| --- |
| Gets or sets the last time this container was modified. Also when LastWriteTime is updated, LastAccessTime should be updated to the same value. System.IO.FileInfo object is used to manipulate this value.<br>Exceptions |
| InvalidArgumentException - If LastWriteTime is set to a value that is less than CreationTime.<br>InvalidOperationException - If the Container was opened on a stream there is no way to get this property. |

| public FileAccess FileOpenAccess {get;} |
| --- |
| Gets the FileAccess with which the container was opened. This is a read only property. This property gets set when the container is opened. |

| public abstract Part StartingPart {get; set;} |
| --- |
| Gets or sets the StartingPart of the container. |

Methods

| |
|---|
| public static Container OpenOnFile (string path) |
| This overloaded version of OpenOnFile method will return a Container specified at the given path. This method calls the overload which accepts all the parameters with the following defaults -<br>FileMode - FileMode.OpenOrCreate<br>FileAccess - FileAccess.ReadWrite<br>FileShare - FileShare.None |
| public static Container OpenOnFile (string path, FileMode mode) |
| This overloaded version of OpenOnFile method will return a Container specified at the given path in the specified file mode. This method calls the overload which accepts all the parameters with the following defaults -<br>FileAccess - FileAccess.ReadWrite<br>FileShare - FileShare.None |
| public static Container OpenOnFile (string path, FileMode mode, FileAccess access) |
| This overloaded version of OpenOnFile method will return a Container specified at the given path in the specified file mode and file access. This method calls the overload which accepts all the parameters with the following default -<br>FileShare - FileShare.None |
| public static Container OpenOnFile (string path, FileMode mode, FileAccess access, FileShare share) |
| This overloaded version of OpenOnFile method will open a container at the given path with the mode, access and share set to the values provided.<br>Exceptions<br><br>InvalidArgumentException - If the combination of the FileMode, FileAccess and FileShare parameters is not meaningful. |
| public static Container OpenOnUri (Uri uri) |
| This overloaded version of OpenOnUri method will return a Container specified at the given uri. This method calls the overload which accepts all the parameters with the following defaults -<br>FileMode - FileMode.Open<br>FileAccess - FileAccess.Read |
| public static Container OpenOnUri (Uri uri, FileMode mode) |
| This overloaded version of OpenOnUri method will return a Container specified at the given uri in the specified file mode. This method calls the overload which accepts all the parameters with the following default -<br>FileAccess - FileAccess.Read |
| public static Container OpenOnUri (Uri uri, FileMode mode, FileAccess access) |
| This overloaded version of OpenOnUri method will open a container at the given uri with the mode and access set to the values provided. The WebRequest/WebResponse mechanism will be used for obtaining the container. The FileMode and FileAccess parameters will be applied to the container that will be opened. This method calls the OpenOnStream method with the correct content type.<br>Exceptions<br><br>InvalidArgumentException - If the combination of the FileMode, FileAccess and FileShare parameters is not meaningful. |
| public static Container OpenOnStream (Stream stream, string contentType) |
| This overloaded version of OpenOnStream method will return a Container on the stream provided. This method calls the overload which accepts all the parameters with the following defaults -<br>FileMode - FileMode.Open<br>FileAccess - FileAccess.Read |
| public static Container OpenOnStream (Stream stream, string contentType, FileMode mode) |
| This overloaded version of OpenOnStream method will return a Container on the stream provided in the specified file mode. This method calls the overload which accepts all the parameters with the following defaults -<br>FileAccess - FileAccess.Read |

-continued

| |
|---|
| public static Container OpenOnStream (Stream stream, string contentType, FileMode mode, FileAccess access) |
| This overloaded version of OpenOnStream method will open a container on the stream provided with the mode and access set to the values provided. The FileMode and FileAccess parameters will be applied to the container that will be opened. The contentType parameter is used to instantiate the appropriate sub class object.<br>Exceptions |
| InvalidArgumentException - If the combination of the FileMode, FileAccess and FileShare parameters is not meaningful. |
| public Part AddPart (MMCFUri uri, string contentType) |
| A Part for the given Uri is added to the container. This method will add a Part with an empty stream if no explicit call is made to read or write to the stream. This method calls the AddPartCore which will do the actual work related to the physical implementation.<br>Exceptions |
| InvalidArgumentException - If the Part corresponding to this Uri already exists in the container. |
| public Part GetPart (MMCFUri uri) |
| A Part for the given Uri is returned. The uri is relative to the root of the Container. This method calls the GetPartCore which actually fetches the part.<br>Exceptions |
| InvalidArgumentException - If the Part corresponding to this Uri does not exist in the container. |
| public virtual bool Exists (MMCFUri uri) |
| Since it is possible to have relationships point to targets that still do not exist, this method provides a convenient way to find out if a Part actually exists in the underlying Container. This uri should be relative to the root of the container. |
| public void DeletePart (MMCFUri uri) |
| This method will delete a container part from the current container. Also all the relationships for which this part was the SourcePart, will get deleted. This method will delete the underlying stream and the object will be disposed. Also if there are multiple instances of this Part open, then Dispose all the other open instances of this part. This method will do the necessary cleanup to enforce this behavior, however the actual deletion of the stream is specific to the underlying physical implementation and so invoke the DeletePartCore method which will delete the actual stream. The outstanding Part enumerators will be invalidated. |
| public PartCollection GetParts ( ) |
| This returns a collection of all the Parts within the container. Relationships are not returned. |
| public void Flush ( ) |
| This method calls flush on the individual parts that were opened, thus enforcing that all the parts and the relationships get flushed to the underlying container. Essentially this class will maintain an array of all the Parts that it hands out and then will call Flush on all the Parts. It then calls the FlushCore ( ) which will do the work specific to the container as a whole. |
| public virtual void Dispose ( ) |
| All open Parts and Relationships are flushed to the underlying container. Since this class maintains an array of all the Parts handed out, this method will call Dispose ( ) on all the Parts handed out. If any other resources need to be cleaned up, then the subclasses should override this method to do the additional cleanup. |
| public void Close ( ) |
| Close method is the same as dispose so internally it makes a call to Dispose( ) method. |
| public Relationship AddRelationship (Uri uri) |
| This method adds a relationship between the Container and the Part specified by the URI. It returns a Relationship object. This change is flushed to the underlying container only after a call is made to Flush ( ) method. There can be multiple relationships between the same source and target. All outstanding relationship enumerators will be invalidated. |
| public void DeleteRelationship (Relationship relationship) |
| This method deletes the target relationship specified by the Relationship object. This change is flushed to the underlying container only after a call is made to Flush ( ) method. The delete |

-continued operation is done based on the "name" of the object and as such each object is uniquely identified. All outstanding relationship enumerators will be invalidated.
Exceptions InvalidArgumentException - If the source of the relationship is not the same as the current Part.

public RelationshipCollection GetRelationships ( )

This returns a collection of all the target relationships from the Container. As the target relationships for the container are located at a well know uri, it is possible for us to provide a default implementation that will open the relationship Part and then read xml from the stream and create the collection object (Exceptions - If the XML that was read from the underlying container is malformed.)
protected abstract Part AddPartCore (MMCFUri uri, string contentType)
This method is for the custom implementation for the underlying file format. It will be called from the AddPart method. This will actually create a part in the underlying container. An empty part should be created as a result of this call.

protected abstract Part GetPartCore (MMCFUri uri)

This method is for the custom implementation for the underlying file format. It will be called from the GetPart method. This method fetches the actual part from the underlying container. If a part does not exist it should return a "null".

protected abstract void DeletePartCore (MMCFUri uri)

This method is for the custom implementation for the underlying file format. It should actually delete the stream corresponding to this part. Also if a part does not exist corresponding to a given URI, it should not throw.

protected abstract Part [ ] GetPartsCore ( )

This method is for the custom implementation for the underlying file format. It should return an array of all the Parts in the container. Since the way to obtain all the parts in a container is specific to the actual physical format this method is useful. This is provided so that the actual GetParts call just passes this array to the PartCollection and we can provide and enumerator over that. That way the PartCollection class can be a concrete class. Also if there are no parts in the container, the GetPartsCore should return an empty array.

protected abstract void FlushCore ( )

This method is for the custom implementation for the underlying file format. This method flushes all the contents to the disc.

protected abstract void DisposeCore ( )

This method is for the custom implementation for the underlying file format. This method should release the resources corresponding to the actual physical format.

Part
A part is comprised of three pieces:
URI—relative to the root of the container.
ContentType—it is the mime type of the stream represented by this part
Stream—the actual stream corresponding to this part.
In addition, parts can be linked to other parts with Relationships. The SourcePart in a relationship, owns the relationship.

```
namespace System.IO.MMCF
{
  // This class represents a Part which consists of an Uri, ContentType and
an underlying stream.
  // A part can be connected to other part using Relationships.
  public class abstract Part
  {
    //Public Properties
    public MMCFUri Uri { get; }
    public string ContentType { get; }
    public Container Container { get; }
    // Public Methods
    public Stream GetStream ( );
```

-continued

```
    public Stream GetStream (FileMode mode);
    public Stream GetStream (FileMode mode, FileAccess access);
    protected abstract Stream GetStreamCore (FileMode mode, FileAccess
access);
    public Relationship AddRelationship (Uri uri);
    public void DeleteRelationship (Relationship relationship);
    public RelationshipCollection GetRelationships ( );
    // Protected constructor
    protected Part (Container container, MMCFUri uri, string
contentType);
  }
}
```

Constructors protected Part (Container container, MMCFUri uri, string contentType)

Protected constructor for the base class. Explicitly defining in this class, so that it is easier to document and maintain this constructor. The compiler -continued protected Part (Container container, MMCFUri uri, string contentType)

would have added one anyways if it's not specified. Also this is the current contract between the abstract class and the subclasses.

Properties public MMCFUri Uri {get ;}

This property returns the MMCFUri of the Part. This is a read-only property.

-continued public string ContentType {get;}

This property returns the content type of the stream represented by the Part. This is a read-only property. public Container Container {get;}
This property returns the parent container of the Part. This is a read-only property.

Methods public Stream GetStream ( )

This method returns a stream corresponding to this part. It calls the overload which accepts all the parameters with the following defaults -
FileMode - Open
FileAccess - Read Write public Stream GetStream (FileMode mode)

This method returns a stream corresponding to this part in the mode specified. It calls the overload which accepts all the parameters with the following defaults -
FileAccess - ReadWrite public Stream GetStream (FileMode mode, FileAccess access)

This method returns a stream corresponding to this part. It calls the GetStreamCore method which will return the actual stream. This method will do the housekeeping required to keep track of all the open streams.

public abstract Stream GetStreamCore (FileMode mode, FileAccess access)

This method returns a stream corresponding to this part. This method is for custom implementation public Relationship AddRelationship (Uri uri)

This method adds a relationship between the Part at the URI specified and the current Part. It returns a Relationship object. This change is flushed to the underlying container only after a call is made to Flush ( ) method. There can be multiple relationships between the same source and target. All outstanding relationship enumerators will be invalidated.
Exceptions InvalidOperationException - If the current Part is a relationship.

public void DeleteRelationship (Relationship relationship)

This method deletes the target relationship specified by the Relationship object. This change is flushed to the underlying container only after a call is made to Flush ( ) method. The delete operation is done based on the "reference" of the object and as such each object is uniquely identified. All outstanding relationship enumerators will be invalidated.
Exceptions InvalidArgumentException - If the source of the relationship is not the same as the current Part.

public RelationshipCollection GetRelationships ( )

This returns a collection of all the target relationships of this Part. As the target relationships for this Part are located at a well know uri, it is possible for us to provide a default implementation that will open the relationship Part and then read xml from the stream and create the collection object (Exceptions - If the XML that is read from the underlying container is malformed.)

Relationship

This class is used to express a relationship between a source and a target part. The only way to create a Relationship, is to call the Part.AddRelationship (Uri uri). A relationship is owned by a source part and so if the source part is deleted all the relationships it owns are also deleted. A target of the relationship need not be present.

```
namespace System.IO.MMCF
{
  // This class represents a relationship between a source part and a target
part. The only way
  // to create a Relationship is to call Part.AddTargetRelationship
(Uri uri). A relationship is
  // owned by the source part. So if the source part is deleted all the
relationships it owns
  // also get deleted.
  public class Relationship
  {
    //Public Properties
    public Part Source { get; }
    public Uri TargetUri { get; }
    public string Name { get;}
    //internal Constructors
    internal Relationship (Part source, Uri target, string name);
  }
}
```

Constructors

| internal Relationship (Uri source, Uri target, string name) |
| --- |
| Returns a Relationship object. |

Properties

| public Part Source {get;} |
| --- |
| Gets the Source part of the Relationship. This is a read-only property. This is set when the Relationship is created. |
| public Uri TargetUri {get;} |
| Gets the TargetUri of the Relationship. This Uri should be treated as being relative to the source uri. |
| public string Name {get;} |
| Gets the name corresponding to this Relationship. |

Part Collection

This is a collection of parts in a container.

```
namespace System.IO.MMCF
{
  // This is a strongly typed collection of Parts
  public class PartCollection : IEnumerable
  {
    //IEnumerable Member
    public IEnumerator GetEnumerator ( );
    //Internal Constructors
    internal PartCollection (Dictionary<MMCFUri, Part> partDictionary);
  }
}
```

Constructors

| internal PartCollection (Dictionary<MMCFUri, Part> partDictionary) |
| --- |
| Creates a PartCollection based on the generic dictionary of Part objects. |

Methods

| public IEnumerator GetEnumerator ( ) |
| --- |
| Member of the IEnumerable Interface. It returns an enumerator over the parts collection |

RelationshipCollection

This is a collection of relationships associated with a part in a container. There can be more than one relationship between a given source and target part.

```
namespace System.IO.MMCF
{
  // This is a strongly typed collection of Relationships
  public class RelationshipCollection : IEnumerable
  {
    //IEnumerable Member
    public IEnumerator GetEnumerator( );
    //Internal Constructors
    internal RelationshipCollection (Relationship [ ] relationships);
  }
}
```

Constructors

| internal RelationshipCollection (Relationship [ ] relationships) |
| --- |
| Creates a RelationshipCollection based on the array of Relationship objects. |

Methods public IEnumerator GetEnumerator ( )

MMCFUri

This class inherits from the URI class. The main function of this Uri class is to make sure that the URI specified starts with a "/". The motivations for this class are:

1. To make sure that the URIs used for each individual part start with a "/". This makes sure that all the part names are relative to the root of the container.
2. Since System.Uri class does not allow resolving two relative URIs, they need to be resolved in a different way and so it would be good to have this logic in one place.
3. Enforce the fact that the Container is the authority. Thus any relative references should not be resolved to a location outside of the container

```
namespace System.IO.MMCF
{
  // This class is used to create URIs that always start with a "/"
  public class MMCFUri : Uri
```

-continued

```
{
    //Public Constructors
    public MMCFUri (string uri);
    public MMCFUri (MMCFUri baseUri, string relativeUri);
    }
}
```

Constructors public MMCFUri (string uri)

Creates an MMCFUri object from the uri string provided. Ensures that the Uri is relative and starts with "/".
Exceptions - InvalidArgumentException - If the URI consists of a hostname and protocol, i.e. it is an absolute URI.

public MMCFUri (MMCFUri baseUri, string relativeUri)

Creates an MMCFUri object from the Uri object provided and the relativeUri string. We resolve the relative uri with respect to the baseUri. Ensures that the Uri is relative and starts with "/".
Exceptions - InvalidArgumentException - If the URI consists of a hostname and protocol, i.e. it is an absolute URI.

Code Sample

```
namespace System.IO.MMCF
{
  public class Sample :
  {
    // Creates a container and adds a part to it.
    Container c = new Container.OpenOnFile("myFilePath");
    Part p1 = c.AddPart("mypart1", "contentType"); //Creates empty stream
    c.Close( );
    // Opens the same container and adds another part and a relationship
    c = new Container.OpenOnFile("myFilePath");
    Part p1 = c.GetPart("mypart1");
    Part p2 = c.AddPart("mypart2", "contentType"); //Creates empty stream
    RelationshipInfo ri1 = p1.AddRelationship(p2.Uri);
    c.Close( );
  }
}
```

Other API Details

OpenOnFile, OpenOnUri and OpenOnStream Methods

These methods have a hard coded logic and the only physical container format these methods are aware of is the Compound File implementation. Since we own these classes there is some assumption about the subclass Constructors that are called from these Static methods. Also these static methods instantiate the correct sub class object based on the file extension or the content type of the stream currently.

| | Current Stream Access | | Required Container Access | | |
|---|---|---|---|---|---|
| | CanRead | CanWrite | Read | Write | ReadWrite |
| 1. | true | true | Restrict to ReadOnly | Restrict to WriteOnly | OK |
| 2. | false | true | Throw | OK | Throw |
| 3. | true | false | OK | Throw | Throw |
| 4. | false | false | Throw | Throw | Throw |

OpenOnStream Method and the Implications of the Specified Access for Container.

When creating a Container on a stream, it is important to make sure that the FileAccess specified for the container is compatible with the stream that is provided. The following table lists the various possibilities and an example of how to deal with them.

In the first row where the stream has more access and we want the container created to be more restricted, we wrap the incoming stream with a private stream called RestrictedStream, which has the appropriate CanRead and CanWrite values.

In Memory Caching of Part and Relationship Objects

A Dictionary maintains all the parts accessed and if a part is asked for a second time, a reference to the part from the dictionary is returned. This is more efficient and since the Part object is immutable this is done without any problem. The same applies to the Relationship objects. However, if the underlying container were opened in a shared write mode and there was a second user adding or deleting parts to the underlying container, these changes may not get reflected in this cache.

CONCLUSION

The above-described modular content framework and document format methods and systems provide a set of building blocks for composing, packaging, distributing, and rendering document-centered content. These building blocks define a platform-independent framework for document formats that enable software and hardware systems to generate, exchange, and display documents reliably and consistently. The illustrated and described reach package format provides a format for storing paginated or pre-paginated documents in a manner in which contents of a reach package can be displayed or printed with full fidelity among devices and applications in a wide range of environments and across a wide range of scenarios. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An application program interface embodied on one or more computer-readable storage media, the application program interface comprising:
    calling a first method to create a package that defines a document, wherein the package holds together a plurality of parts which represent different aspects of the document;
    calling a second method to create a relationship between the package and a particular part in the package;
    calling a third method to identify one or more relationships between the plurality of parts in the package, wherein each relationship identifies at least one connection between an associated part and at least one other of the plurality of parts, each relationship being stored in a relationships part independent of the plurality of parts, wherein the connections are discovered by analyzing relationships associated with the plurality of parts without looking at the content of the parts; and wherein the plurality of parts facilitates at least displaying the document independent of a platform on the computer.

2. An application program interface as recited in claim 1, further comprising calling a fourth method to delete existing relationships.

3. An application program interface as recited in claim 1, further comprising calling a fourth method to retrieve information regarding existing relationships.

4. An application program interface as recited in claim 1, further comprising a property that identifies a source part associated with a particular relationship.

5. An application program interface as recited in claim 1, further comprising a property that identifies a target uniform resource identifier associated with a particular relationship.

6. An application program interface as recited in claim 1, further comprising a property that identifies a name associated with a particular relationship.

7. An application program interface as recited in claim 1, wherein each relationship is described using an extensible markup language (XML).

8. An application program interface as recited in claim 1, wherein the document and the plurality of parts are described using an extensible markup language (XML).

9. An application program interface as recited in claim 1, wherein each of the plurality of parts has an associated name.

10. An application program interface as recited in claim 1, wherein each relationship of an associated part has a name derived from the name of the associated part.

* * * * *